US012300057B2

(12) United States Patent
Ida et al.

(10) Patent No.: US 12,300,057 B2
(45) Date of Patent: May 13, 2025

(54) PAPER SHEET PROCESSING SYSTEM, PAPER SHEET PROCESSING METHOD, AND PROGRAM

(71) Applicant: JAPAN CASH MACHINE CO., LTD., Osaka (JP)

(72) Inventors: Nobuhiro Ida, Osaka (JP); Yousuke Miyashita, Osaka (JP); Makoto Iwasaki, Osaka (JP)

(73) Assignee: JAPAN CASH MACHINE CO., LTD., Osaka (JP)

( * ) Notice: Subject to any disclaimer, the term of this patent is extended or adjusted under 35 U.S.C. 154(b) by 0 days.

(21) Appl. No.: 18/552,861

(22) PCT Filed: Mar. 9, 2022

(86) PCT No.: PCT/JP2022/010386
§ 371 (c)(1),
(2) Date: Sep. 27, 2023

(87) PCT Pub. No.: WO2022/209679
PCT Pub. Date: Oct. 6, 2022

(65) Prior Publication Data
US 2024/0185664 A1 Jun. 6, 2024

(30) Foreign Application Priority Data
Mar. 31, 2021 (JP) ................................ 2021-060435

(51) Int. Cl.
*G07D 11/16* (2019.01)
*G07D 11/50* (2019.01)

(52) U.S. Cl.
CPC ............ *G07D 11/16* (2019.01); *G07D 11/50* (2019.01)

(58) Field of Classification Search
CPC .......... G07D 7/00; G07D 11/16; G07D 11/50; G07F 19/202; B65H 43/02; B65H 2701/1912
See application file for complete search history.

(56) References Cited

U.S. PATENT DOCUMENTS 8,437,529 B1 * 5/2013 Mennie ............... G06Q 20/042 705/45
9,613,481 B2 * 4/2017 Jacomet ................ G07D 7/004
(Continued)

FOREIGN PATENT DOCUMENTS

JP 2012-252479 A 12/2012
WO WO 2015/141076 A1 9/2015
WO WO 2017/047641 A1 3/2017

OTHER PUBLICATIONS

English Translation of WO 2015141076 A1; Inv: Oyamada; Pub. Date: Sep. 2015 (Year: 2015).*
(Continued)

*Primary Examiner* — Joseph C Rodriguez
(74) *Attorney, Agent, or Firm* — MASUVALLEY & PARTNERS; Peter Martinez

(57) ABSTRACT

To provide a paper sheet processing system that can prevent theft of paper sheets. This paper sheet processing system comprises: a paper sheet processing device that counts number of paper sheets; and a paper sheet management device that is communicable with the paper sheet processing device, wherein the paper sheet processing device includes an acquiring unit that acquires paper sheet identification information uniquely identifying the paper sheets from corresponding paper sheets, and a transmission unit that transmits the acquired paper sheet identification information to the paper sheet management device, and the paper sheet management device includes a reception unit that receives the paper sheet identification information, a specifying unit
(Continued)

that specifies the paper sheet identification information of lost ones among the paper sheets, and a notification unit that notifies the paper sheet identification information specified by the specifying unit to an external device.

3 Claims, 21 Drawing Sheets

(56) References Cited

U.S. PATENT DOCUMENTS

| | | | | |
|---|---|---|---|---|
| 9,972,156 | B1 * | 5/2018 | Mennie | G06V 30/416 |
| 10,593,143 | B2 * | 3/2020 | Numata | G07D 11/24 |
| 2003/0006121 | A1 * | 1/2003 | Lee | G07D 7/01<br>194/206 |
| 2008/0223930 | A1 * | 9/2008 | Rolland | G06Q 10/087<br>235/385 |
| 2010/0247000 | A1 * | 9/2010 | Goodwin | G07D 11/0093<br>383/43 |
| 2018/0247480 | A1 * | 8/2018 | Numata | G07D 9/00 |

OTHER PUBLICATIONS

WIPO, Japan Patent Office as International Search Authority, International Search Report (with English translation) and Written Opinion mailed May 24, 2022 in International Patent Application No. PCT/JP2022/010386, 11 pages.

* cited by examiner (a)

(b)

| BUNDLE ID | SERIAL NUMBER | | DEPOSITING UNIT ID | |
|---|---|---|---|---|
| aaa | a12345 | ··· | ssss | Da1 |
| aaa | a67890 | ··· | ssss | Da1 |
| ⋮ | | | | |
| bbb | b12345 | ··· | tttt | Da1 |
| bbb | b67890 | ··· | tttt | Da1 |
| ⋮ | | | | |
| ccc | c12345 | ··· | uuuu | Da1 |
| ccc | c67890 | ··· | uuuu | Da1 |
| ⋮ | | | | |

(a)

(b)

| INPUT BUNDLE ID | SERIAL NUMBER | | OUTPUT BUNDLE ID | |
|---|---|---|---|---|
| aaa,bbb,ccc | a12345 | ··· | ddd | Da2 |
| aaa,bbb,ccc | a67890 | ··· | ddd | Da2 |
| aaa,bbb,ccc | b12345 | ··· | ddd | Da2 |
| aaa,bbb,ccc | b67890 | ··· | ddd | Da2 |
| aaa,bbb,ccc | c12345 | ··· | ddd | Da2 |
| aaa,bbb,ccc | c67890 | ··· | ddd | Da2 |

⋮

(a)

(b)

| INPUT BUNDLE ID | SERIAL NUMBER | | OUTPUT BUNDLE ID | |
|---|---|---|---|---|
| ddd | a12345 | ··· | eee | Da3 |
| ddd | b67890 | ··· | eee | Da3 |
| ⋮ | | | | |
| ddd | b12345 | ··· | fff | Da3 |
| ddd | a67890 | ··· | fff | Da3 |
| ⋮ | | | | |
| ddd | c12345 | ··· | ggg | Da3 |
| ddd | c67890 | ··· | ggg | Da3 |
| ⋮ | | | | |

(a)

(b)

| DISPENSING UNIT ID | SERIAL NUMBER | OUTPUT BUNDLE ID | | |
|---|---|---|---|---|
| vvvv | a12345 | eee | … | Da4 |
| vvvv | b67890 | eee | … | Da4 |
| vvvv | … | eee | … | Da4 |
| | ⋮ | | | ⋮ |

AUTOMATIC REGISTRATION (a)

(b)

Da4

| DISPENSING UNIT ID | SERIAL NUMBER | |
|---|---|---|
| ··· | ··· | ··· |
| ⋮ | | |
| vvvv | a12345 | ··· |
| vvvv | b67890 | ··· |
| ⋮ | | |
| vvvv | d24680 | ··· |
| ··· | ··· | ··· |
| ⋮ | | |

L

| SERIAL NUMBER |
|---|
| a12345 |
| b67890 |
| ⋮ |
| d24680 |

(a) BANKNOTE INFORMATION Da

| Dax | | | Day | | |
|---|---|---|---|---|---|
| Dax1 | Dax2 | Dt | Day1 | Day2 | Day3 |
| BUNDLE ID | NUMBER OF BANKNOTES | MODEL INFORMATION | SERIAL NUMBER | DENOMINATION | ORIENTATION |

(b) DISTRIBUTION PATTERN (SPECIFIC EXAMPLES)

(b-1)

| Pa | Pb |
|---|---|
| DENOMINATION=X FITNESS =FIT | DENOMINATION=X FITNESS =UNFIT |

(b-2)

| Pa | Pb |
|---|---|
| DENOMINATION=1st FITNESS =MIX | DENOMINATION=1st FITNESS =MIX |

FIG.12

(a) STRENGTH DECISION TABLE

| MODEL INFORMATION | IDENTIFICATION STRENGTH |
|---|---|
| ATM(MANUFACTURED BY X CORPORATION) | HIGH |
| ATM(MANUFACTURED BY Y CORPORATION) | MEDIUM |
| COUNTING DEVICE (MANUFACTURED BY Z CORPORATION) | HIGH |
| SORTING DEVICE (SELF-MANUFACTURED) | LOW |
| ⋮ | ⋮ |
| NONE (MANUALLY CALCULATED) | HIGH |

(b) SETTING INFORMATION Ds

| Ds1 | Ds2 | Ds3 |
|---|---|---|
| BUNDLE ID | DISTRIBUTION PATTERN | STRENGTH INFORMATION |

■SPECIFIC EXAMPLES OF SETTING INFORMATIONDs (c-1)Dt =ATM (MANUFACTURED BY YCORPORATION)

| Ds1 | Ds2 | Ds3 |
|---|---|---|
| aaa | Pa(X,Fit),Pb(X,UNFIT) | HIGH |
| aaa | Pa(1st,MIX),Pb(1st,MIX) | MEDIUM |

⋮

(c-2)Dt = SORTING DEVICE (SELF-MANUFACTURED)

| Ds1 | Ds2 | Ds3 |
|---|---|---|
| bbb | Pa(X,Fit),Pb(X,UNFIT) | LOW |
| bbb | Pa(1st,MIX),Pb(1st,MIX) | LOW |

⋮

(a-1) BANKNOTE INFORMATION Da

| Dax | | Day | | |
|---|---|---|---|---|
| Dax1 | Dax2 | Day1 | Day2 | Day3 |
| BUNDLE ID | NUMBER OF BANKNOTES | SERIAL NUMBER | DENOMINATION | ORIENTATION |

(a-2)

(b) MASTER INFORMATION Dm

| PROCESSING SPEED | IN-BATCH NUMBER OF BANKNOTES | AVERAGE STOPPING TIME |
|---|---|---|
| s | b | w |

FIG.17

■SETTING PATTERN (a-1)A1

| P1 | P2 | P3 | P4 |
|---|---|---|---|
| 1 | 1 | 1 | 1 |

(a-2)A2

| P1 | P2 | P3 | P4 |
|---|---|---|---|
| 1 | 1 | 2 | 2 |

(a-3)A3

| P1 | P2 | P3 | P4 |
|---|---|---|---|
| 1 | 2 | 3 | 4 |

(a-4)A3a

| P1 | P2 | P3 | P4 |
|---|---|---|---|
| 1st | 2nd | 3rd | 4th |

(b-1)B1

| P1 | P2 | P3 | P4 |
|---|---|---|---|
| 1 | 1 | 1 | 2 |

(b-2)B2

| P1 | P2 | P3 | P4 |
|---|---|---|---|
| 1 | 1 | 2 | 3 |

(c-1)C1

| P1 | P2 | P3 | P4 |
|---|---|---|---|
| 1 | 1 | 1 | M |

(c-2)C2

| P1 | P2 | P3 | P4 |
|---|---|---|---|
| 1 | 2 | 3 | M |

(d)D

| P1 | P2 | P3 | P4 |
|---|---|---|---|
| 1 | 1 | 2 | M |

■DISTRIBUTION PATTERN (SPECIFIC EXAMPLES)

(e-1)

| P1 | P2 | P3 | P4 |
|---|---|---|---|
| UP | UP | UP | UP |

BANKNOTE BUNDLE Bx
SETTING PATTERN = A1
SORTING PATTERN = SORT BY UP-SIDED/DOWN-SIDED
DISTRIBUTION PATTERN = P1(UP), P2(UP), P3(UP), P4(UP)

(e-2)

| P1 | P2 | P3 | P4 |
|---|---|---|---|
| DOWN | DOWN | DOWN | DOWN |

BANKNOTE BUNDLE By
SETTING PATTERN = A1
SORTING PATTERN = SORT BY UP-SIDED/DOWN-SIDED
DISTRIBUTION PATTERN = P1(DOWN), P2(DOWN), P3(DOWN), P4(DOWN)

(f-1)

| P1 | P2 | P3 | P4 |
|---|---|---|---|
| X | X | X | Y |

BANKNOTE BUNDLE B(*)
SETTING PATTERN = B1
SORTING PATTERN = SORT BY DENOMINATION
DISTRIBUTION PATTERN = P1(X), P2(X), P3(X), P4(Y)

(f-2)

| P1 | P2 | P3 | P4 |
|---|---|---|---|
| Y | Y | Y | X |

BANKNOTE BUNDLE B(*)
SETTING PATTERN = B1
SORTING PATTERN = SORT BY DENOMINATION
DISTRIBUTION PATTERN = P1(Y), P2(Y), P3(Y), P4(X)

(*) COMMON BANKNOTE BUNDLE

FIG.18

(a)

| CONTENTS OF BANKNOTE BUNDLE | SORTING PATTERN: SORT BY DENOMINATION | SORTING PATTERN: SORT BY FRONT-SIDED/BACK-SIDED | SORTING PATTERN: SORT BY ORIENTATION | | NUMBER OF TYPES |
|---|---|---|---|---|---|
| | ONE DENOMINATION | BANKNOTES ARE ALL FRONT-SIDED OR BACK-SIDED | BANKNOTES ARE ALL UP-SIDED OR DOWN-SIDED | → | 1 |
| | TWO DENOMINATIONS | FRONT-SIDED BANKNOTES AND BACK-SIDED BANKNOTES ARE MIXED | UP-SIDED BANKNOTES AND DOWN-SIDED BANKNOTES ARE MIXED | → | 2 |
| | THREE DENOMINATIONS | – | – | → | 3 |
| | FOUR DENOMINATIONS | – | – | → | 4 |
| | k TYPES | – | – | → | k(※1) |

(b)

| NUMBER OF TYPES | SETTING PATTERN: A1 | A2 | A3 | A3a | B1 | B2 | C1 | C2 | D1 |
|---|---|---|---|---|---|---|---|---|---|
| 1 | 1 | 1 | 1 | 1(※2) | – | – | – | – | – |
| 2 | – | 1 | 1 | 1(※2) | 2 | – | – | – | – |
| 3 | – | – | 1 | 1(※2) | – | 3 | 3 | – | – |
| 4 | – | – | 1 | 1(※2) | – | – | 4 | – | 1 |
| k(※1) | – | – | – | – | – | – | kC1 | kC3 | kP2 |

(※1)k≧5

(※2)ONLY WHEN SORT BY DENOMINATION

FIG.19

■CALCULATION METHOD OF ESTIMATED TIME (a)

B2-1

| STACKING PORTION | DENOMINATION |
|---|---|
| P1 | X |
| P2 | X |
| P3 | Y |
| P4 | Z |

⇩

| DISTRIBUTED NUMBER | |
|---|---|
| ax | 2 |
| ay | 1 |
| az | 1 |

B2-2

| STACKING PORTION | DENOMINATION |
|---|---|
| P1 | Y |
| P2 | Y |
| P3 | X |
| P4 | Z |

⇩

| DISTRIBUTED NUMBER | |
|---|---|
| ax | 1 |
| ay | 2 |
| az | 1 |

B2-3

| STACKING PORTION | DENOMINATION |
|---|---|
| P1 | Z |
| P2 | Z |
| P3 | X |
| P4 | Y |

⇩

| DISTRIBUTED NUMBER | |
|---|---|
| ax | 1 |
| ay | 1 |
| az | 2 |

(b) $2b > nx > b \geqq ny, nz$

| | B2-1 | B2-2 | B2-3 |
|---|---|---|---|
| m1x | 1 | 2 | 2 |
| m1y | 1 | 1 | 1 |
| m1z | 1 | 1 | 1 |
| m1 | 3 | 4 | 4 |

FIG.20

■RANKING PROCESS (NUMBER OF TYPES = 3)

(a)

| DISTRIBUTION PATTERN | MIXED BUNDLE | EQUALITY | PROCESS NUMBER | ESTIMATED TIME (SECONDS) | TEMPORARY RANK |
|---|---|---|---|---|---|
| A3a | – | ○ | 1 | 228 | a2 |
| A3 | – | ○ | 2 | 228 | a2 |
| B2-1 | – | – | 3 | 221 | a1 |
| B2-2 | – | – | 4 | 228 | a2 |
| B2-3 | – | – | 5 | 228 | a2 |
| C1-1 | ○ | ○ | 6 | 228 | b1 |
| C1-2 | ○ | ○ | 7 | 232 | b2 |
| C1-3 | ○ | ○ | 8 | 232 | b2 |

(b)

| DISTRIBUTION PATTERN | MIXED BUNDLE | EQUALITY | PROCESS NUMBER | ESTIMATED TIME (SECONDS) | TEMPORARY RANK |
|---|---|---|---|---|---|
| A3a | – | ○ | 1 | 228 | a2 |
| A3 | – | ○ | 2 | 228 | a3 |
| B2-1 | – | – | 3 | 221 | a1 |
| B2-2 | – | – | 4 | 228 | a3 |
| B2-3 | – | – | 5 | 228 | a3 |
| C1-1 | ○ | ○ | 6 | 228 | b1 |
| C1-2 | ○ | ○ | 7 | 232 | b2 |
| C1-3 | ○ | ○ | 8 | 232 | b2 |

(c)

| DISTRIBUTION PATTERN | MIXED BUNDLE | EQUALITY | PROCESS NUMBER | ESTIMATED TIME (SECONDS) | TEMPORARY RANK |
|---|---|---|---|---|---|
| A3a | – | ○ | 1 | 228 | a2 |
| A3 | – | ○ | 2 | 228 | a3 |
| B2-1 | – | – | 3 | 221 | a1 |
| B2-2 | – | – | 4 | 228 | a4 |
| B2-3 | – | – | 5 | 228 | a4 |
| C1-1 | ○ | ○ | 6 | 228 | b1 |
| C1-2 | ○ | ○ | 7 | 232 | b2 |
| C1-3 | ○ | ○ | 8 | 232 | b2 |

(d)

| DISTRIBUTION PATTERN | MIXED BUNDLE | EQUALITY | PROCESS NUMBER | ESTIMATED TIME (SECONDS) | TEMPORARY RANK |
|---|---|---|---|---|---|
| A3a | – | ○ | 1 | 228 | a2 |
| A3 | – | ○ | 2 | 228 | a3 |
| B2-1 | – | – | 3 | 221 | a1 |
| B2-2 | – | – | 4 | 228 | a4 |
| B2-3 | – | – | 5 | 228 | a5 |
| C1-1 | ○ | ○ | 6 | 228 | b1 |
| C1-2 | ○ | ○ | 7 | 232 | b2 |
| C1-3 | ○ | ○ | 8 | 232 | b3 |

(e)

| DISTRIBUTION PATTERN | MIXED BUNDLE | EQUALITY | PROCESS NUMBER | ESTIMATED TIME (SECONDS) | RANK |
|---|---|---|---|---|---|
| A3a | – | ○ | 1 | 228 | 2 |
| A3 | – | ○ | 2 | 228 | 3 |
| B2-1 | – | – | 3 | 221 | 1 |
| B2-2 | – | – | 4 | 228 | 4 |
| B2-3 | – | – | 5 | 228 | 5 |
| C1-1 | ○ | ○ | 6 | 228 | 6 |
| C1-2 | ○ | ○ | 7 | 232 | 7 |
| C1-3 | ○ | ○ | 8 | 232 | 8 |

FIG.21

(a) RECOMMEND INFORMATION Db

| Db1 | Db2 | Db3 | Db4 | Db5 | Db6 |
|---|---|---|---|---|---|
| BUNDLE ID | SORTING PATTERN | SETTING PATTERN | DISTRIBUTION PATTERN | ESTIMATED TIME | RANK |

(b)

| Db1 | Db2 | Db3 | Db4 | Db5 | Db6 |
|---|---|---|---|---|---|
| aaa | SORT BY DENOMINATION | B2 | P1(X),P2(X),P3(Y),P4(Z) | 221 SECONDS | 1 |
| aaa | SORT BY DENOMINATION | A3a | P1(1st),P2(2nd),P3(3rd) | 228 SECONDS | 2 |
| aaa | SORT BY DENOMINATION | A3 | P1(X),P2(Y),P3(Z) | 228 SECONDS | 3 |
| aaa | SORT BY FRONT-SIDED/BACK-SIDED | A3 | P1(FRONT), P2(BACK) | ⋮ | 1 |
| aaa | SORT BY FRONT-SIDED/BACK-SIDED | ⋮ | ⋮ | ⋮ | 2 |
| aaa | SORT BY FRONT-SIDED/BACK-SIDED | ⋮ | ⋮ | ⋮ | 3 |
| aaa | SORT BY ORIENTATION | A3 | P1(UP), P2(DOWN) | ⋮ | 1 |
| aaa | SORT BY ORIENTATION | ⋮ | ⋮ | ⋮ | 2 |
| aaa | SORT BY ORIENTATION | ⋮ | ⋮ | ⋮ | 3 |

FIG.22
(a)
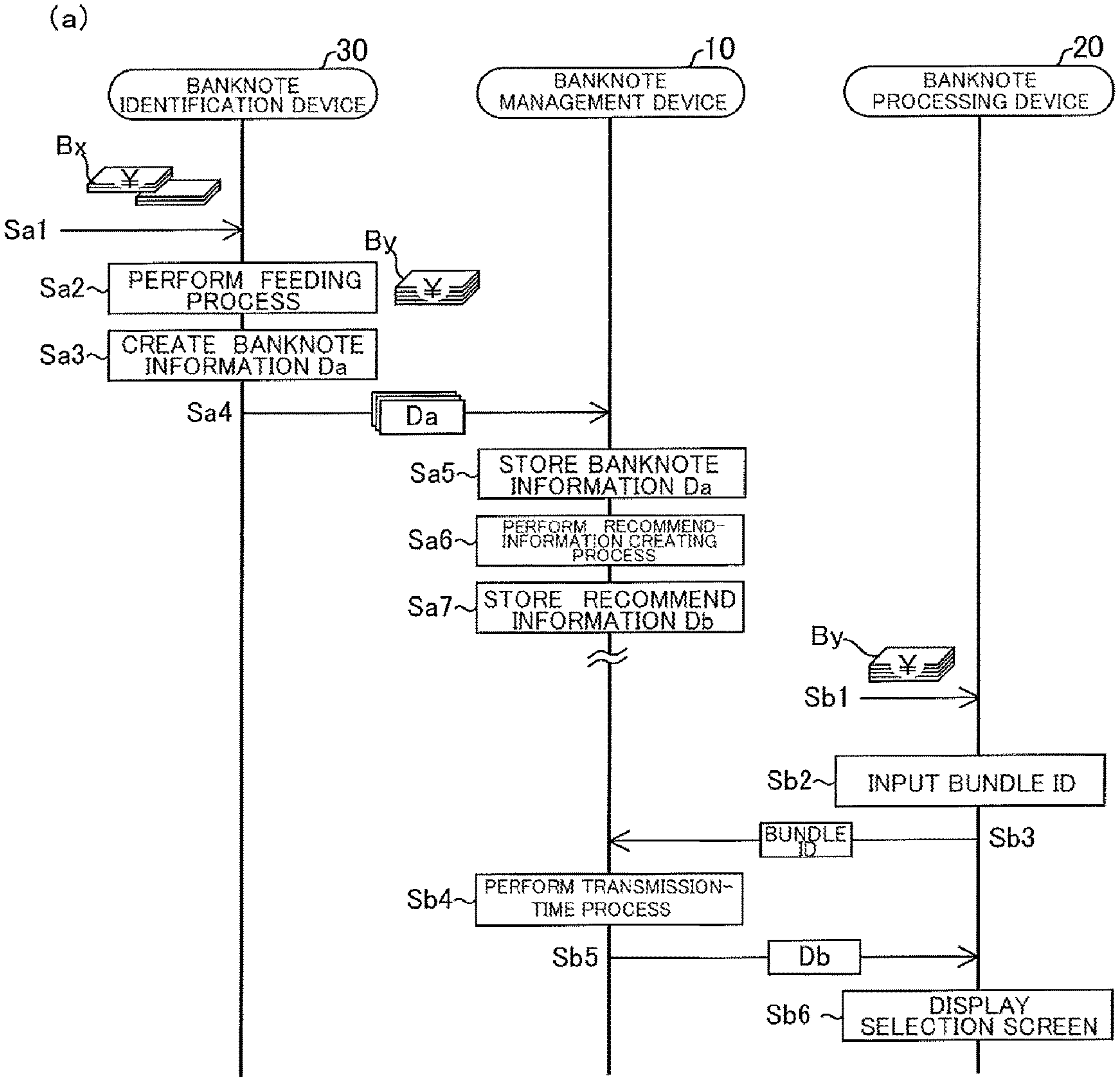
(b)
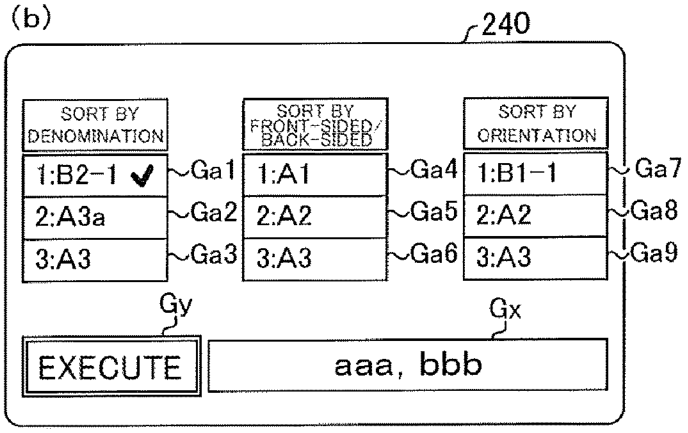

PAPER SHEET PROCESSING SYSTEM, PAPER SHEET PROCESSING METHOD, AND PROGRAM

RELATED APPLICATIONS

This application is the U.S. National Phase of and claims priority to International Patent Application No. PCT/JP2022/010386, International Filing Date Mar. 9, 2022, entitled Paper Sheet Processing System, Paper Sheet Processing Method, And Program; which claims benefit of and priority to JP 2021-060435 filed Mar. 31, 2021, both of which are incorporated herein by reference in their entireties.

FIELD

The present invention relates to a paper sheet processing system, a paper sheet processing method, and a program.

BACKGROUND

Conventionally, there have been proposed various technologies for preventing theft of paper sheets (for example, banknotes) from a paper sheet handling device such as a deposit device. For example, in Patent Literature 1, a technology that, when a foul play is detected, ink is sprayed on paper sheets stored in a deposit device to stain them is disclosed.

CITATION LIST

Patent Literature

Patent Literature 1: Japanese Patent Application Laid-open No. 2012-252479

SUMMARY

Technical Problem

With the technology of Patent Literature 1, theft of paper sheets stored in a deposit device is prevented. However, paper sheets may be stolen (may be lost) even during transport thereof when the paper sheets are not stored in the deposit device. Therefore, with the technology of Patent Literature 1, there are cases where theft of paper sheets cannot be fully prevented. In consideration of such circumstances, an object of the present invention is to fully prevent theft of paper sheets.

Solution to Problem

In order to achieve the above object, a paper sheet processing system according to the present invention is a paper sheet processing system comprising: a paper sheet processing device that counts number of paper sheets; and a paper sheet management device that is communicable with the paper sheet processing device, wherein the paper sheet processing device includes an acquiring unit that acquires paper sheet identification information uniquely identifying the paper sheets from corresponding paper sheets, and a transmission unit that transmits the acquired paper sheet identification information to the paper sheet management device, and the paper sheet management device includes a reception unit that receives the paper sheet identification information, a specifying unit that specifies the paper sheet identification information of lost ones among the paper sheets, and a notification unit that notifies the paper sheet identification information specified by the specifying unit to an external device.

Advantageous Effects of Invention

According to the present invention, since paper sheet identification information of lost paper sheets is notified to an external device (for example, a deposit device), for example, when paper sheet identification information of paper sheets inserted into the external device and paper sheet identification information notified from a paper sheet management device match each other, reception of these paper sheets at the external device can be prohibited. Accordingly, regardless of whether paper sheets are stored in a deposit device, theft of these paper sheets is prevented.

BRIEF DESCRIPTION OF DRAWINGS

FIG. 12 are explanatory diagrams of specific examples of setting information in the second embodiment.

FIG. 17 are explanatory diagrams of specific examples of setting patterns in the third embodiment.

FIG. 18 are explanatory diagrams of specific examples of a deciding method of a setting pattern in the third embodiment.

FIG. 19 are explanatory diagrams of specific examples of a calculation method of an estimated time in the third embodiment.

FIG. 20 are explanatory diagrams of specific examples of a ranking process in the third embodiment.

FIG. 21 are explanatory diagrams of specific examples of recommend information in the third embodiment.

FIG. 22 are system sequence diagrams for explaining operations of the banknote processing system according to the third embodiment.

DESCRIPTION OF EMBODIMENTS

First Embodiment

Figure 1:
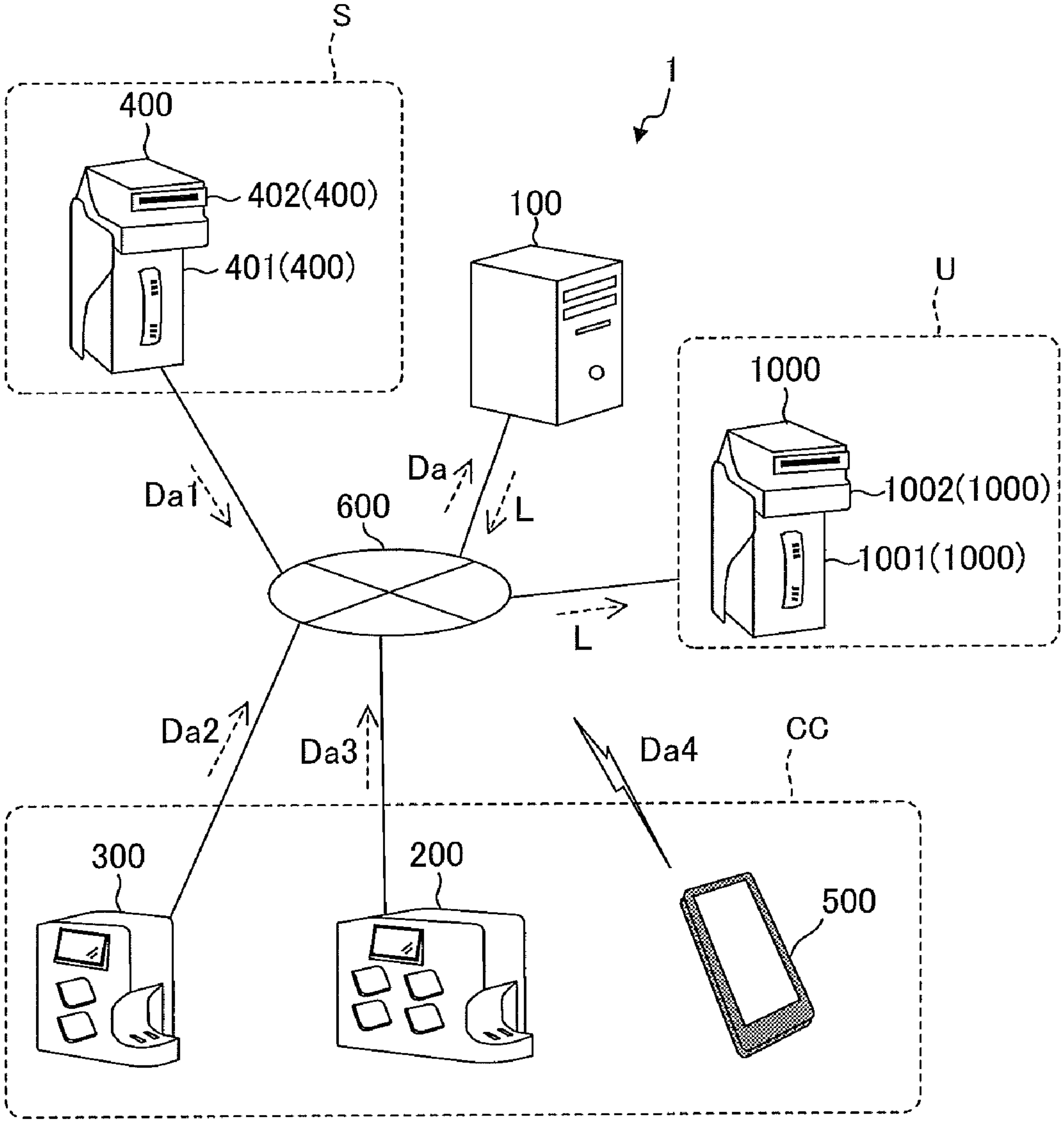
FIG. 1 is an explanatory diagram of respective configurations of a banknote processing system.

FIG. 1 is an explanatory diagram of respective configurations of a banknote processing system 1 according to the present embodiment. As illustrated in FIG. 1, the banknote processing system 1 is configured to include a banknote management server 100, a sorting device 200, a deposit device 300, a receiving device 400, and an input device 500.

Each of the banknote management server 100, the sorting device 200, the deposit device 300, the receiving device 400, and the input device 500 includes a processor and a memory. For example, a CPU (Central Processing Unit) is employed as the processor and the processor executes programs stored in the memory. For example, a DRAM (Dynamic Random Access Memory), an SRAM (Static Random Access Memory), or a flash memory is employed as the memory and the memory stores therein programs executed by the processor.

As illustrated in FIG. 1, the banknote management server 100 is communicably connected to the sorting device 200 via a network 600. The banknote management server 100 is also communicably connected to the deposit device 300 via the network 600. Similarly, the banknote management server 100 is communicably connected to the receiving device 400 and the input device via the network 600. For example, any of the Internet, a dedicated network, a VPN (Virtual Private Network), and a local network may be employed as the network 600. Further, the network 600 may be a combination of these networks. In addition, any of wired communication and wireless communication may be employed for the network 600.

The receiving device 400 is installed at a store S and counts, for example, the number of banknotes received from a customer. In the present embodiment, a banknote bundle Bx is formed by the receiving device 400 and the banknote bundle Bx is transported to a cash center CC. Specifically, the receiving device 400 is configured to include a cassette 401 and a main body 402. Banknotes inserted into an inlet of the main body 402 are stacked in the cassette 401 as a banknote bundle Bx. The cassette 401 is detachable from the main body 402. When the banknote bundle Bx is transported to the cash center CC, the banknote bundle Bx is transported in a state of being stored in the cassette 401 (see FIG. 3(*a*) described later).

When banknotes are received, the receiving device 400 performs an identification process on the banknotes and acquires various pieces of information including the serial number, denomination, orientation, fitness, and authenticity thereof. Further, the receiving device 400 creates banknote information Da1 including various pieces of information acquired from each banknote in the banknote bundle Bx (see FIG. 3(*b*) described later). Further, the receiving device 400 transmits the banknote information Da1 to the banknote management server 100.

The deposit device 300 is provided at the cash center CC. The number of banknotes (banknote bundles Bx) transported to the cash center CC is counted by the deposit device 300. As illustrated in FIG. 1, the deposit device 300 includes a placing portion and two stacking portions. When a banknote bundle Bx is placed on the placing portion, each banknote in the banknote bundle Bx is sequentially fed and distributed to any of the stacking portions. The deposit device 300 sequentially feeds plural banknotes and counts the number of the fed banknotes. Further, when a banknote is fed, the deposit device 300 acquires various pieces of information from this banknote. Specifically, when a banknote is fed, the deposit device 300 captures an image of this banknote and specifies the serial number of this banknote from this image.

A serial number is a character string that can uniquely specify a certain banknote. For example, the deposit device 300 performs OCR (Optical character recognition) processing on an image of a banknote to identify the serial number of the banknote. Further, when a banknote is fed, the deposit device 300 identifies the denomination of the banknote. In the present embodiment, a banknote bundle B may include banknotes of six denominations such as a denomination X, a denomination Y, a denomination Z, and so on. Further, when a banknote is fed, the deposit device 300 identifies the orientation (up-sided or down-sided and front-sided or back-sided) of the banknote, whether the banknote is an unfit note (fitness), and whether the banknote is a counterfeit note (authenticity).

The deposit device 300 distributes banknotes to stacking portions P according to identification results of these banknotes. A banknote bundle By is formed of the banknotes distributed by the deposit device 300 (see FIG. 4(*a*) described later). Further, the deposit device 300 creates banknote information Da2 including pieces of information acquired from each banknote in the banknote bundle By (see FIG. 4(*b*) described later). The banknote information Da2 is transmitted to the banknote management server 100 by the deposit device 300.

The sorting device 200 is provided at the cash center CC and sorts each of banknotes in the banknote bundle By formed by the deposit device 300. Specifically, the sorting device 200 includes a placing portion and plural (for example, four) stacking portions. When a banknote bundle By is placed on the placing portion, each banknote included in the banknote bundle By is distributed to any of the stacking portions. Specifically, among the banknotes in the banknote bundle By, respective banknotes of the same denomination are distributed to the same stacking portion, and plural banknote bundles Bz are formed (see FIG. 5(*a*) described later).

Similarly to the deposit device 300 and the receiving device 400, when banknotes are sorted, the sorting device 200 identifies these banknotes and acquires various pieces of information including the serial number, denomination, orientation, fitness, and authenticity thereof. Further, the sorting device 200 counts the number of banknotes to be sorted. Furthermore, the sorting device 200 creates banknote information Da3 including various pieces of information acquired from each banknote (see FIG. 5(*b*) described later).

The banknotes sorted by the sorting device 200 are dispensed to a predetermined dispensing destination U. Specifically, a deposit and dispense device 1000 is provided at the dispensing destination U. As the dispensing destination U, a store is assumed. As the deposit and dispense device 1000, a device with which customers' banknotes are deposited and dispensed is assumed. The deposit and dispense device 1000 is configured to include a cassette 1001 and a main body 1002. Banknotes inside the cassette 1001 can be dispensed and banknotes can be deposited inside the cassette 1001 through an inlet of the main body 1002.

The cassette 1001 of the deposit and dispense device 1000 is detachable from the main body 1002. When banknotes are transported from the cash center CC, the cassette 1001 is carried to the cash center CC. Thereafter, banknote bundles Bz sorted by the sorting device 200 are stored in the cassette 1001 and the cassette 1001 having stored the banknote bundles Bz therein is transported from the cash center CC to the dispensing destination U (see FIG. 6(*a*) described later).

Meanwhile, for example, during transport from the cash center CC to the dispensing destination U, there is a risk that banknotes (the cassette 1001) are stolen. In consideration of such circumstances, in the banknote processing system 1 according to the present embodiment, a configuration to prevent theft of banknotes during transport is employed.

Specifically, when a banknote bundle Bz is dispensed from the cash center CC, the serial number of the banknote bundle Bz is input to the input device 500. The serial number input to the input device 500 is transmitted to the banknote management server 100 and registered as a serial number of dispensed banknotes. For example, a portable computer is employed as this input device 500. Further, the input device 500 can capture an image of the serial number of a banknote and identifies the serial number of this banknote from this image with OCR processing and inputs the result of identification therein.

A fact that the cassette 1001 has been stolen is notified to the banknote management server 100. When the fact that the cassette 1001 has been stolen is notified, the banknote management server 100 specifies, among serial numbers of registered banknotes, the serial numbers of banknotes stored in the cassette 1001. Further, the banknote management server 100 notifies a lost banknote list L including the specified serial numbers to other deposit and dispense devices (for example, the deposit and dispense device 1000). In the deposit and dispense devices having the lost banknote list L notified thereto, for example, reception of banknotes of serial numbers included in this lost banknote list L is prohibited.

Figure 2:
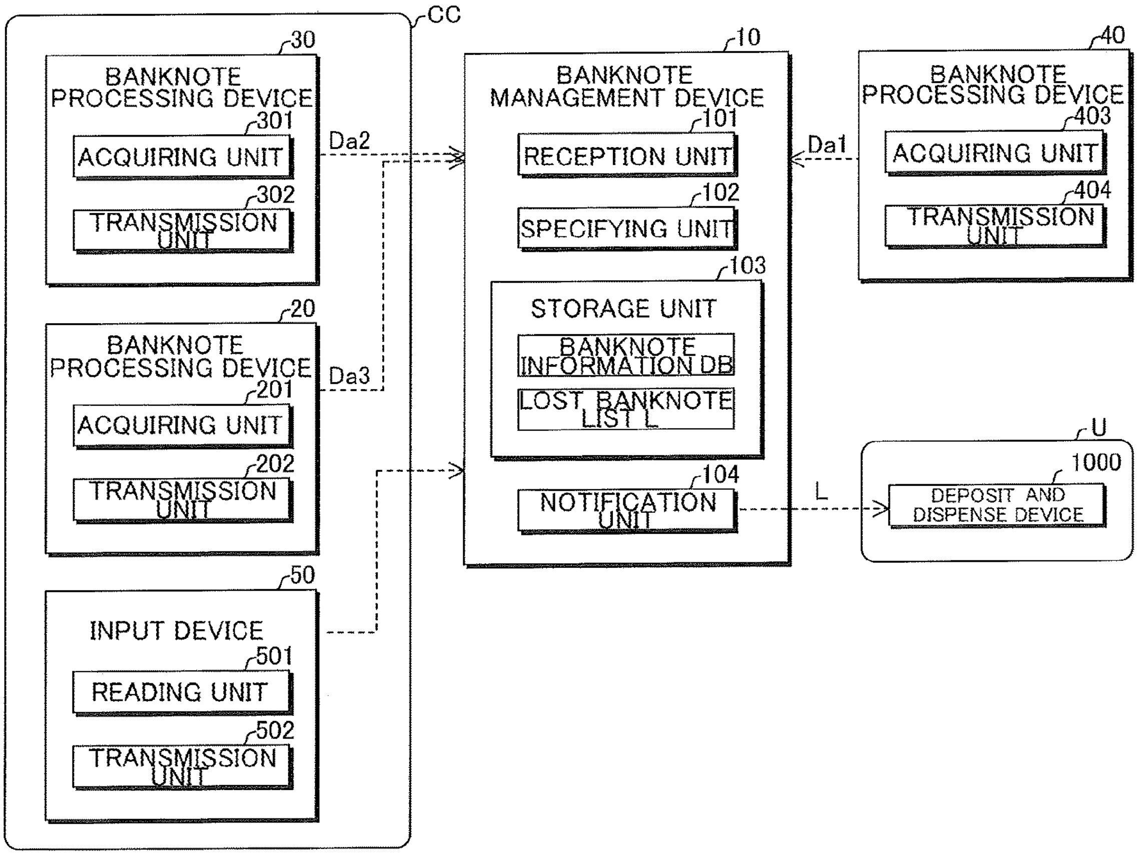
FIG. 2 is a functional block diagram of the banknote processing system.

FIG. 2 is a functional block diagram of the banknote processing system 1 according to the present embodiment. As illustrated in FIG. 2, the banknote processing system 1 is configured to include a banknote management device 10, a banknote processing device 20, a banknote processing device 30, a banknote processing device 40, and an input device 50. For example, as respective CPUs of the banknote management server 100, the sorting device 200, the deposit device 300, the receiving device 400, and the input device 500 described above execute programs, respective functions are realized. Specifically, the banknote management server 100 described above functions as the banknote management device 10. Further, the sorting device 200 functions as the banknote processing device 20, the deposit device 300 functions as the banknote processing device 30, the receiving device 400 functions as the banknote processing device 40, and the input device 500 functions as the input device 50.

Each of the banknote processing devices (20, 30, and 40) counts the number of banknotes. Specifically, the banknote processing device 40 (the receiving device 400) includes an acquiring unit 403 and a transmission unit 404. The acquiring unit 403 acquires a serial number (an example of paper sheet identification information) that uniquely identifies a banknote from the banknotes. Further, the transmission unit 404 transmits banknote information Da1 including the serial number acquired by the acquiring unit 403 to the banknote management device 10.

The banknote processing device 30 (the deposit device 300) is provided at the cash center CC and includes an acquiring unit 301 and a transmission unit 302. The acquiring unit 301 acquires a serial number from a banknote. Further, the transmission unit 302 transmits banknote information Da2 including the serial number acquired by the acquiring unit 301 to the banknote management device 10. Similarly to the banknote processing device 300, the banknote processing device 20 (the sorting device 200) is provided at the cash center CC and includes an acquiring unit 201 and a transmission unit 202. The acquiring unit 201 acquires a serial number from a banknote. Further, the transmission unit 202 transmits banknote information Da3 including the serial number acquired by the acquiring unit 201 to the banknote management device 10.

The banknote management device 10 is configured to include a reception unit 101, a specifying unit 102, a storage unit 103, and a notification unit 104. The reception unit 101 receives respective pieces of banknote information Da (1, 2, 3) from respective banknote processing devices (20, 30, 40). Each banknote information Da received by the reception unit 101 is accumulated in a banknote information DB (DataBase) of the storage unit 103. The specifying unit 102 specifies the serial numbers of lost banknotes.

Specifically, banknotes are bundled with one another in a predetermined dispensing unit and transported. For example, banknotes are bundled with one another in the cassette 1001 and transported from the cash center CC to the dispensing destination U. The banknote management device 10 stores serial numbers of respective banknotes bundled with one another and transported as the serial numbers are associated with a dispensing unit ID specifying a common dispensing unit (see FIG. 6(*b*) described later). It is also possible to configure that banknotes at each store are stored in a bag or the like and transported to the cash center CC. In this case, a common dispensing unit ID is given to the banknotes stored in the same bag.

When banknotes transported in a predetermined dispensing unit are stolen (lost), lost banknote information Dx is transmitted to the banknote management device 10 (see FIG. 7(*a*) described later). This lost banknote information Dx includes a dispensing unit ID specifying this dispensing unit. Upon reception of the lost banknote information Dx, the specifying unit 102 of the banknote management device 10 searches the storage unit 103 for the dispensing unit ID included in this lost banknote information Dx. Further, the specifying unit 102 specifies a serial number corresponding to the searched dispensing unit ID as the serial number of the lost banknotes.

The input device 50 includes a reading unit 501 and a transmission unit 502. The reading unit 501 reads the serial number of a part of (for example, one banknote) banknotes forming a banknote bundle. Further, the transmission unit 502 transmits the read serial number to the banknote management device 10. Upon reception of the serial number from the transmission unit 502, the banknote management device 10 specifies a bundle ID of the banknote bundle in which the banknote of this serial number is included. Further, the banknote management device 10 gives the same dispensing unit ID to each of all serial numbers (serial numbers of banknotes included in this banknote bundle) stored while being associated with the specified bundle ID. This configuration is described in detail with reference to FIG. 6(*a*).

Figure 3:
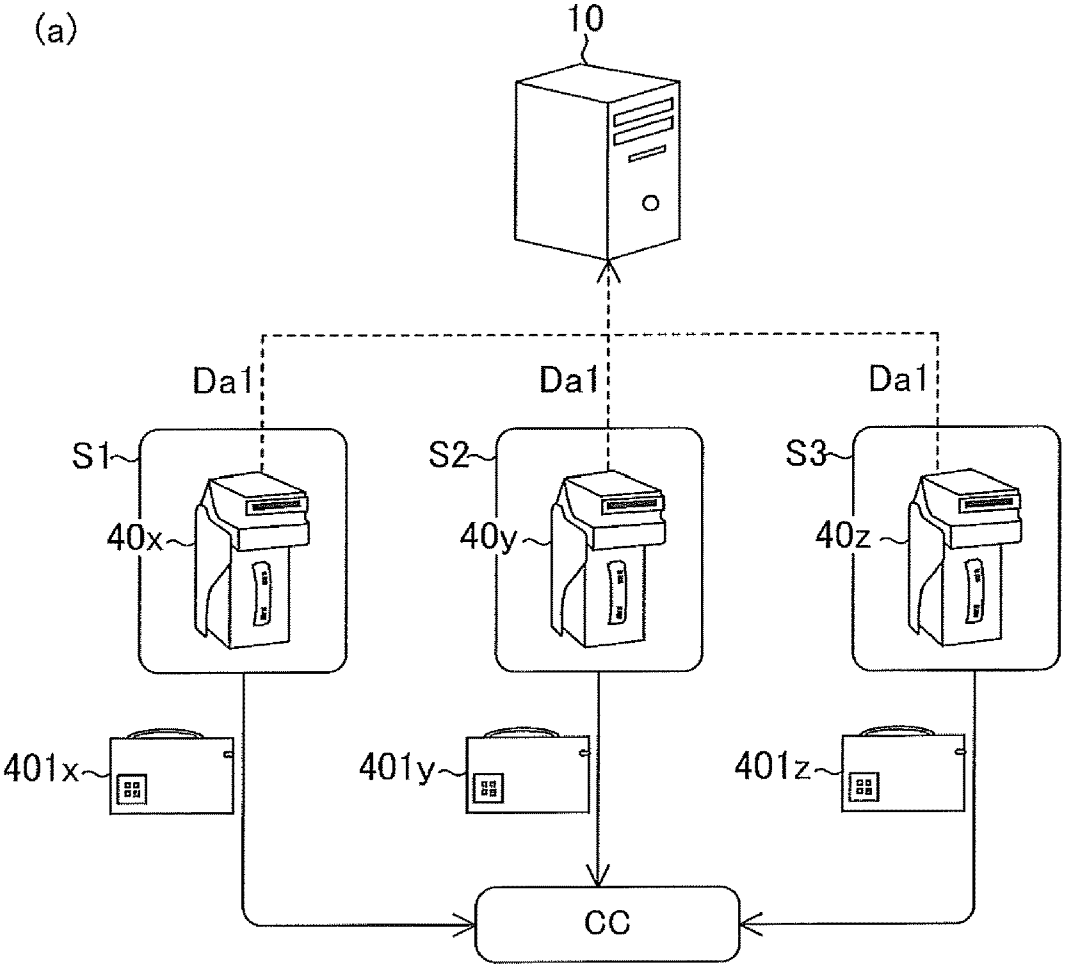
FIG. 3 are explanatory diagrams of a specific example of a process of transporting banknotes to a cash center.
Figure 4:
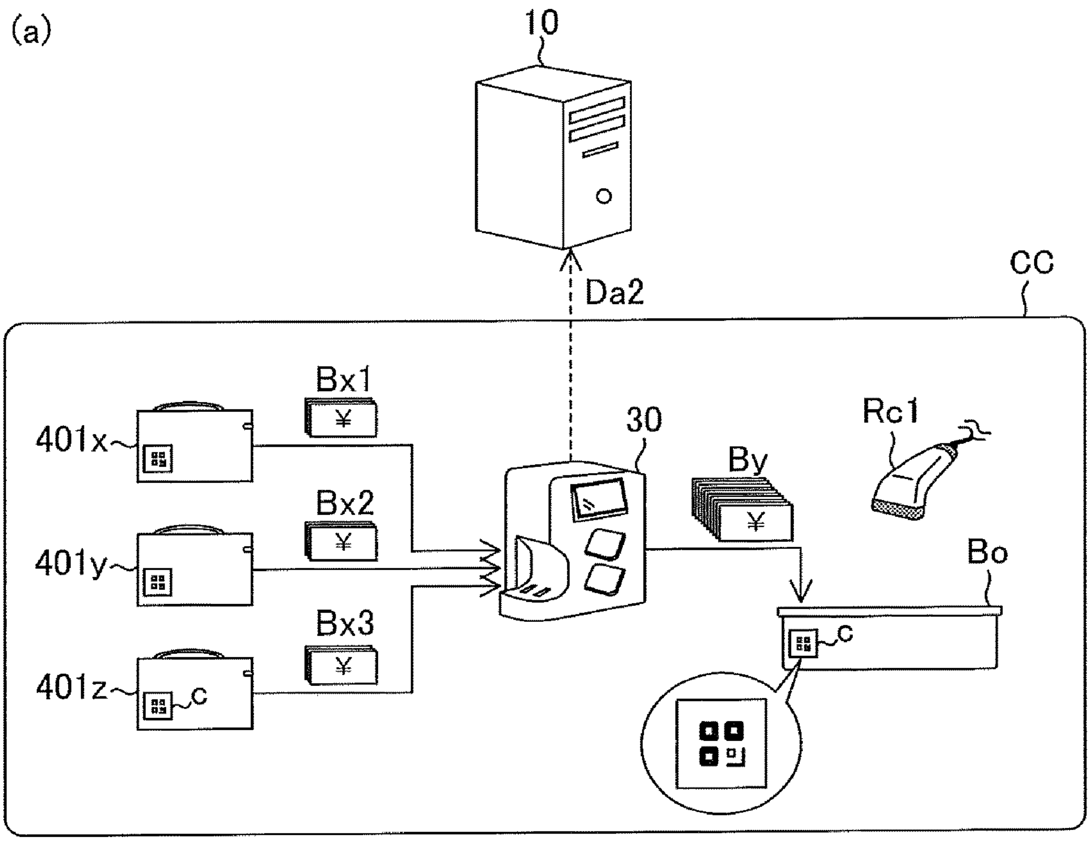
FIG. 4 are explanatory diagrams of a specific example of a depositing process at the cash center.
Figure 5:
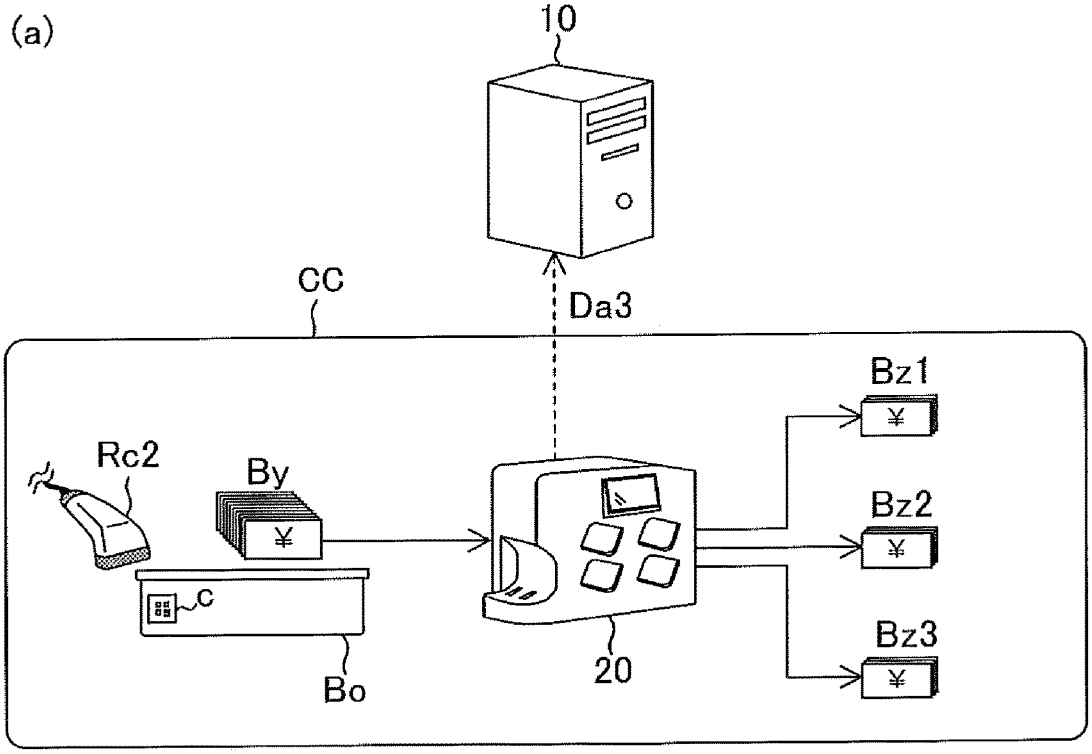
FIG. 5 are explanatory diagrams of a specific example of a sorting process at the cash center.
Figure 6:
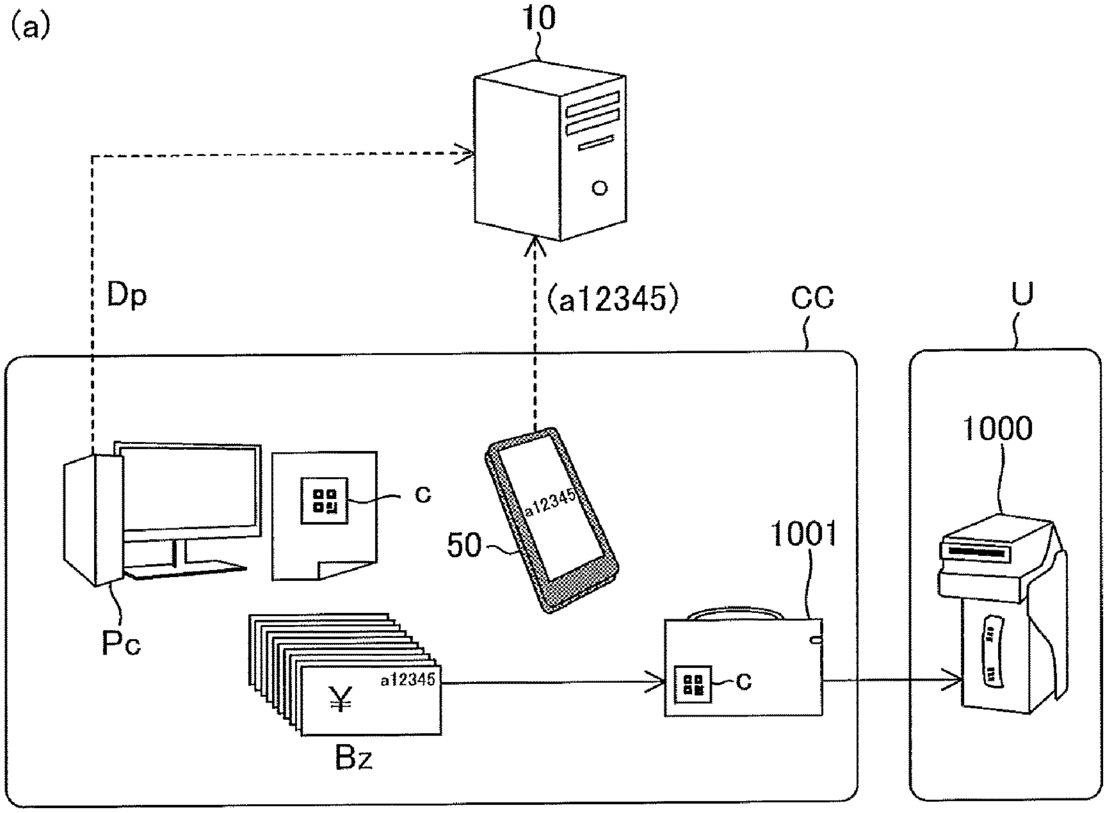
FIG. 6 are explanatory diagrams of a specific example of a dispensing process at the cash center.

With reference to FIG. 3(*a*), FIG. 4(*a*), FIG. 5(*a*), and FIG. 6(*a*), each process of transporting banknotes from respective stores S to the cash center CC and then dispensing the banknotes from the cash center CC to the dispensing destination U is described. FIG. 3(*a*) is an explanatory diagram of a process in which banknotes are transported from respective stores S (1 to 3) to the cash center CC.

In the specific example of FIG. 3(*a*), a case where one banknote processing device 40 (x to z) is respectively provided in each of the three stores S (1 to 3) is assumed. In this case, three cassettes 401 (x to z) are transported to the cash center CC. Further, banknote information Da1 is transmitted from the three banknote processing devices 40 to the banknote management device 10. In the present embodiment, when the cassette 401 is detached from the banknote processing device 40, the banknote information Da1 is automatically transmitted to the banknote management device 10. Note that the timing of transmitting the banknote information Da1 can be changed accordingly. Further, the number of stores S where the banknote processing device 40 is provided may be one or two, or four or more. Furthermore, plural banknote processing devices 40 may be provided at one store S.

FIG. 3(*b*) is a conceptual diagram of a specific example of the banknote information Da1 transmitted from the banknote processing device 40 at the store S. The banknote processing device 40 creates one piece of banknote information Da1 with respect to one banknote. That is, when N banknotes are stored in the banknote processing device 40, N pieces of banknote information Da1 are created. It is also possible to configure that the banknote management device 10 creates the banknote information Da1. In this configuration, information required for creating the banknote information Da1 is transmitted from the banknote processing device 40 to the banknote management device 10.

The banknote information Da1 is configured to include a bundle ID, a serial number, and a depositing unit ID. The bundle ID is information identifying a banknote bundle Bx stored in the cassette 401. Specifically, bundle IDs of respective banknotes in a common cassette 401 are mutually the same. For example, banknote IDs of respective banknotes in a cassette 401*x* are mutually the same as “aaa”. Further, banknote IDs of respective banknotes in a cassette 401*y* are “bbb” and banknote IDs of respective banknotes in a cassette 401*z* are “ccc”. The serial number in the banknote information Da1 is the serial number of a banknote stored in the cassette 401 and is acquired when this banknote is stored in the banknote processing device 40.

The depositing unit ID in the banknote information Da1 is information identifying a bundle of banknotes transported at one time. In the present embodiment, the banknotes stored in the same cassette 401*x* are bundled with one another and transported. Therefore, depositing unit IDs of respective banknotes in the same cassette 401 are the same. For example, when the cassette 401*x* is transported from the store S1, the depositing unit IDs of respective banknotes stored in this cassette 401*x* are mutually the same as “ssss”. Similarly, when the cassette 401*y* is transported from the store S2, the depositing unit IDs of respective banknotes stored in this cassette 401*y* are mutually the same as “tttt”. When the cassette 401*z* is transported from the store S3, the depositing unit IDs of the respective banknotes stored in the cassette 401*z* are mutually the same as “uuuu”. For example, the depositing unit ID is decided by the banknote processing device 40. Note that it is also possible to configure that the depositing unit ID is decided by the banknote management device 10 and the decided depositing unit ID is notified to the banknote processing device 40.

When plural cassettes 401 are transported at one time from one store S, the depositing unit IDs of respective banknotes stored in the plural cassettes 401 are mutually the same. Note that, in this case, it is possible to configure that the depositing unit IDs of the respective banknotes are different from one another for every cassette 401. While the details thereof will be described later, the depositing unit ID in the banknote information Da1 is referred to when banknotes (the cassette 401) are lost on the way from the store S to the cash center CC so as to specify the banknotes.

The pieces of information included in the banknote information Da1 are not limited to the examples described above. For example, the banknote information Da1 may include a processing device ID identifying the banknote processing device 40, information identifying the method of transporting banknotes (such as a method of transporting banknotes as the banknotes are stored in a cassette), a total number of banknotes to be transported, and a dispensing destination ID identifying the transport destination of banknotes (the cash center CC). Further, the banknote information Da1 may also include information identifying the orientations and denominations of banknotes, the time and date of transporting the cassette 401 (of the cassette 401 being detached from the main body 402), and banknote fitness. Further, the banknote information Da1 may also include a staff ID identifying the staff who transports this cassette 401 and an image and name of the staff.

FIG. 4(*a*) is an explanatory diagram of a part of processes at the cash center CC. The processes at the cash center CC include a depositing process, a sorting process, and a dispensing process. FIG. 4(*a*) is an explanatory diagram of a specific example of the depositing process. In the depositing process, the number of banknotes in banknote bundles Bx having been transported from each of the stores S is counted by the banknote processing device 30 (the depositing device 300). Further, when the number of banknotes is counted, the banknote processing device 30 acquires various pieces of information including serial numbers of the banknotes.

In the specific example of FIG. 4(*a*), a case where three cassettes 401 (x to z) are transported to the cash center CC is assumed. Further, there is assumed a case where the respective banknotes of three banknote bundles Bx (1 to 3) taken out from the three cassettes 401 are bundled with one another and the number of the banknotes is counted by the banknote processing device 30. In this case, one banknote bundle By including the banknotes in the three banknote bundles Bx is formed. As illustrated in FIG. 4(*a*), a banknote bundle By formed in the depositing process is temporarily stored in a returnable box Bo.

As illustrated in FIG. 4(*a*), a code c is provided to the cassettes 401 (x to z) and the returnable box Bo. This code c is a two-dimensional code, for example, and is readable with a reader Rc1. When the reader Rc1 reads the code c of the cassettes 401, bundle IDs of banknote bundles Bx stored in the cassettes 401 are input to the banknote processing device 30. For example, a case where a banknote bundle Bx1 having a bundle ID “aaa” is stored in the cassette 401*x* is assumed. In this case, when the code c of the cassette 401*x* is read, the bundle ID “aaa” is input to the banknote processing device 30. In the specific example of FIG. 4(*a*), the code c of the three cassettes 401 (x to z) is read and three bundle IDs are input to the banknote processing device 30.

When the reader Rc1 reads the code c of the returnable box Bo, for example, a bundle ID (an output bundle ID) identifying a banknote bundle By to be stored in this returnable box Bo is input to the banknote processing device 30. The configuration to input these pieces of information (the bundle ID of the banknote bundle Bx and the bundle ID of the banknote bundle By) to the banknote processing device 30 is not limited to the example described above. For example, it is also possible to configure that these pieces of information are manually input to the banknote processing device 30 with an operation on a numeric keypad or the like. The banknote processing device 30 uses information acquired from each banknote (a serial number, for example) and various pieces of information input thereto with the reader Rc1 to create the banknote information Da2. Further, the banknote processing device 30 transmits the banknote information Da2 to the banknote management device 10.

Upon reception of the banknote information Da2 from the cash center CC (the banknote processing device 30), the banknote management device 10 determines whether each serial number included in this banknote information Da2 is included in the banknote information Da1 received from each store S (the banknote processing device 40). That is, whether the number of all banknotes transported from each store S has been counted at the cash center CC is determined. If a specific serial number in the banknote information Da2 is not included in the respective serial numbers in the banknote information Da1, a fact that the banknote of this specific serial number is lost during transport is ascertained.

However, for example, depending on the performance of the banknote processing device 40 at a store S, there is a case where serial numbers of banknotes are not read correctly. In this case, even if the number of all banknotes transported from each store S is counted at the cash center CC, it is determined that the specific serial number in the banknote information Da2 is not included in the respective serial numbers of the banknote information Da1.

In consideration of such circumstances, it is possible to employ a configuration in which, even in a case where the serial number in the banknote information Da1 and the serial number in the banknote information Da2 do not match each other, when predetermined criteria are satisfied, it is determined that these serial numbers match each other. For example, there are circumstances that a letter "J" tends to be read as a letter "I". In consideration of such circumstances, even in a case where the serial number in the banknote information Da1 and the serial number in the banknote information Da2 do not match each other, as far as the serial number in the banknote information Da2 having its letter "J" switched to a letter "I" matches the serial number in the banknote information Da1, the banknote management device 10 determines that these serial numbers match each other.

While the details thereof are described in a second embodiment, the banknote processing device 30 (the banknote identification device 30) can set the banknote identification strength of variable. Further, before counting the number of banknotes in a banknote bundle Bx, the banknote processing device 30 transmits a bundle ID of this banknote bundle Bx to the banknote management device 10. The banknote management device 10 specifies banknote information Da1 including the bundle ID of the received banknote bundle Bx and decides an appropriate identification strength based on this banknote information Da1. The identification strength decided by the banknote management device 10 is notified to the banknote processing device 30. According to this configuration, an appropriate identification strength is easily set in the banknote processing device 30. Further, the banknote information Da1 is also referred to when the lost banknote list L is created. Therefore, for example, there is an advantage that the number of types of information to be stored can be reduced as compared to a configuration in which information for creating the lost banknote list L and information for deciding the identification strength of the banknote processing device 30 are stored separately.

FIG. 4(*b*) is a conceptual diagram of a specific example of the banknote information Da2 transmitted from the banknote processing device 30 at the cash center CC. The banknote processing device 30 creates one piece of banknote information Da2 with respect to one banknote. That is, when N banknotes are received in the banknote processing device 30, N pieces of banknote information Da2 are created. It is also possible to configure that the banknote management device 10 creates the banknote information Da2. In this configuration, information required for creating the banknote information Da2 is transmitted from the banknote processing device 30 to the banknote management device 10.

The banknote information Da2 is configured to include an input bundle ID, a serial number, and an output bundle ID. The serial number included in the banknote information Da2 is the serial number of a banknote included in a banknote bundle By and is read from this banknote by the banknote processing device 30. The input bundle ID included in the banknote information Da2 represents a bundle ID input to the banknote processing device 30 by reading the code c of the cassettes 401 with the reader Rc1 in the depositing process. For example, in the specific example of FIG. 4(*b*), a case where three bundle IDs (aaa, bbb, ccc) are input to the banknote processing device 30 in the depositing process is assumed. In this case, input bundle ID included in respective pieces of banknote information Da2 are in array of the three bundle IDs. The output bundle ID included in the banknote information Da2 represents a bundle ID input to the banknote processing device 30 by reading the code c of the returnable box Bo with the reader Rc1 in the depositing process. That is, the output bundle ID included in the banknote information Da2 is the bundle ID of the banknote bundle By.

Note that the pieces of information included in the banknote information Da2 are not limited to the examples described above. For example, the banknote information Da2 may include a processing device ID identifying the banknote processing device 30 and a total number of sorted banknotes. Further, the banknote information Da2 may include the orientations and denominations of banknotes, the time and date of creating the banknote bundle By, and information identifying banknote fitness. Furthermore, the banknote information Da2 may also include a staff ID identifying the staff involved in the depositing process.

FIG. 5(*a*) is an explanatory diagram of a part of other processes at the cash center CC. FIG. 5(*a*) is an explanatory diagram of a specific example of the sorting process. The sorting process is a process subsequent to the depositing process and banknotes counted in the depositing process are sorted in the sorting process. In the sorting process of the present embodiment, respective banknotes in the banknote bundle By formed in the depositing process are distributed by each denomination by the banknote processing device 20 (the sorting device 200). When the banknotes are distributed, the banknote processing device 20 acquires various pieces of information including serial numbers of the banknotes. Further, the banknote processing device 20 counts the number of the distributed banknotes.

Specifically, in the sorting process, the returnable box Bo having stored therein the banknote bundle By in the depositing process described above is transported to the banknote processing device 20. Further, in the sorting process, the code c of the returnable box Bo is read with a reader Rc2. When the code c is read with the reader Rc2, a bundle ID identifying the banknote bundle By is input to the banknote processing device 20. In the specific example of FIG. 5(*a*), there is assumed a case where a bundle ID "ddd" (see FIG. 4(*b*)) input to the banknote processing device 30 as an output bundle ID in the depositing process is input to the banknote processing device 20 as an input bundle ID in the sorting process.

In the sorting process, the banknote bundle By is sorted and plural banknote bundles Bz are formed. In the specific example of FIG. 5(*a*), a case where three banknote bundles Bz (1 to 3) are formed from the banknote bundle By is assumed. Note that the configuration to input bundle IDs to the banknote processing device 20 is not limited to this example. For example, it is also possible to configure that bundle IDs are manually input to the banknote processing device 20 with an operation on a numeric keypad or the like. The banknote processing device 20 uses information acquired from each banknote (such as a serial number) and bundle IDs input with the reader Rc2 to create the banknote information Da3 and to transmit the created banknote information Da3.

While the details thereof are described in a third embodiment, the banknote processing device 20 can set a distribution pattern of banknotes (types of banknotes distributed to stacking portions) variable. Further, before sorting respective banknotes in the banknote bundle By, the banknote processing device 20 transmits a bundle ID of this banknote bundle By to the banknote management device 10. The banknote management device 10 specifies banknote information Da2 including the received bundle ID of the banknote bundle By and decides an appropriate distribution pattern based on this banknote information Da2. The distribution pattern decided by the banknote management device 10 is notified to the banknote processing device 20. According to this configuration, an appropriate distribution pattern is easily set in the banknote processing device 20.

FIG. 5(*b*) is a conceptual diagram of a specific example of the banknote information Da3 transmitted from the banknote processing device 20 at the cash center CC. The banknote processing device 20 creates one piece of banknote information Da3 with respect to one banknote. That is, when N banknotes are received in the banknote processing device 20, N pieces of banknote information Da3 are created. It is also possible to configure that the banknote management device 10 creates the banknote information Da3. In this configuration, information required for creating the banknote information Da3 is transmitted from the banknote processing device 20 to the banknote management device 10.

The banknote information Da3 is configured to include an input bundle ID, a serial number, and an output bundle ID. The serial number in the banknote information Da3 is the serial number of a banknote included in a banknote bundle Bz. The input bundle ID included the banknote information Da3 represents a bundle ID (the bundle ID of the banknote bundle By) input to the banknote processing device 20 in the sorting process. The output bundle ID included in the banknote information Da3 represents a bundle ID identifying the banknote bundle Bz. Specifically, the banknote processing device 20 gives a common bundle ID to each banknote in the same banknote bundle Bz. The banknote processing device 20 associates the serial number of banknotes in the banknote bundle Bz and the bundle ID of this banknote bundle Bz to create the banknote information Da3.

The pieces of information included in the banknote information Da3 are not limited to the examples described above. For example, the banknote information Da3 may include a processing device ID identifying the banknote processing device 20 and a total number of sorted banknotes. Further, the banknote information Da3 may include information identifying the orientations and denominations of banknotes, the time and date of creating the banknote bundle Bz, and banknote fitness. Furthermore, the banknote information Da3 may also include a staff ID identifying the staff involved in the sorting process.

FIG. 6(*a*) is an explanatory diagram of a part of other processes at the cash center CC. FIG. 6(*a*) is an explanatory diagram of a specific example of the dispensing process. The dispensing process is a process subsequent to the sorting process and a banknote bundle Bz formed in the sorting process is dispensed to another facility. In the specific example of FIG. 6(*a*), a case where the banknote bundle Bz is dispensed to the dispensing destination U in the dispensing process is assumed. As described above, the deposit and dispense device 1000 is provided at the dispensing destination U. In the dispensing process at the cash center CC, the banknote bundle Bz is stored in the cassette 1001 of the deposit and dispense device 1000 and the cassette 1001 is transported to the dispensing destination U.

In the present embodiment, in the dispensing process, respective banknotes in the banknote bundle Bz formed in the sorting process described above are registered in the banknote management device 10 as dispensed banknotes. Specifically, before the dispensing process, dispensing plan information Dp is transmitted from a computer Pc at the cash center CC to the banknote management device 10. A dispensing plan ID and a deposit source ID and a dispensing unit ID corresponding to this dispensing plan ID are included in this dispensing plan information Dp. The deposit source ID is information identifying the cash center CC. Further, the computer Pc creates a code c corresponding to the dispensing plan ID and makes it printable. When the input device 50 reads this code c, the dispensing plan ID is specified. The input device 50 transmits the specified dispensing plan ID to the banknote management device 10.

Further, in the dispensing process, a code c provided on the cassette 1001 is read with the input device 50. When the code c provided on the cassette 1001 is read, the bundle ID of a banknote bundle stored in this cassette 1001 is specified by the input device 50. The input device 50 transmits the specified bundle ID to the banknote management device 10. It is also possible to configure that, by reading the code c provided on the cassette 1001, mode information indicating a fact that a banknote bundle is transported with a method (mode) in which the banknote bundle is stored in a cassette is created and this mode information is transmitted to the banknote management device 10.

Meanwhile, there is a possibility that, during transport of the cassette 1001 to the dispensing destination U, the dispensed banknotes in the cassette 1001 are stolen. In consideration of such circumstances, in the present embodiment, all banknotes stored in the cassette 1001 are registered as dispensing banknotes. Further, the banknote management device 10 can specify each serial number of each stolen dispensed banknote and notify the serial numbers to an external device. For example, when the serial number of a banknote inserted into an external device matches a serial number notified from the banknote management device 10, reception of this banknote at the external device can be prohibited. Accordingly, theft of banknotes can be prevented.

However, in the configuration in which all banknotes stored in the cassette 1001 are registered as dispensed banknotes in the dispensing process, there may be an inconvenience that the operating time in the dispensing process tends to be prolonged. For example, there is assumed a configuration in which serial numbers of all banknotes stored in the cassette 1001 are read with the input device 50 (hereinafter, "comparative example"). In the comparative example, depending on the number of banknotes stored in the cassette 1001, the operating time for reading the serial numbers of the banknotes is excessively long. In consideration of such circumstances, in the present embodiment, a configuration in which the operating time for reading the serial numbers of the banknotes stored in the cassette 1001 can be shortened is employed.

Specifically, in the dispensing process in the present embodiment, serial numbers of a part of banknotes in the banknote bundle Bz stored in the cassette 1001 are read with the input device 50. For example, the serial number of one banknote (in the example of FIG. 6(*a*), "a12345") among the banknotes in the banknote bundle Bz is read with the input device 50. The input device 50 transmits the read serial number to the banknote management device 10.

As explained with reference to FIG. 5(*b*) described above, the bundle ID of the banknote bundle Bz and the serial numbers of banknotes included in this banknote bundle Bz are associated with each other and stored in the banknote management device 10. Upon reception of the serial number of one banknote in the banknote bundle Bz from the input device 50, the banknote management device 10 registers this serial number as the serial number of a dispensed banknote and specifies a bundle ID corresponding to this serial number. That is, the bundle ID of the banknote bundle Bz in which one banknote having its serial number read with the input device 50 is included is specified. The banknote management device 10 specifies other serial numbers (serial numbers of other banknotes included in the banknote bundle Bz) stored while being associated with the specified bundle ID and registers these serial numbers as serial numbers of dispensed banknotes.

According to this configuration, by reading the serial number of one banknote with the input device 50, this banknote can be registered as a dispensed banknote, and other banknotes in the banknote bundle Bz stored in the cassette 1001 can be also registered as dispensed banknotes. Therefore, for example, as compared to the comparative example described above, an inconvenience that the operating time in the dispensing process is prolonged is avoided.

It is also possible to configure that serial numbers of plural (for example, two) banknotes are read with the input device 50. In this configuration, the banknote management device 10 searches each output bundle ID (the bundle ID of the banknote bundle Bz) corresponding to read plural serial numbers from the banknote information Da3. Further, under a condition that the respective output bundle IDs searched in the banknote information Da3 are mutually the same, the banknote management device 10 creates banknote information Da4 while associating a common dispensing unit ID to all serial numbers corresponding to these output bundle IDs. In this configuration, there is an advantage that correct bundle IDs are easily specified.

Further, there is a case where the input device 50 cannot identify serial numbers correctly (makes a reading error). In this case, serial numbers not included in the banknote information Da3 stored in the banknote management device 10 may be transmitted from the input device 50. In consideration of such circumstances, it is preferable to have a configuration in which, when serial numbers not included in the banknote information Da3 stored in the banknote management device 10 are transmitted from the input device 50, this fact is notified from the banknote management device 10 and informed to the input device 50. For example, it is preferable to have a configuration in which a message "Reading error. Please check banknote bundle and read serial number again" is displayed on the input device 50.

FIG. 6(*b*) is a conceptual diagram of a specific example of the banknote information Da4 stored in the banknote management device 10. The banknote management device 10 creates one piece of banknote information Da4 with respect to one banknote. Specifically, the banknote management device 10 uses various pieces of information read with the input device 50 (a dispensing plan ID, a bundle ID, and a serial number) to create the banknote information Da4.

The banknote information Da4 is configured to include a dispensing unit ID, a serial number, and an output bundle ID. The dispensing unit ID is information for identifying a bundle of banknotes to be transported to the dispensing destination U. As described above, the dispensing plan information Dp is transmitted to the banknote management device 10 in advance. Further, the dispensing plan ID is transmitted from the input device 50 to the banknote management device 10. Upon reception of the dispensing plan ID from the input device 50, the banknote management device 10 specifies dispensing plan information Dp including this dispensing plan ID. The banknote management device 10 specifies a dispensing unit ID corresponding to the dispensing plan ID of this dispensing plan information Dp as a dispensing unit ID included in the banknote information Da4. The dispensing unit IDs of respective banknotes to be bundled with one another and transported to the dispensing destination U are mutually the same. The output bundle ID of the banknote information Da4 is a bundle ID identifying the banknote bundle stored in the cassette 1001. The output bundle ID included in the banknote information Da4 is a bundle ID specified with the input device 50 based on the code c of the cassette 1001 and transmitted by the input device 50.

As described above, in the dispensing process, one serial number is transmitted from the input device 50 to the banknote management device 10. In the specific example of FIG. 6(*b*), a case where a serial number "a12345" is transmitted to the banknote management device 10 is assumed. The banknote management device 10 creates the banknote information Da4 while associating a dispensing unit ID and an output bundle ID with the serial number "a12345" read with the input device 50. Further, the banknote management device 10 specifies the bundle ID of the banknote bundle Bz in which the banknote of the received serial number is included using the banknote information Da3 described above (see FIG. 5(*b*)). Further, other respective serial numbers corresponding to the specified bundle ID are specified based on the banknote information Da3.

For example, there is assumed a case where the banknote information Da3 in FIG. 5(*b*) is created in the sorting process and the serial number "a12345" is read with the input device 50 in the dispensing process. In this case, the serial number "a12345" is searched in the banknote information Da3 and an output bundle ID corresponding to this serial number (the bundle ID of the banknote bundle Bz) is specified. For example, in the specific example of FIG. 5(*b*), an output bundle ID "eee" is specified. Further, other serial numbers corresponding to the output bundle ID "eee" are searched in the banknote information Da3. For example, in the specific example of FIG. 5(*b*), a serial number "b67890" is searched. The banknote management device 10 creates the banknote information Da4 while associating a dispensing unit ID and an output bundle ID to each of other serial numbers specified based on the banknote information Da3.

According to this configuration, respective banknotes of serial numbers not read with the input device 50 are automatically registered as dispensed banknotes. When dispensed banknotes are stolen during transport, the banknote management device 10 specifies these dispensed banknotes as lost banknotes and notifies them to external devices. This configuration is described below in detail.

Figure 7:
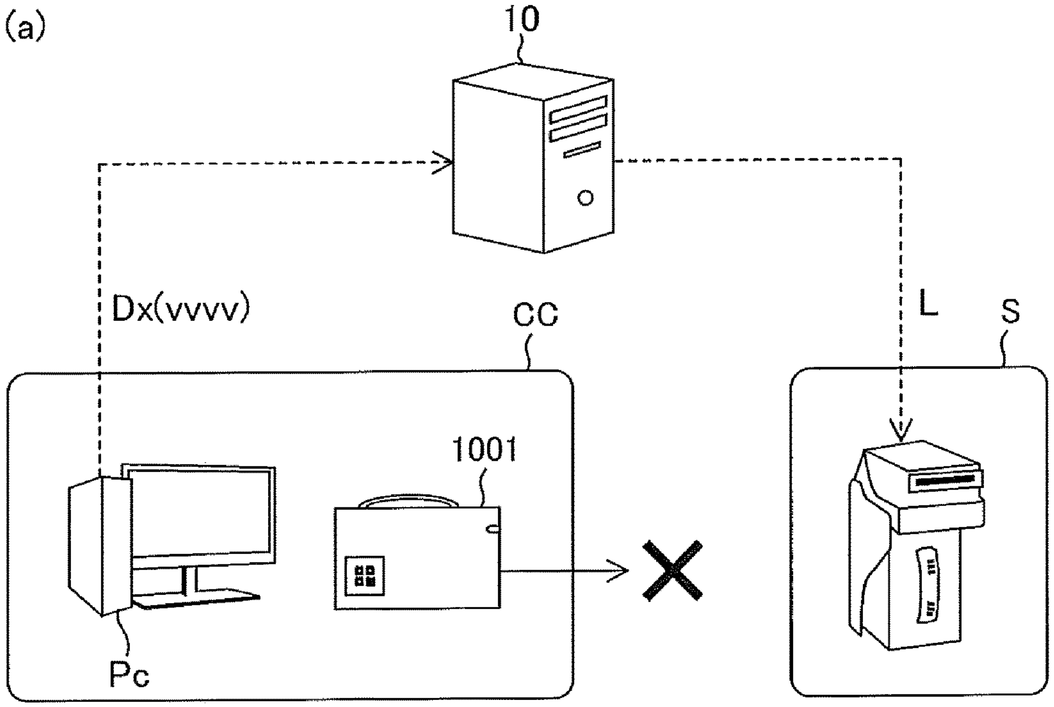
FIG. 7 are explanatory diagrams of a specific example of a configuration to notify lost banknotes.

FIG. 7(*a*) and FIG. 7(*b*) are explanatory diagrams of a configuration to notify lost banknotes. FIG. 7(*a*) is an explanatory diagram of a specific example when banknotes are lost. In the specific example of FIG. 7(*a*), a case where banknotes dispensed from the cash center CC are stolen is assumed. That is, a case where the cassette 1001 is stolen is assumed. As described above, dispensing unit IDs of respective banknotes stored in the cassette 1001 are mutually the same. In the specific example of FIG. 7(*a*), a case where banknotes having a dispensing unit ID "vvvv" are stolen is assumed.

When banknotes are stolen (lost), lost banknote information Dx is transmitted to the banknote management device 10. Dispensing unit IDs of the lost banknotes are included in this lost banknote information Dx. In the present embodiment, the lost banknote information Dx is transmitted from the computer Pc at the cash center CC to the banknote management device 10. Note that the configuration to input the lost banknote information Dx to the banknote management device 10 is not limited to the example described above. For example, it is possible to configure that a staff who transports the cassette 1001 holds a portable terminal and lost banknote information Dx can be transmitted from this portable terminal to the banknote management device 10. Further, it is also possible to configure that dispensing unit IDs of lost banknotes are directly input to the banknote management device 10.

Upon reception of the lost banknote information Dx, the banknote management device 10 creates a lost banknote list L formed of serial numbers of lost banknotes and the lost banknote list L is notified to a deposit and dispense device at each store S. When a banknote is received, this deposit and dispense device reads the serial number of this banknote and determines whether it is a serial number included in the lost banknote list L. If the serial number of this banknote is included in the lost banknote list L, the deposit and dispense device notifies the banknote management device 10 of the fact and reception of this banknote is prohibited. In the specific example of FIG. 7(*a*), while a configuration in which the lost banknote list L is transmitted from the banknote management device 10 to the deposit and dispense device is described, it is also possible to configure that the lost banknote list L is transmitted to the deposit and dispense device via another management device (a server device).

FIG. 7(*b*) is an explanatory diagram of a specific example of a creating method of the lost banknote list L. Upon reception of lost banknote information Dx, the banknote management device 10 specifies a dispensing unit ID included in this lost banknote information Dx based on the banknote information Da4 created in the dispensing process. Further, the banknote management device 10 extracts respective serial numbers corresponding to the specified dispensing unit ID from the banknote information Da4. For example, in the specific example of FIG. 7(*b*), a case where the dispensing unit ID "vvvv" is included in the lost banknote information Dx is assumed. In this case, respective serial numbers (a12345, b67890, . . . , d24680) corresponding to the dispensing unit ID "vvvv" are extracted from the banknote information Da4. The banknote management device 10 creates a lost banknote list L including the serial numbers extracted from the banknote information Da4.

In the present embodiment, similarly to the case where banknotes dispensed from the cash center CC to each store are stolen, even in a case where banknotes dispensed from a store S to the cash center CC are stolen, the lost banknote list L is created. Specifically, when banknotes dispensed from the store S are stolen, the lost banknote information Dx is transmitted to the banknote management device 10. This lost banknote information Dx includes any of depositing unit IDs in the banknote information Da1 described above (see FIG. 3(*a*)). The banknote management device 10 extracts serial numbers corresponding to the depositing unit IDs included in the lost banknote information Dx from the banknote information Da1. Further, the banknote management device 10 creates a lost banknote list L including the extracted serial numbers and notifies the lost banknote list L to external deposit and dispense devices and the cash center CC. As described above, in the depositing process at the cash center CC, banknotes (lost banknotes) that have not been transported from the store S are specified by the banknote processing device 30. When banknotes that have not been transported from the store S are specified, the banknote processing device 30 automatically transmits the serial numbers of these banknotes to the banknote management device 10. In this configuration, it is possible to configure that the banknote management device 10 creates a lost banknote list L including the serial numbers of lost banknotes received from the banknote processing device 30 and notifies the lost banknote list L to external deposit and dispense devices.

Figure 8:
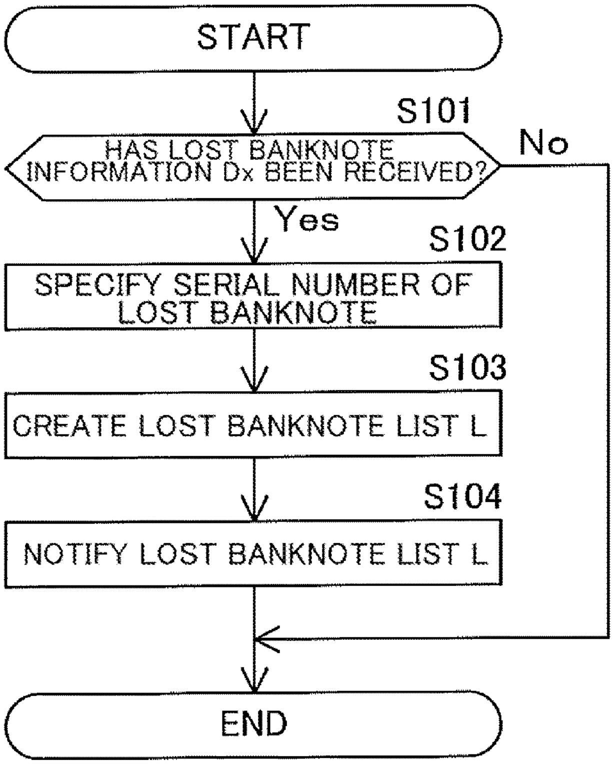
FIG. 8 is a flowchart of processes performed by a banknote management device.

FIG. 8 is a flowchart of a process of creating the lost banknote list L. For example, the banknote management device 10 performs this process at a predetermined time interval. When this process is started, the banknote management device 10 determines whether lost banknote information Dx is received (S101). When the lost banknote information Dx is not received (S101: No), the banknote management device 10 ends the process illustrated in FIG. 8. On the other hand, when it is determined that the lost banknote information Dx is received (S101: Yes), the banknote management device 10 specifies serial numbers of lost banknotes (S102). Specifically, serial numbers of lost banknotes are specified based on the banknote information Da1 or the banknote information Da4.

After specifying the serial numbers of lost banknotes, the banknote management device 10 creates a lost banknote list L including these serial numbers (S103). When the lost banknote list L is created, the banknote management device 10 notifies this lost banknote list L to an external device (S104). After notifying the lost banknote list L, the banknote management device 10 ends the process illustrated in FIG. 8.

Second Embodiment

Another embodiment of the present invention is described below. In the embodiment exemplified below, as for elements having operations and functions identical to those described in the first embodiment, signs referred to in the descriptions of the first embodiment are used and detailed descriptions of these elements are omitted as appropriate.

Figure 9:
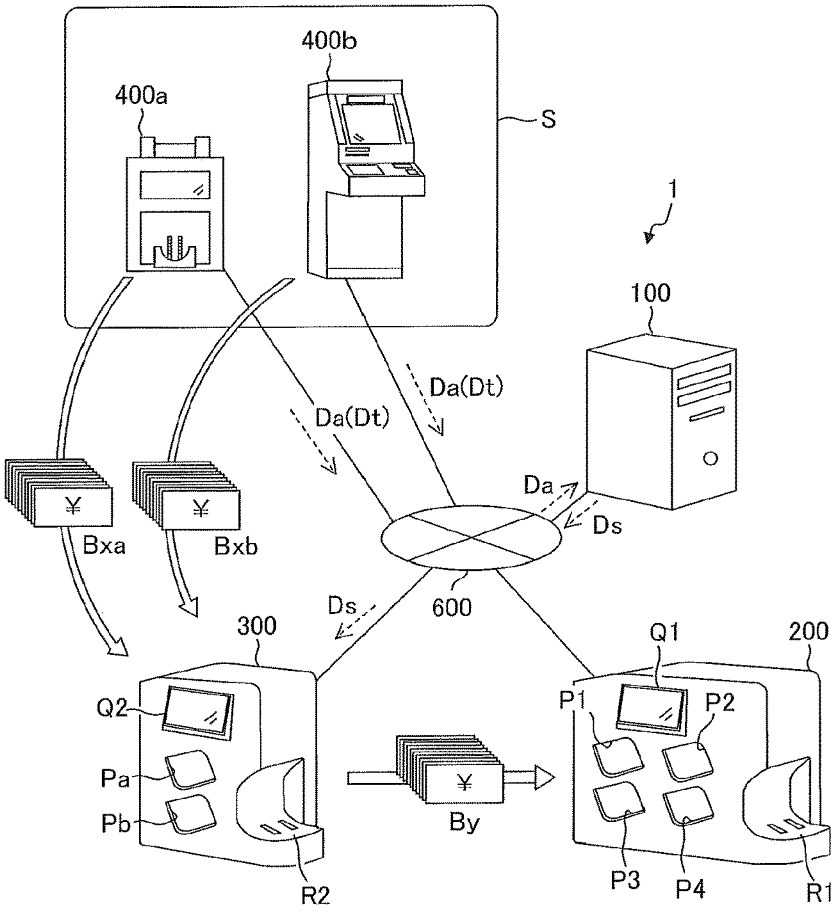
FIG. 9 is an explanatory diagram of respective configurations of a banknote processing system according to a second embodiment.

FIG. 9 is an explanatory diagram of respective configurations of a banknote processing system 1 according to the second embodiment. As illustrated in FIG. 9, the banknote processing system 1 is configured to include a banknote management server 100, a sorting device 200, a deposit device 300, and a plurality of receiving devices 400.

The plurality of receiving devices 400 are installed at a store S (for example, a bank). Each of the plurality of receiving devices 400 includes a receiving device 400*a* and a receiving device 400*b* that are of mutually different types. As the receiving device 400*a*, for example, a banknote counting device that counts sale proceeds at the store S is assumed. As the receiving device 400*b*, for example, an automatic teller machine (ATM) is assumed. The receiving devices 400 are not limited to these examples. Further, it is also possible to provide receiving devices 400 of two or more types.

The sorting device 200 and the deposit device 300 are installed in, for example, a cash center. Banknotes are transferred to this cash center from other facilities (for example, the store S). In the second embodiment, banknote bundles Bx (a, b) are formed in each of receiving devices 400 (*a, b*) and the banknote bundles Bx are transferred to the cash center. The banknotes transferred to the cash center are counted with the deposit device 300, distributed (sorted) to each of stacking portions P (1 to 4) of the sorting device 200, and dispensed to other facilities.

Each of the banknote management server 100, the sorting device 200, the deposit device 300, and the receiving devices 400 includes a processor and a memory. For example, a CPU (Central Processing Unit) is employed as the processor and the processor executes programs stored in the memory. For example, a DRAM (Dynamic Random Access Memory), an SRAM (Static Random Access Memory), or a flash memory is employed as the memory and the memory stores therein programs executed by the processor.

As illustrated in FIG. 9, the banknote management server 100 is communicably connected to the sorting device 200 via a network 600. The banknote management server 100 is also communicably connected to the deposit device 300 via the network 600. Similarly, the banknote management server 100 is communicably connected to the receiving devices 400 via the network 600. For example, any of the Internet, a dedicated network, a VPN (Virtual Private Network), and a local network may be employed as the network 600. Further, the network 600 may be a combination of these networks. In addition, any of wired communication and wireless communication may be employed for the network 600.

As illustrated in FIG. 9, the deposit device 300 includes an operation panel Q2, a placing portion R2, and two stacking portions (Pa, Pb). A banknote bundle Bx having been taken out from one of the receiving devices 400 is placed on the placing portion R2. When the operation panel Q2 is operated accordingly, each banknote on the placing portion R2 is sequentially fed and distributed to either of the stacking portions P. Note that the number of stacking portions P in the deposit device 300 is not limited to two. For example, it is possible to configure that three or more stacking portions P are provided in the deposit device 300 or one stacking portion P is provided therein.

The deposit device 300 sequentially feeds plural banknotes and counts the number of fed banknotes. When a banknote is fed, the deposit device 300 acquires various pieces of information on the banknote. Specifically, when a banknote is fed, the deposit device 300 captures an image of the banknote and specifies the serial number of the banknote from the image. A serial number is a character string that can uniquely specify a certain banknote. For example, the deposit device 300 performs OCR (Optical character recognition) processing on an image of a banknote to identify the serial number of the banknote. Further, when a banknote is fed, the deposit device 300 identifies the denomination of the banknote. In the second embodiment, a banknote bundle B may include banknotes of six denominations such as a denomination X, a denomination Y, a denomination Z, and so on. Note that the number of denominations the banknote processing system 1 can handle is not limited to six. For example, it is possible to configure that the banknote processing system 1 can handle up to five or less denominations or can handle seven or more denominations. Further, when a banknote is fed, the deposit device 300 identifies the orientation (up-sided or down-sided and front-sided or back-sided) of the banknote.

Further, when a banknote is fed, the deposit device 300 identifies whether the banknote is an unfit note (fitness). Specifically, in order to identify the fitness of each banknote, the deposit device 300 analyzes an image of the banknote. Further, the deposit device 300 has various types of sensors including a magnetic sensor and an infrared sensor, and refers to information acquired by these sensors to identify the fitness of each banknote. Further, the deposit device 300 quantifies the degree of "soil" on each banknote based on analysis results. Similarly, the deposit device 300 quantifies each degree of "wrinkled", "dog-eared", "torn", "perforated", "cut", "restored", "taped", "dyed", "scribbled", and "ink-faded" (hereinafter, these values are referred to as "evaluated values") on each banknote. The deposit device 300 then makes determination on, each evaluated value, whether these elements are equal to or less than a predetermined identification value and, according to determination results, identifies whether the fitness of the banknote. Similarly, when a banknote is fed, the deposit device 300 identifies whether the banknote is a counterfeit note (authenticity).

In the deposit device 300, it is possible to set the strength of identification (hereinafter, simply "identification strength") variable. Specifically, in the deposit device 300, any of "low", "medium", and "high" can be set as the identification strength. These identification values mentioned above can be set variably according to the identification strength. For example, when the identification strength is set "high", as compared to cases where other identification strengths (medium and low) are set, an identification value by which the fitness of a banknote is identified more accurately is set. That is, when the identification strength is set "high", even a banknote with slight soil tends to be identified as an unfit note. Further, when the identification strength is set "medium", as compared to a case where the identification strength is set "low", an identification value by which the fitness of a banknote is identified more accurately is set. Similarly, as the identification strength is set higher, the authenticity of a banknote is identified more accurately.

The deposit device 300 distributes banknotes to the stacking portions P according to identification results of these banknotes. As illustrated in FIG. 1, a banknote bundle By is formed of the banknotes distributed by the deposit device 300. The identification method of banknotes and the method for changing the identification strength in the deposit device 300 are changed accordingly. Further, the types of the identification strength are not limited to three.

The receiving device 400 counts received banknotes. Further, when banknotes are received, the receiving device 400 identifies each of the banknotes and acquires various pieces of information including the serial number, denomination, orientation, fitness, and authenticity thereof (similarly to the deposit device 300). Note that the accuracy (strength) of identification of the banknote differs according to the type of the receiving device 400. As described above, banknotes the receiving device 400 has received are taken out as a banknote bundle Bx and are identified by the deposit device 300.

The receiving device 400 uses various pieces of information acquired from each banknote in the banknote bundle Bx to create banknote information Da (see FIG. 11(*a*) described later). Further, the receiving device 400 transmits the banknote information Da to the banknote management server 100. This banknote information Da includes model information Dt indicating the type of the receiving device 400. While the details thereof will be described later, the banknote management server 100 creates setting information Ds using the banknote information Da (see FIG. 16(*a*)). The setting information Ds includes strength information indicating an appropriate identification strength in the deposit device 300.

The sorting device 200 sorts each of banknotes in the banknote bundle By formed by the deposit device 300. Specifically, the sorting device 200 includes an operation panel Q1, a placing portion R1, and four stacking portions P (1 to 4). The banknote bundle By is placed on the placing portion R1. When the operation panel Q1 is operated accordingly, each banknote placed on the placing portion R1 is sequentially distributed to the stacking portions according to a predetermined sorting pattern.

The sorting pattern includes “sort by denomination”, “sort by orientation”, and “sort by front-sided/back-sided”. An operator can set any of these sorting patterns with an operation on the operation panel Q1. Further, the sorting device 200 can identify whether banknotes are unfit notes and can distribute unfit notes and banknotes that are not unfit notes (fit notes) to respectively different stacking portions P. Similarly to the sorting device 200, the deposit device 300 sorts (distributes) each of the banknotes in the banknote bundle Bx with any of these sorting patterns.

In the second embodiment, when “sort by denomination” is set, among the banknotes in the banknote bundles B (x, y), respective banknotes of the same denomination are distributed to the same stacking portion P. Further, when “sort by orientation” is set, among the banknotes in the banknote bundles B, respective banknotes having a certain end in the longitudinal orientation facing the same orientation are distributed to the same stacking portion P. For explanation’s sake, among the banknotes in the banknote bundles B, banknotes having a certain end in the longitudinal orientation facing a predetermined orientation may be described as “up-sided banknotes” and banknotes facing the reverse orientation with respect to the predetermined orientation may be described as “down-sided banknotes”. When “sort by front-sided/back-sided” is set, among the banknotes in the banknote bundles B, respective banknotes having the same front-sided orientation are distributed to the same stacking portion P. For explanation’s sake, among the banknotes in the banknote bundles B, banknotes having their front side facing a certain orientation may be described as “front-sided banknotes” and banknotes having their front side facing the reverse orientation with respect to the certain orientation may be described as “back-sided banknotes”.

Note that the sorting patterns are not limited to the examples described above. For example, a sorting pattern “sort by denomination and by front-sided/back-sided” may be set. In the sorting patterns described above, while banknotes of the same denomination are distributed to the same stacking portion P, among banknotes of the same denomination, front-sided banknotes and back-sided banknotes are distributed to respectively different stacking portions P. Similarly, a sorting pattern “sort by denomination and by orientation” and a sorting pattern “sort by front-sided/back-sided and by orientation” may be set.

The banknote management server 100 uses the banknote information Da received from the receiving device 400 to decide the strength information described above (the setting information Ds). The strength information is information indicating an appropriate identification strength of the deposit device 300 and is transmitted from the banknote management server 100 to the deposit device 300. The identification strength indicated by the strength information received from the banknote management server 100 is set in the deposit device 300. With the configuration described above, there is an advantage that the identification strength tends to be set accordingly. In the following descriptions, an identification strength setting method according to the second embodiment is described in detail.

Figures 10, 11:
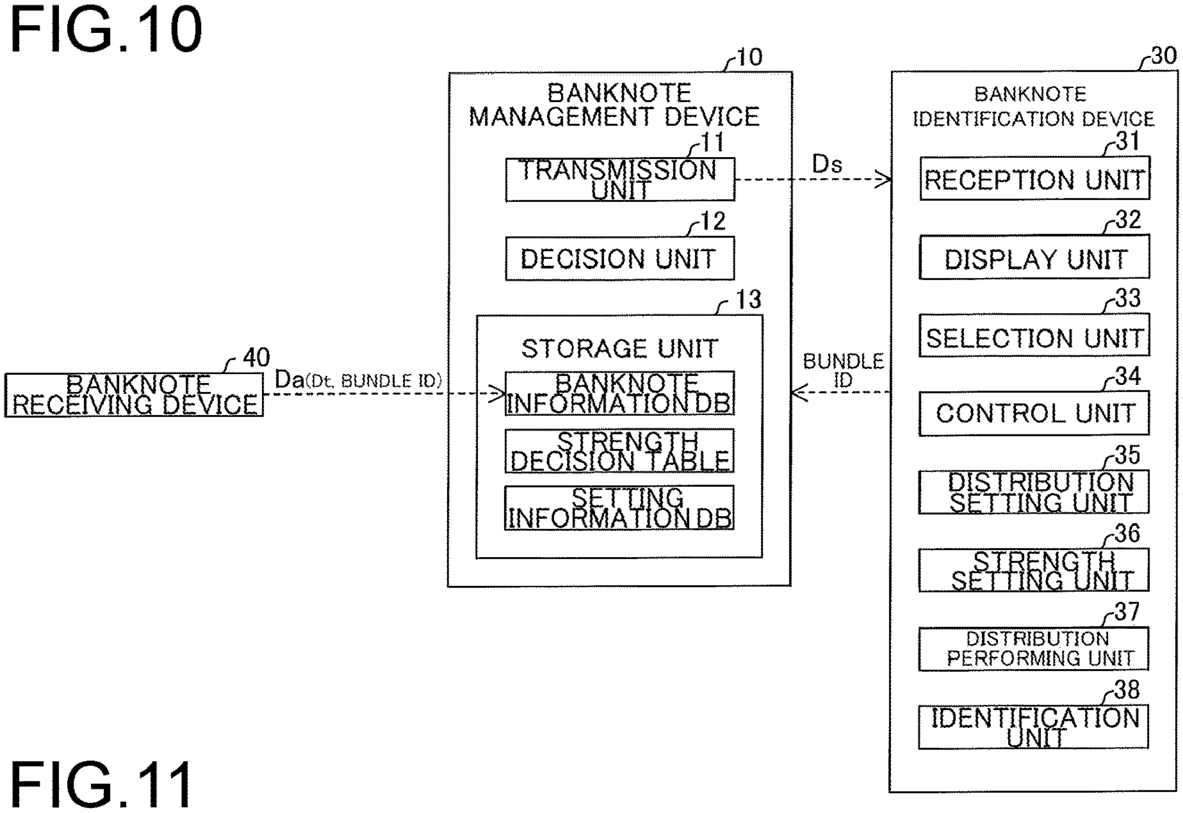
FIG. 10 is a functional block diagram of the banknote processing system according to the second embodiment.
FIG. 11 are explanatory diagrams of specific examples of banknote information in the second embodiment.

FIG. 10 is a functional block diagram of the banknote processing system 1 according to the second embodiment. As illustrated in FIG. 10, the banknote processing system 1 is configured to include a banknote management device 10, a banknote identification device 30, and a banknote receiving device 40. For example, as respective CPUs of the banknote management server 100, the deposit device 300, and the receiving device 400 described above execute programs, respective functions are realized. Specifically, the banknote management server 100 described above functions as the banknote management device 10. Further, the deposit device 300 functions as the banknote identification device 30 and the receiving device 400 functions as the banknote receiving device 40.

The banknote management device 10 is configured to include a transmission unit 11, a decision unit 12, and a storage unit 13. As illustrated in FIG. 10, the storage unit 13 includes a banknote information DB (DataBase), a strength decision table, and a setting information DB. The banknote information DB stores therein banknote information Da (see FIG. 11(*a*) described later). The banknote information Da is created by the banknote receiving device 40 and is transmitted to and stored in the banknote management device 10. As illustrated in FIG. 10, the banknote information Da includes a bundle ID and the model information Dt. The model information Dt indicates the type of the banknote receiving device 40 and is, for example, stored in the banknote receiving device 40 in advance. Further, the bundle ID is information given to each banknote bundle Bx to specify the corresponding banknote bundle Bx.

The decision unit 12 uses the model information Dt included in the banknote information Da to decide strength information. The strength information is information indicating an identification strength to be set in the banknote identification device 30. Specifically, the decision unit 12 uses the model information Dt and the strength decision table mentioned above to decide strength information. The strength decision table associates the type of the banknote receiving device 40 and the strength information (see FIG. 12(*a*) described later). The decision unit 12 searches strength information corresponding to the type of the banknote receiving device 40 indicated by the model information Dt to decide the strength information.

While the details thereof will be described later, the strength decision table is provided for each distribution pattern of banknotes settable in the banknote identification device 30. As the distribution pattern, for example, there is provided a distribution pattern in which the fitness of banknotes is identified and stacking portions P to which the banknotes are distributed are decided according to identification results (see FIG. 11(*b*-1) described later). Further, there is also provided a distribution pattern in which the fitness of banknotes is not identified and only counting the number of banknotes can be made (see FIG. 11(*b*-2) described later). The decision unit 12 decides strength information for each corresponding distribution pattern. That is, it is rephrased that the decision unit 12 of the banknote management device 10 decides strength information based on a distribution pattern and the model information Dt. The banknote management device 10 creates setting information Ds including the decided strength information and a bundle ID and stores the setting information Ds in the setting information DB.

The transmission unit 11 of the banknote management device 10 transmits the setting information Ds (including a bundle ID and strength information) to the banknote identification device 30. Specifically, as illustrated in FIG. 10, a bundle ID is transmitted from the banknote identification device 30 to the banknote management device 10. In the banknote identification device 30, when identification (counting) of banknotes in a banknote bundle Bx is performed, an operator inputs a bundle ID to the banknote identification device 30.

When a bundle ID is input to the banknote identification device 30, the bundle ID is transmitted to the banknote management device 10. As described above, the setting information Ds stored in the setting information DB of the banknote management device 10 (the storage unit 13) includes the bundle ID of the banknote bundle Bx. The transmission unit 11 searches, from the setting information DB, setting information Ds including the bundle ID received from the banknote identification device 30 and transmits (replies) the setting information Ds.

In the second embodiment, as an operation unit of the banknote identification device 30 is operated accordingly, a bundle ID (a character string) is directly input to the banknote identification device 30. Note that the configuration to input a bundle ID to the banknote identification device 30 can be changed accordingly. For example, a one-dimensional barcode or a two-dimensional barcode according to a bundle ID is printed and attached on a banknote bundle Bx (or a safe storing therein banknote bundles Bx). Further, it is also possible to have a configuration in which when an operator of the banknote identification device 30 reads the one-dimensional barcode or the two-dimensional barcode with a reader, a bundle ID is automatically input to the banknote identification device 30.

The banknote identification device 30 can sequentially feed each banknote in the banknote bundle Bx to each of the stacking portions P (a, b). Further, as illustrated in FIG. 10, the banknote identification device 30 is configured to include a reception unit 31, a display unit 32, a selection unit 33, a control unit 34, a distribution setting unit 35, a strength setting unit 36, a distribution performing unit 37, and an identification unit 38.

The distribution setting unit 35 sets any of stacking portions P (a, b) as a specified stacking portion (for example, a stacking portion to which fit notes are distributed). That is, it is rephrased that the distribution setting unit 35 is a unit that sets the distribution patterns described above. Further, the distribution performing unit 37 distributes specified banknotes (for example, fit notes) among banknotes to a specified stacking portion. That is, the distribution performing unit 37 distributes banknotes with any one of plural types of distribution patterns (see FIG. 11(*b*-1) and (*b*-2) described later).

The reception unit 31 receives the setting information Ds (strength information) from the banknote management device 10. As described above, when a bundle ID of a banknote bundle Bx is transmitted to the banknote management device 10, setting information Ds corresponding to the bundle ID is received in the banknote identification device 30. The strength setting unit 36 sets an identification strength using the received setting information Ds (strength information). Further, the identification unit 38 identifies banknotes with the set identification strength.

Specifically, the setting information Ds received from the banknote management device 10 includes a distribution pattern and strength information corresponding to the distribution pattern (see FIG. 12(*b*) described later). The selection unit 33 can make the received distribution pattern selectable. For example, the selection unit 33 displays a selection screen described later (see FIG. 13(*a*)) on the display unit 32 to make any of plural distribution patterns selectable. Further, when a certain distribution pattern is selected, the strength setting unit 36 automatically sets a certain identification strength according to strength information corresponding to the distribution pattern.

While the details thereof will be described later with reference to FIGS. 13(*a*) and 13(*b*), the display unit 32 according to the second embodiment does not display strength information in a first mode and displays the strength information in a second mode. Further, the control unit 34 can maintain the first mode in a period from receiving the strength information to starting identification of banknotes.

FIG. 11(*a*) is a conceptual diagram of specific examples of the banknote information Da. The banknote information Da is created by the banknote receiving device 40. Specifically, one piece of banknote information Da corresponding to one banknote in the banknote bundle Bx is created from the banknote. Therefore, if N banknotes are included in the banknote bundle Bx, N pieces of banknote information Da are created and are transmitted to the banknote management device 10. While the details thereof will be explained in a third embodiment described later, the banknote identification device 30 creates the banknote information Da similarly to the banknote receiving device 40.

As illustrated in FIG. 11(*a*), the banknote information Da according to the second embodiment is configured to include header information Dax and banknote specific information Day. The header information Dax is configured to include information Dax1, information Dax2, and the model information Dt. The information Dax1 of the banknote information Da (the header information Dax) indicates a bundle ID of a banknote bundle Bx in which a banknote corresponding to the banknote information Da is included. The information Dax2 indicates the total number of banknotes included in the banknote bundle Bx.

The bundle ID (the information Dax1) of the header information Dax is decided by the banknote receiving device 40 when the banknote receiving device 40 has counted the number of banknotes. Further, the banknote receiving device 40 decides the counting results as the information Dax2 of the banknote information Da. As described above, while one piece of banknote information Da is created for one banknote, the header information Dax included in the banknote information Da is in common to each banknote included in the same banknote bundle Bx.

The model information Dt included in the header information Dax specifies the type of device having created the banknote information Da. For example, the model information Dt included in the banknote information Da created by the banknote receiving device 40 specifies the model of the banknote receiving device 40 (whether the model is 400*a* or 400*b* illustrated in FIG. 9). The model information Dt is used when the banknote management device 10 decides strength information (the setting information Ds).

The banknote specific information Day included in the banknote information Da is configured to include information Day1 to information Day3. The information Day1 is the serial number of a banknote corresponding to the banknote information Da. The information Day2 is the denomination of the banknote. The information Day3 is the orientation of the banknote. Each of the pieces of the information described above are acquired as the banknote receiving device 40 identifies a banknote.

The banknote management device 10 uses the banknote information Da to determine a distribution pattern settable in the banknote identification device 30. For example, the denomination of each banknote included in a banknote bundle Bx is recognized based on the banknote information Da. The banknote management device 10 recognizes the denomination of each banknote included in the banknote bundle Bx based on the banknote information Da, specifies denominations distributable to each stacking portion P of the banknote identification device 30, and determines a distribution pattern settable in the banknote identification device 30.

FIG. 11(*b*-1) and FIG. 11(*b*-2) are specific examples of distribution patterns settable in the banknote identification device 30. In these specific examples, a case where only banknotes of a denomination X are included in a banknote bundle Bx is assumed. The distribution pattern illustrated in FIG. 11(*b*-1) is a distribution pattern in which, among banknotes in the banknote bundle Bx, fit notes of the denomination X are distributed to the stacking portion Pa and unfit notes of the denomination X are distributed to the stacking portion Pb. With this distribution pattern, both denomination and fitness of each banknote are identified.

The distribution pattern illustrated in FIG. 11(*b*-2) is a distribution pattern that is selected when its objective is only to count the number of banknotes. Specifically, the distribution pattern illustrated in FIG. 11(*b*-2) is a distribution pattern in which, among banknotes in the banknote bundle Bx, banknotes of the denomination X are distributed to the stacking portion Pa and the denomination X are distributed to the stacking portion Pb. With this distribution pattern, fitness of each banknote is not identified.

As described above, in the banknote management device 10, identification strength (strength information) is decided for each distribution pattern in the banknote identification device 30. For example, the identification strength of a distribution pattern in which fitness of each banknote is identified (for example, the distribution pattern in FIG. 11(*b*-1)) tends to be decided higher than the identification strength of a distribution pattern in which fitness of each banknote is not identified (for example, the distribution pattern in FIG. 11(*b*-2)). Note that, as described later, even when the distribution pattern is in common to each other, the identification strength decided by the banknote management device 10 is variable according to the type of the banknote receiving device 40.

FIG. 12(*a*), (*b*), (*c*-1), and (*c*-2) are explanatory diagrams of a configuration to decide the setting information Ds. FIG. 12(*a*) is a conceptual diagram of a strength decision table. As described above, the strength decision table is used when strength information of the setting information Ds is decided. In the second embodiment, a strength decision table is provided for each distribution pattern and strength information is decided for each distribution pattern. FIG. 12(*a*) illustrates one strength decision table for deciding strength information of a specific distribution pattern in a selective manner.

The strength decision table associates a device indicated by the model information Dt and strength information. As described above, the identification strength in the second embodiment includes three types "low", "medium", and "high". For example, when the model information Dt indicates "ATM (manufactured by X Corporation)", as illustrated in FIG. 12(*a*), the banknote management device 10 decides strength information indicating an identification strength "high". Meanwhile, even when the model information Dt indicates "ATM", if the model information Dt indicates "ATM (manufactured by Y Corporation)", the banknote management device 10 decides strength information indicating an identification strength "medium". That is, when the banknote receiving device 40 is "ATM (manufactured by X Corporation)", the banknote management device 10 decides strength information indicating an identification strength higher than that when the banknote receiving device 40 is "ATM (manufactured by Y Corporation)".

As the case described above, for example, a case where identifying performance of "ATM (manufactured by Y Corporation)" is higher than identifying performance of "ATM (manufactured by X Corporation) is assumed. There is assumed a comparative example in which in both cases where the model information Dt indicates "ATM (manufactured by X Corporation)" and where the model information Dt indicates "ATM (manufactured by Y Corporation)", an identification strength "medium" is decided. In this comparative example, if the banknote receiving device 40 is "ATM (manufactured by X Corporation), banknotes in the banknote bundle Bx will never be identified with an identification strength corresponding to the identification strength "high". Therefore, for example, there will be an inconvenience that unfit notes are not identified.

Further, there is assumed a comparative example in which in both cases where the model information Dt indicates "ATM (manufactured by X Corporation)" and where the model information Dt indicates "ATM (manufactured by Y Corporation)", an identification strength "high" is decided. In this comparative example, if the banknote receiving device 40 is "ATM (manufactured by Y Corporation)", banknotes in the banknote bundle Bx are identified twice with an identification strength corresponding to the identification strength "high". Therefore, an inconvenience that the processing load on identifying the banknotes becomes excessive will easily occur. Since the banknote management device 10 according to the second embodiment decides an appropriate identification strength according to the type of the banknote receiving device 40, such an inconvenience is avoided.

FIG. 12(*b*) is a conceptual diagram of the setting information Ds. As illustrated in FIG. 12(*b*), the setting information Ds is configured to include information Ds1 (a bundle ID), information Ds2 (a distribution pattern), and information Ds3 (strength information). The information Ds1 indicates a bundle ID of a banknote bundle Bx formed in the banknote receiving device 40. This bundle ID is specified by the banknote information Da (see FIG. 11(*a*)) received from the banknote receiving device 40.

The information Ds2 indicates a distribution pattern settable in the banknote identification device 30. The banknote management device 10 uses the banknote information Da received from the banknote receiving device 40 to specify the distribution pattern settable in the banknote identification device 30. The banknote management device 10 creates plural pieces of setting information Ds respectively including each specified distribution pattern (see FIG. 12(*c*-1) and (c-2) described later). The information Ds3 is strength information indicating an identification strength when the distribution pattern indicated by the information Ds2 is set. This strength information is decided using the strength decision table described above.

FIG. 12(*c*-1) is an explanatory diagram of a specific example of the setting information Ds. In the specific example of FIG. 12(*c*-1), setting information Ds of a banknote bundle Bx having a bundle ID "aaa" is assumed. Further, a case where only banknotes of the denomination X are included in the banknote bundle Bx is assumed. In this case, each of the distribution patterns described with reference to FIG. 11(*b*-1) and FIG. 11(*b*-2) is settable in the banknote identification device 30. The banknote management device 10 decides strength information of each of the distribution patterns.

Specifically, strength information of a distribution pattern in which fit notes of the denomination X are distributed to the stacking portion Pa of the banknote identification device 30 and unfit notes of the denomination X are distributed to the stacking portion Pb of the banknote identification device 30 (hereinafter, simply "distribution pattern A") and strength information of a distribution pattern in which banknotes of the denomination X are distributed to the stacking portion Pa and banknotes of the denomination X are distributed to the stacking portion Pb (hereinafter, simply "distribution pattern B") are decided. As described above, fitness of the banknotes are identified with the distribution pattern A and fitness of the banknotes are not identified with the distribution pattern B.

Further, in the specific example of FIG. 12(*c*-1), a case where the model information Dt indicating "ATM (manufactured by Y Corporation)" is received by the banknote management device 10 is assumed. That is, a case where a banknote bundle Bx is taken out from the banknote receiving device 40 of "ATM (manufactured by Y Corporation)" is assumed. As described above, the banknote management device 10 refers to a strength decision table, decides strength information of each distribution pattern, and creates setting information Ds including the distribution pattern and the strength information. In the specific example of FIG. 12(*c*-1), an identification strength "high" is decided as the strength information of the distribution pattern A and an identification strength "medium" is decided as the strength information of the distribution pattern B. Accordingly, setting information Ds including strength information indicating an identification strength "high" and the distribution pattern A and setting information Ds including strength information indicating an identification strength "medium" and the distribution pattern B are created.

FIG. 12(*c*-2) is an explanatory diagram of another specific example of the setting information Ds. In the specific example of FIG. 12(*c*-2), setting information Ds of a banknote bundle Bx having a bundle ID "bbb" is assumed. Further, a case where only banknotes of the denomination X are included in the banknote bundle Bx is assumed. In this case, similarly to the specific example of FIG. 12(*c*-1) described above, strength information of each of distribution patterns including the distribution pattern A and the distribution pattern B is decided.

Note that in the specific example of FIG. 12(*c*-1) and the specific example of FIG. 12(*c*-2) described above, the banknote receiving device 40 from which the banknote bundle Bx is taken out is different from each other. Specifically, in the specific example of FIG. 12(*c*-1), a case where the banknote bundle Bx is formed in "ATM (manufactured by Y Corporation)" is assumed, whereas in the specification example of FIG. 12(*c*-2), a case where the banknote bundle Bx is formed in "sorting device (self-manufactured)" is assumed. In each of these cases, although the banknote bundle Bx is in common to each other, strength information (Ds3) included in the setting information Ds may be different from each other.

For example, as illustrated in FIG. 12(*c*-1) and FIG. 12(*c*-2), as for the strength information of the distribution pattern A, the identification strength is "high" when the banknote receiving device 40 is "ATM (manufactured by Y Corporation)", but the identification strength is "low" when the banknote receiving device 40 is "sorting device (self-manufactured)". Further, as for the strength information of the distribution pattern B, the identification strength is "medium" when the banknote receiving device 40 is "ATM (manufactured by Y Corporation)", but the identification strength is "low" when the banknote receiving device 40 is "sorting device (self-manufactured)".

The setting information Ds is transmitted from the banknote management device 10 to the banknote identification device 30. Specifically, when a bundle ID of a banknote bundle Bx is input in the banknote identification device 30, each setting information Ds including the bundle ID is transmitted from the banknote management device 10. Upon reception of the setting information Ds, the banknote identification device 30 displays a selection screen described below and makes a distribution pattern specified with the setting information Ds selectable.

Figure 13:
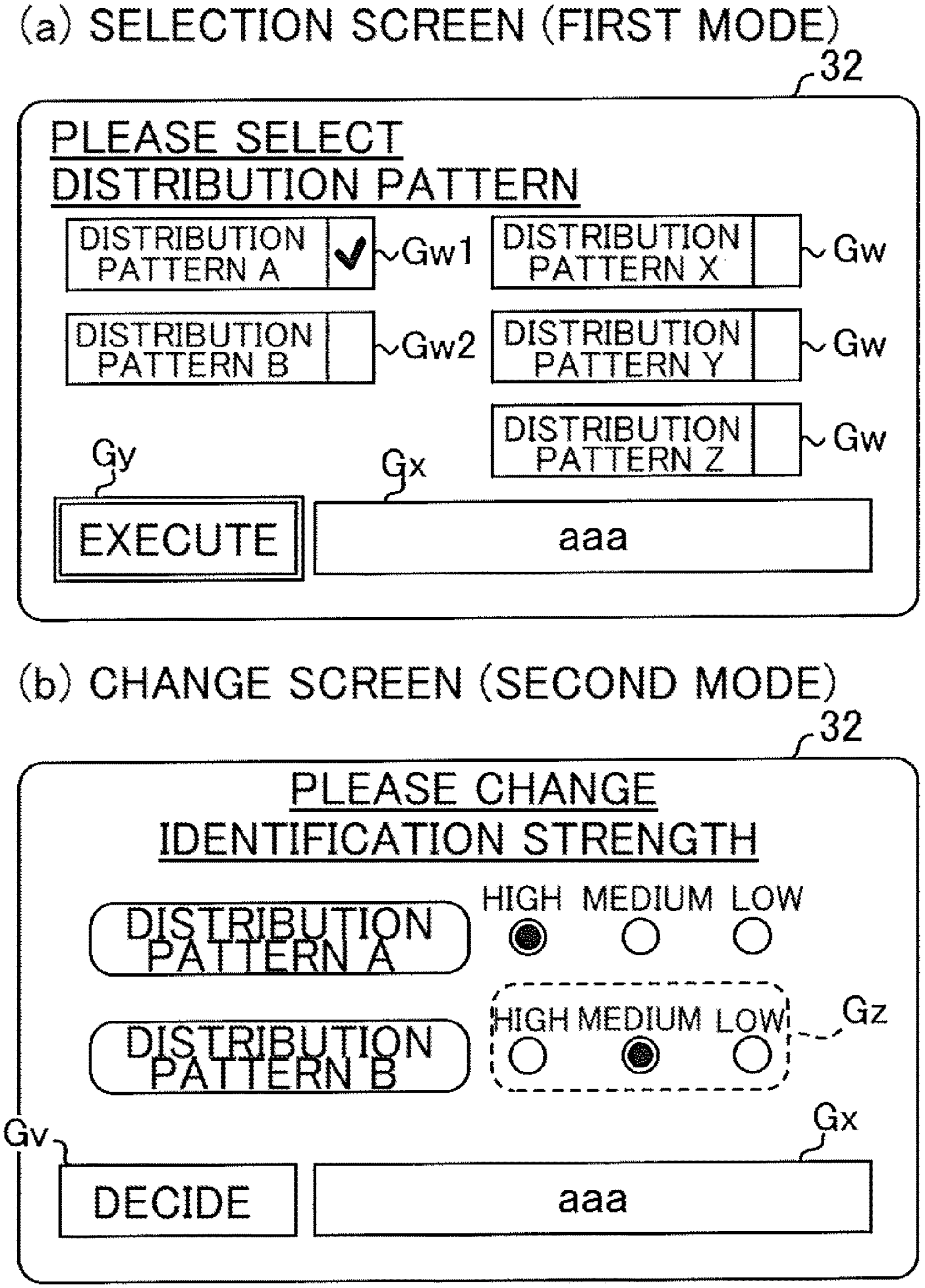
FIG. 13 are schematic diagrams of examples of a selection screen according to the second embodiment.

FIG. 13(*a*) is a schematic diagram of a selection screen. The selection screen makes a distribution pattern of a banknote bundle Bx selectable. Specifically, as illustrated in FIG. 13(*a*), the selection screen displays selection button images Gw (1, 2), an ID display image Gx, and an execution button image Gy. Further, as illustrated in FIG. 13(*a*), a message prompting to select a distribution pattern is displayed on the selection screen. The ID display image Gx displays a bundle ID of a banknote bundle Bx input to the banknote identification device 30.

The selection button image Gw corresponds to any of distribution patterns settable in the banknote identification device 30. When each of banknotes in a banknote bundle Bx can be distributed with plural types of distribution patterns, the selection button images Gw are displayed in plural. In the specific example of FIG. 13(*a*), there is assumed a case where setting information Ds including the distribution pattern A described with reference to FIG. 12(*c*-1) and FIG. 12(*c*-2) as well as setting information Ds including the distribution pattern B described with reference to FIG. 12(*c*-1) and FIG. 12(*c*-2) are received by the banknote identification device 30. In this case, a selection button image Gw1 corresponding to the distribution pattern A and a selection button image Gw2 corresponding to the distribution pattern B are displayed on the selection screen.

In the second embodiment, there is also a case where distribution patterns other than those included in the setting information Ds are settable in the banknote identification device 30. For example, in the specific example of FIG. 13(*a*), there is assumed a case where, in addition to respective distribution patterns (A, B) included in the setting information Ds, a distribution pattern X to a distribution pattern Z are also settable in the banknote identification device 30. In this case, each selection button image Gw corresponding to the distribution pattern X to the distribution pattern Z is displayed. If any setting information Ds is not received from the banknote management device 10 even when a bundle ID is input to the banknote identification device 30 (if any setting information Ds is not created by the banknote management device 10), only selection button images Gw corresponding to distribution patterns not included in the setting information Ds are displayed on the selection screen.

The display unit 32 displays selection button images Gw corresponding to distribution patterns included in the setting information Ds and selection button images Gw corresponding to distribution patterns not included in the setting information Ds in a distinguishable manner. For example, selection button images Gw corresponding to distribution patterns included in the setting information Ds are displayed on the left as viewed from a user and selection button images Gw corresponding to distribution patterns not included in the setting information Ds are displayed on the right. Note that the positions in which selection button images Gw are displayed are not limited to this example. For example, when selection button images Gw are displayed vertically in a line, it is possible to configure that selection button images Gw corresponding to distribution patterns included in the setting information Ds are displayed above other selection button images Gw. Further, it is also possible to configure that selection button images Gw are displayed in a manner that whether these images correspond to distribution patterns included in the setting information Ds or not is indistinguishable.

Upon reception of a predetermined selecting operation, the selection button images Gw are switched to be a selective state. For example, when touch interactions are made on a selection button image GW on the display unit 32, the selection button image Gw is switched to be a selective state. When plural selection button images Gw are displayed, any one of the selection button images Gw can be switched to be a selective state. In the specific example of FIG. 13(*a*), there is assumed a case where the selection button image Gw1 corresponding to the distribution pattern A is in a selective state.

The execution button image Gy enables identification of a banknote bundle Bx to be started. Specifically, when touch interactions are made on the execution button image Gy, a distribution pattern corresponding to the selection button image Gw switched to be a selective state is set. Thereafter, each banknote in the banknote bundle Bx placed on the banknote identification device 30 (the placing portion R2) is distributed to each stacking portion P (a, b) with the set distribution pattern.

Further, in the second embodiment, when a distribution pattern is set (selected), an identification strength is automatically set in the banknote identification device 30. Specifically, when the execution button image Gy is operated, the setting information Ds received from the banknote management device 10 is referred to, and strength information (the information Ds3) corresponding to the distribution pattern (the information Ds2) to be set is specified. When distribution patterns not included in the setting information Ds (for example, the distribution patterns X to Z) are set, regardless of the types of the distribution patterns, an identification strength set in advance is set automatically. Note that, it is possible to configure that when a distribution pattern not included in the setting information Ds is set, a screen with which an identification strength can be selected is displayed and the identification strength is selected manually. The banknote identification device 30 automatically sets an identification strength indicated by the specified strength information. When each banknote is distributed, the banknote identification device 30 identifies the banknote with the set identification strength.

With the configuration described above, operations for setting an identification strength can be omitted and an appropriate identification strength decided by the banknote management device 10 is set in the banknote identification device 30. Therefore, there is an advantage that operator's load is reduced. Further, since an appropriate identification strength is decided by the banknote management device 10, as compared to, for example, a configuration in which an appropriate identification strength is decided by the banknote identification device 30, there is an advantage the processing load on the banknote identification device 30 is reduced.

As is understood from FIG. 13(*a*), an identification strength set automatically at the time of setting a distribution pattern is not displayed on a selection screen. Specifically, the banknote identification device 30 can shift between a first mode in which any identification strength is not displayed and a second mode in which an identification strength is displayed. In principle, the banknote identification device 30 is maintained in the first mode and the mode in which a selection screen is displayed is the first mode. Specifically, in a period from receiving the setting information Ds to performing banknote identification (including a period where a selection screen is displayed), the banknote identification device 30 is in the first mode. Therefore, an operator can perform operations without being concerned about the identification strength. In the first mode, under the condition of performing a predetermined switching operation, the banknote identification device 30 can shift to the second mode.

FIG. 13(*b*) is a schematic diagram of a change screen. The change screen is displayed when the banknote identification device 30 shifts from the first mode to the second mode. Specifically, when a switching operation is performed in a period after receiving the setting information Ds, the banknote identification device 30 displays a change screen on the display unit 32. For example, when a predetermined operation unit (for example, a dedicated switch) of the banknote identification device 30 is operated (an example of the switching operation), the banknote identification device 30 shifts to the second mode.

When touch interactions are made on the change screen accordingly, the banknote identification device 30 according to the second embodiment changes its identification strength. Specifically, the change screen displays the ID display image Gx (similarly to the selection screen). Further, the change screen displays a decision button image Gv and a change button image Gz. The change button image Gz is displayed in each of distribution patterns (distribution patterns included in the setting information Ds) settable in the banknote identification device 30. In the specific example of FIG. 13(*b*), there is assumed a case where a change screen is displayed by a switching operation in a period where the selection screen illustrated in FIG. 13(*a*) described above is displayed. That is, there is assumed a case where the distribution pattern A and the distribution pattern B are included in the setting information Ds (Ds2). In the specific example of FIG. 13(*b*) described above, a change button image Gz corresponding to the distribution pattern A and a change button image Gz corresponding to the distribution pattern B are displayed.

As illustrated in FIG. 13(*b*), the change button image Gz includes an area corresponding to an identification strength “high”, an area corresponding to an identification strength “medium”, and an area corresponding to an identification strength "low". Immediately after a change screen is displayed, among these areas in the change button image Gz, an area corresponding to an identification strength specified based on the setting information Ds (strength information) is in a selective state. That is, immediately after a change screen is displayed, an area corresponding to an identification strength decided by the banknote management device 10 is in a selective state. In the specific example of FIG. 13(*b*), there is assumed a case where an area corresponding to the identification strength "medium" in the change button image Gz corresponding to the distribution pattern A is in a selective state. There is also assumed a case where an area corresponding to the identification strength "high" in the change button image Gz corresponding to the distribution pattern B is in a selective state.

When touch interactions are made on any one of the areas in the change button image Gz, the area having the touch interactions made thereon is switched to be a selective state and other areas are in a non-selective state. Further, when the area in the change button image Gz is set to be a selective state and thereafter touch interactions are made on the decision button image Gv, the identification strength at the time of identifying each banknote in a banknote bundle Bx is switched to the identification strength corresponding to the area. For example, in the specific example of FIG. 13(*b*), a case where touch interactions are made on the decision button image Gv is assumed. In this case, the identification strength at the time of setting the distribution pattern A is set (changed) to be "high" and the identification strength at the time of setting the distribution pattern B is set to be "medium".

When touch interactions are made on the decision button image Gv, a selection screen is displayed instead of a change screen. In the second embodiment, while it has been described that the banknote identification device 30 shifts to the second mode only when a switching operation is performed, it is also possible to configure that shifting to the second mode can be made with other triggers. Further, it is also possible to configure that, when the banknote identification device 30 shifts to the second mode, a password is requested and shifting to the second mode can be made under a condition that a correct password is input. It is also possible to configure that, when the identification strength is changed on the change screen, a change history is stored.

Figure 14:
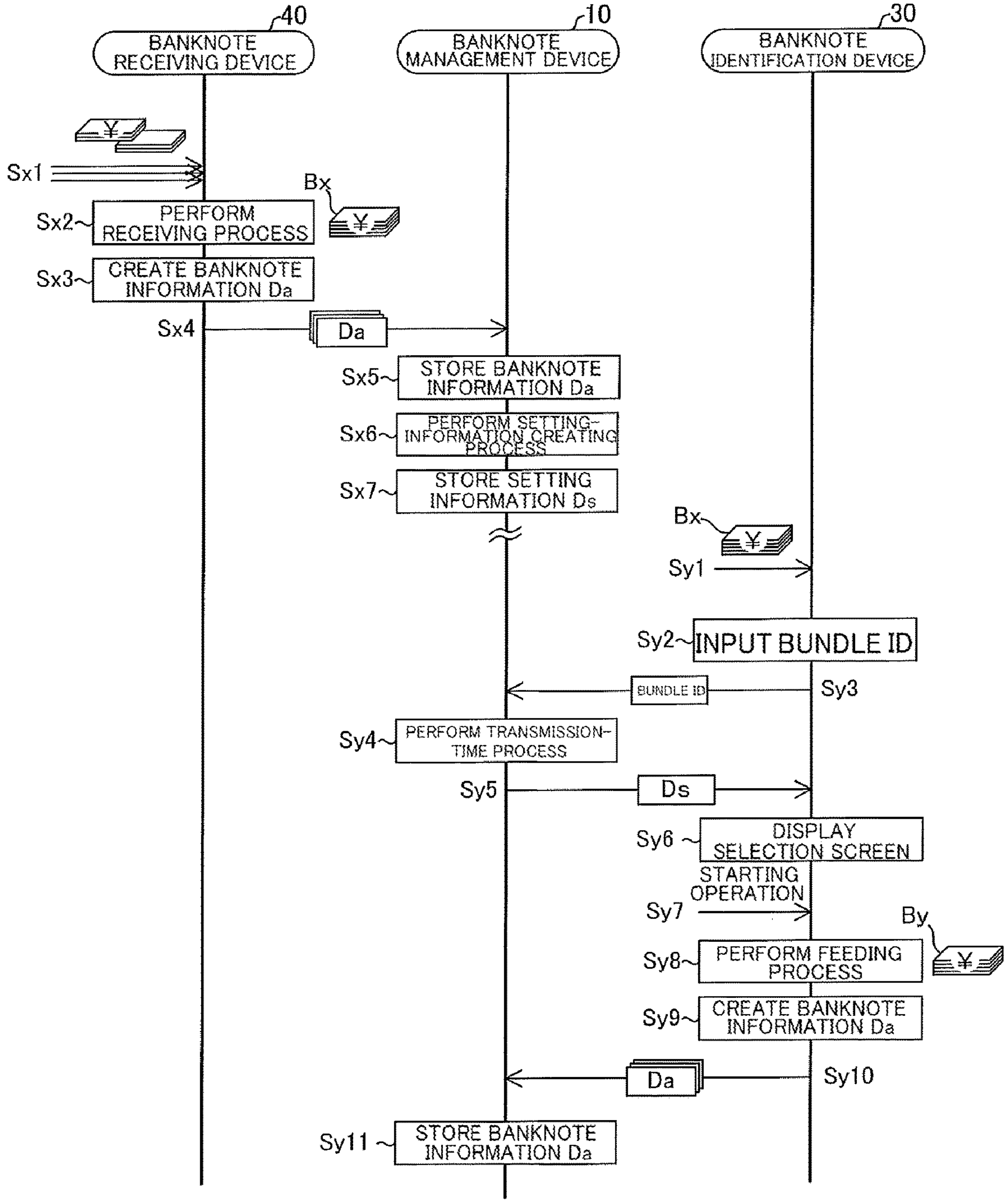
FIG. 14 is a system sequence diagram for explaining operations of the banknote processing system according to the second embodiment.

FIG. 14 is a sequence diagram for explaining a specific example of operations of the banknote processing system 1. As illustrated in FIG. 14, when banknotes are inserted (Sx1), the banknote receiving device 40 can perform a receiving process (Sx2). In the receiving process, these banknotes are received (taken) in the banknote receiving device 40. The banknote receiving device 40 stores these received banknotes therein as a banknote bundle Bx. Further, the banknote receiving device 40 identifies, each time banknotes are received, the serial number, denomination, and orientations (front-sided or back-sided, up-sided or down-sided) of the banknotes and the total number of the received banknotes is counted.

After performing the receiving process, the banknote receiving device 40 creates the banknote information Da (Sx3). Specifically, the banknote receiving device 40 creates the header information Dax including the total number of banknotes included in the banknote bundle Bx, a bundle ID of the banknote bundle Bx, and the model information Dt indicating this banknote receiving device 40. Further, the banknote receiving device 40 creates, with respect to each banknote included in the banknote bundle Bx, the banknote specific information Day indicating the serial number, denomination, and orientation of the banknote, and stores therein a combination of this banknote specific information Day and the header information Dax as the banknote information Da (see FIG. 11(*a*) described above).

When the banknote information Da is created, the banknote receiving device 40 automatically transmits this banknote information Da to the banknote management device 10 (Sx4). Specifically, the banknote receiving device 40 is configured to be able to detect a fact that a banknote bundle Bx has been taken out. When the fact that a banknote bundle Bx has been taken out is detected, the banknote receiving device 40 transmits the banknote information Da to the banknote management device 10. Note that the trigger to cause the banknote receiving device 40 to transmit the banknote information Da is not limited to this example.

Upon reception of the banknote information Da from the banknote receiving device 40, the banknote management device 10 stores therein this banknote information Da (Sx5). Further, the banknote management device 10 performs a setting-information creating process (Sx6). In the setting-information creating process, the setting information Ds is created based on the banknote information Da. Specifically, in the setting-information creating process, distribution patterns settable in the banknote identification device 30 are specified based on the banknote information Da. Further, by using the model information Dt of the banknote information Da and a strength decision table (see FIG. 12(*a*)), strength information of each of the specified distribution patterns is decided. Further, a bundle ID is specified based on this banknote information Da. In the setting-information creating process, setting information Ds including the bundle ID, the distribution patterns, and the strength information described above is created.

The banknote management device 10 stores the setting information Ds created in the setting-information creating process in the setting information DB (Sx7). In the second embodiment, a configuration in which, upon reception of the banknote information Da from the banknote receiving device 40, the banknote management device 10 automatically creates the setting information Ds is employed. However, instead of this configuration, for example, it is also possible to employ a configuration in which reception of a request from the banknote identification device 30 is used as a trigger to create the setting information Ds for the first time.

As illustrated in FIG. 14, a banknote bundle Bx having been taken out from the banknote receiving device 40 is inserted into the banknote identification device 30 (Sy1). When a bundle ID of the banknote bundle Bx is input to the banknote identification device 30 (Sy2), this bundle ID is transmitted to the banknote management device 10 (Sy3). Upon reception of the bundle ID from the banknote identification device 30, the banknote management device 10 performs a transmission-time process (Sy4). In the transmission-time process, setting information Ds to be transmitted to the banknote identification device 30 is decided and this setting information Ds is transmitted to the banknote identification device 30 (Sy5). Specifically, in the transmission-time process, each setting information Ds including the bundle ID received from the banknote identification device 30 is transmitted.

Upon reception of the setting information Ds, the banknote identification device 30 displays a selection screen (see FIG. 13(*a*) described above) on the display unit 32 (Sy6). By operating the display unit 32 accordingly in a state where the selection screen is displayed, an operator can set any one of distribution patterns. Further, after setting a distribution pattern, when a starting operation is performed on the banknote processing device 20 (Sy7), a feeding process (Sy8) is performed.

In the feeding process, each banknote in the banknote bundle Bx is distributed to each stacking portion P with the distribution pattern set at Step Sy6. Further, in the feeding process, each banknotes is identified. Specifically, an identification strength corresponding to the distribution pattern set at Step Sy6 is automatically set and each banknote is identified with the identification strength. The banknote identification device 30 creates banknote information Da based on identification results in the feeding process (Sy9). In the feeding process, the banknote bundle By is formed.

The banknote identification device 30 transmits the banknote information Da created at Step Sy9 to the banknote management device 10 (Sy10). Upon reception of the banknote information Da from the banknote identification device 30, the banknote management device 10 stores this banknote information Da therein (Sy11). The banknote management device 10 uses the banknote information Da received from the banknote identification device 30 to decide an appropriate distribution pattern in the banknote processing device 20 (the sorting device 200). This configuration is described in detail in the third embodiment.

Third Embodiment

Similarly to the first embodiment and the second embodiment described above, the banknote processing system 1 according to the third embodiment is configured to include the banknote management server 100, the sorting device 200, the deposit device 300, and a plurality of receiving devices 400.

In the second embodiment described above, the banknote management server 100 (the banknote management device 10) decides the identification strength in the deposit device 300 (the banknote identification device 30) according to model information from one of the receiving devices 400 (the banknote receiving device 40). This configuration may be also employed in the third embodiment. Further, in the third embodiment, it is also possible to configure that model information indicating the type of the deposit device 400 is transmitted to the banknote management server 100. In this configuration, the banknote management server 100 decides the identification strength set in the sorting device 200 for each distribution pattern according to the type of the deposit device 400 indicated by the model information. Further, the identification strength decided by the banknote management server 100 is notified to the sorting device 200.

When banknotes of an in-batch number of banknotes b are stacked on any one of stacking portions P, the sorting device 200 according to the third embodiment stops a distributing operation of banknotes. The in-batch number of banknotes b in the present embodiment is a value "100" (b=100). For example, a case where banknotes in a banknote bundle B are distributed with "sort by front-sided/back-sided" is assumed. A case where front-sided banknotes are distributed to the stacking portion P1 and back-sided banknotes are distributed to the stacking portion P2 is also assumed. In this case, when the number of banknotes on the stacking portion P1 reaches 100, even when the number of banknotes on the stacking portion P2 is less than 100, a distributing operation is stopped temporarily. An operator takes out the banknote bundle including 100 banknotes from the stacking portion P1 and then resumes the distributing operation by performing a predetermined operation on the sorting device 200.

In the following descriptions, for explanation's sake, a case where banknotes of an in-batch number of banknotes b are stacked on the stacking portion P and a distributing operation is stopped temporarily may be described as "occurrence of batch stoppage". Further, a case where a time required from an occurrence of batch stoppage to resuming the distributing operation may be described as "batch stoppage time". The batch stoppage time includes, for example, a time for taking out a banknote bundle including an in-batch number of banknotes b from the stacking portion P and a time for performing an operation to resume the distributing operation. An average time of the batch stoppage time in the third embodiment is about seven seconds. Further, a time from starting a distributing operation to distributing all banknotes in a banknote bundle B may be described as "distribution time". The distribution time becomes longer as the number of occurrences of batch stoppage is larger.

In the sorting device 200 and the deposit device 300 according to the third embodiment, in respective cases where the sorting pattern is in common to each other, types of distributed banknotes (denomination, up-sided or down-sided, and front-sided or back-sided) can be set variably for each stacking portion P. In this configuration, the number of stacking portions P to which banknotes of a specific type (specified banknotes) are distributed is variable. For example, when the sorting pattern is "sort by front-sided/back-sided", it is possible to set that front-sided banknotes are distributed to one stacking portion P. Further, instead of this setting, it is possible to set that front-sided banknotes are distributed to two stacking portions P.

If front-sided banknotes are distributed to one stacking portion P, as described above, there is an occurrence of batch stoppage each time 100 front-sided banknotes are distributed. Meanwhile, for example, when front-sided banknotes are distributed to two stacking portions P, which are the stacking portion P1 and the stacking portion P2, at the time point where the number of banknotes on the stacking portion P1 reaches 100, batch stoppage does not occur. Specifically, after the number of banknotes on the stacking portion P1 reaches 100, front-sided banknotes are distributed to the stacking portion P2. Thereafter, at the time point where the number of banknotes on the stacking portion P2 reaches 100, batch stoppage occurs. That is, when banknotes of a specific type are distributed to two stacking portions P, batch stoppage may occur each time 200 such banknotes are distributed. Note that, in a period after 100 banknotes are stacked on the stacking portion P1, when a banknote bundle on the stacking portion P1 is taken out before the number of banknotes on the stacking portion P2 reaches 100, batch stoppage does not occur at the time point where the number of banknotes on the stacking portion P2 reaches 100. In this case, after the number of banknotes on the stacking portion P2 reaches 100, banknotes are stacked on the stacking portion P1.

As is understood from the above descriptions, the number of occurrences of batch stoppage may be different according to the pattern of distributing banknotes of various types (hereinafter, "distribution pattern"). This configuration is rephrased that the distribution time is changed with the distribution pattern. Under such circumstances, it is preferable to have a configuration in which the distribution pattern is set such that the distribution time is shortest. Specifically, the less the number of occurrences of batch stoppage, the shorter the distribution time. Therefore, for example, it is preferable to have a distribution pattern in which, among banknotes included in a banknote bundle B, banknotes of a number larger than the in-batch number of banknotes b are distributed to two or more stacking portions P.

However, depending on the operator, there is a case where the number of banknotes of various types included in the banknote bundle B cannot be ascertained (estimated). In this case, there may be an inconvenience that an appropriate distribution pattern cannot be set. In consideration of such circumstances, in the present embodiment, a configuration to avoid such an inconvenience is employed. Specifically, recommend information Db is transmitted from the banknote management server 100 to the sorting device 200. The recommend information Db is information by which an appropriate distribution pattern is specified. Operators can set an appropriate distribution pattern by referring to the distribution pattern specified by the recommend information Db. This configuration is described later in detail.

Figure 15:
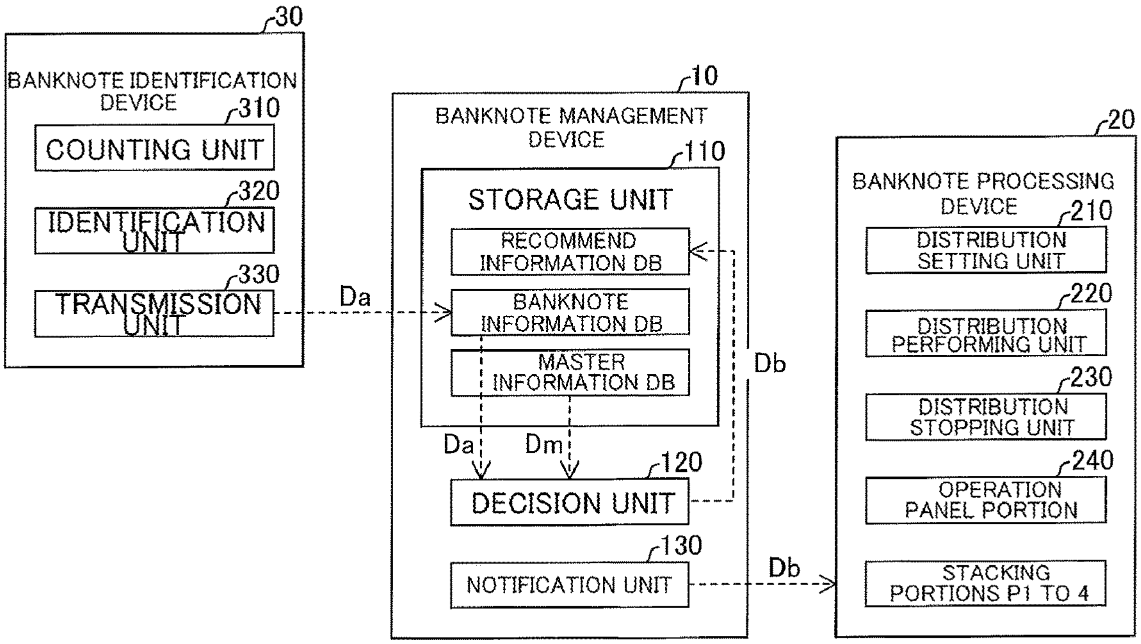
FIG. 15 is a functional block diagram of a banknote processing system according to a third embodiment.

The banknote management server 100 uses the banknote information Da received from the deposit device 300 to create the recommend information Db described above. Specifically, the banknote management server 100 stores therein master information Dm (see FIG. 16(*b*) described later). The master information Dm is information by which performance of the sorting device 200 can be specified. For example, the master information Dm is configured to include a time required for the sorting device 200 to distribute one banknote (hereinafter, "processing speed s"). While the details thereof will be described later, in the third embodiment, a distribution time is estimated (calculated) for each distribution pattern using the banknote information Da and the master information Dm. A distribution pattern having a short (appropriate) distribution time is notified to the sorting device 200 with the recommend information Db based on the estimation results. FIG. 15 is a functional block diagram of the banknote processing system 1 according to the third embodiment. As illustrated in FIG. 15, the banknote processing system 1 is configured to include the banknote management device 10, the banknote processing device 20, and the banknote identification device 30. For example, each function is realized as respective CPUs of the banknote management server 100, the sorting device 200, and the deposit device 300 described above execute programs. Specifically, the banknote management server 100 described above functions as the banknote management device 10. Further, the sorting device 200 functions as the banknote processing device 20 and the deposit device 300 functions as the banknote identification device 30.

The banknote identification device 30 according to the third embodiment has the functions of the banknote identification device 30 according to the second embodiment. Further, as illustrated in FIG. 15, the banknote identification device 30 includes a counting unit 310, an identification unit 320, and a transmission unit 330. The counting unit 310 counts the number of plural banknotes while feeding these banknotes. Further, each of the banknotes fed by the counting unit 310 is stacked and a banknote bundle By is formed (similarly to the second embodiment. See FIG. 9).

When banknotes are fed, the identification unit 320 identifies whether these banknotes are specified banknotes (the type of banknotes) (corresponding to the identification unit 38 according to the second embodiment). Specifically, the identification unit 320 identifies each of the fed banknotes as to what denomination (X, Y, Z, and so on) these banknotes are. Further, the identification unit 320 identifies whether these banknotes are front-sided banknotes or back-sided banknotes and identifies whether these banknotes are up-sided banknotes or down-sided banknotes.

The banknote identification device 30 creates the banknote information Da based on the results of identification performed by the identification unit 320. While the details thereof will be described later, the numbers of banknotes of respective denominations included in a banknote bundle By are specified based on the banknote information Da. Further, the number of front-sided banknotes, the number of back-sided banknotes, the number of up-sided banknotes, and the number of down-sided banknotes are also specified based on the banknote information Da (see FIG. 16(*a*-2)). The banknote information Da described above includes a bundle ID by which the banknote bundle By is specified. The transmission unit 330 transmits the banknote information Da to the banknote management device 10.

The banknote management device 10 according to the third embodiment has the functions of the banknote management device 10 according to the second embodiment. Further, the banknote management device 10 includes a storage unit 110, a decision unit 120, and a notification unit 130. As illustrated in FIG. 15, the storage unit 110 is configured to include a recommend information DB (DataBase), a banknote information DB, and a master information DB. The banknote information DB stores therein the banknote information Da received from the banknote identification device 30 and the master information DB stores therein the master information Dm described above. Further, the recommend information DB stores therein the recommend information Db.

The decision unit 120 creates the recommend information Db. Specifically, the decision unit 120 decides, based on the number of specified banknotes that are specified based on the banknote information Da (for example, the number of banknotes of the denomination X), specified stacking portions on which these specified banknotes are stacked (decides the type (the number) of stacking portions P to which banknotes of the denomination X are distributed). That is, a distribution pattern is decided based on the number of specified banknotes. This configuration is described later in detail. Recommend information Db by which specified stacking portions (a distribution pattern) decided by the decision unit 120 are specified is created and is stored in the recommend information DB.

The notification unit 130 notifies the recommend information Db to the banknote processing device 20. Specifically, when a banknote bundle By is sorted by the banknote processing device 20, a bundle ID of this banknote bundle By is input to this banknote processing device 20. Further, the bundle ID input to the banknote processing device 20 is transmitted to the banknote management device 10. When the bundle ID is input from the banknote processing device 20, the banknote management device 10 (the notification unit 130) searches recommend information Db corresponding to this bundle ID from the recommend information DB and notifies the searched recommend information Db to the banknote processing device 20.

The banknote processing device 20 includes a distribution setting unit 210, a distribution performing unit 220, a distribution stopping unit 230, an operation panel portion 240, and the stacking portions P1 to 4 described above. The distribution setting unit 210 sets any of the stacking portions P as specified stacking portions (stacking portions P to which specified banknotes are distributed). Specifically, as described above, in the third embodiment, the recommend information Db is notified from the banknote management device 10. Further, a distribution pattern is specified based on the recommend information Db. When the operation panel portion 240 of the banknote processing device 20 is operated accordingly, the distribution setting unit 210 sets a distribution pattern notified from the banknote management device 10. Note that it is possible to have a configuration in which a distribution pattern an operator has uniquely determined can be set in addition to a distribution pattern notified with the recommend information Db.

The distribution performing unit 220 distributes specified banknotes among banknotes in a banknote bundle to specified stacking portions. Specifically, the distribution performing unit 220 distributes banknotes in a banknote bundle By to respective stacking portions P according to a distribution pattern set by the distribution setting unit 210. When a predetermined number of banknotes (an in-batch number of banknotes) are stacked on any one of the stacking portions P, the distribution stopping unit 230 stops the distributing operation of banknotes. That is, the distribution stopping unit 230 causes the batch stoppage described above to occur.

Figure 16:
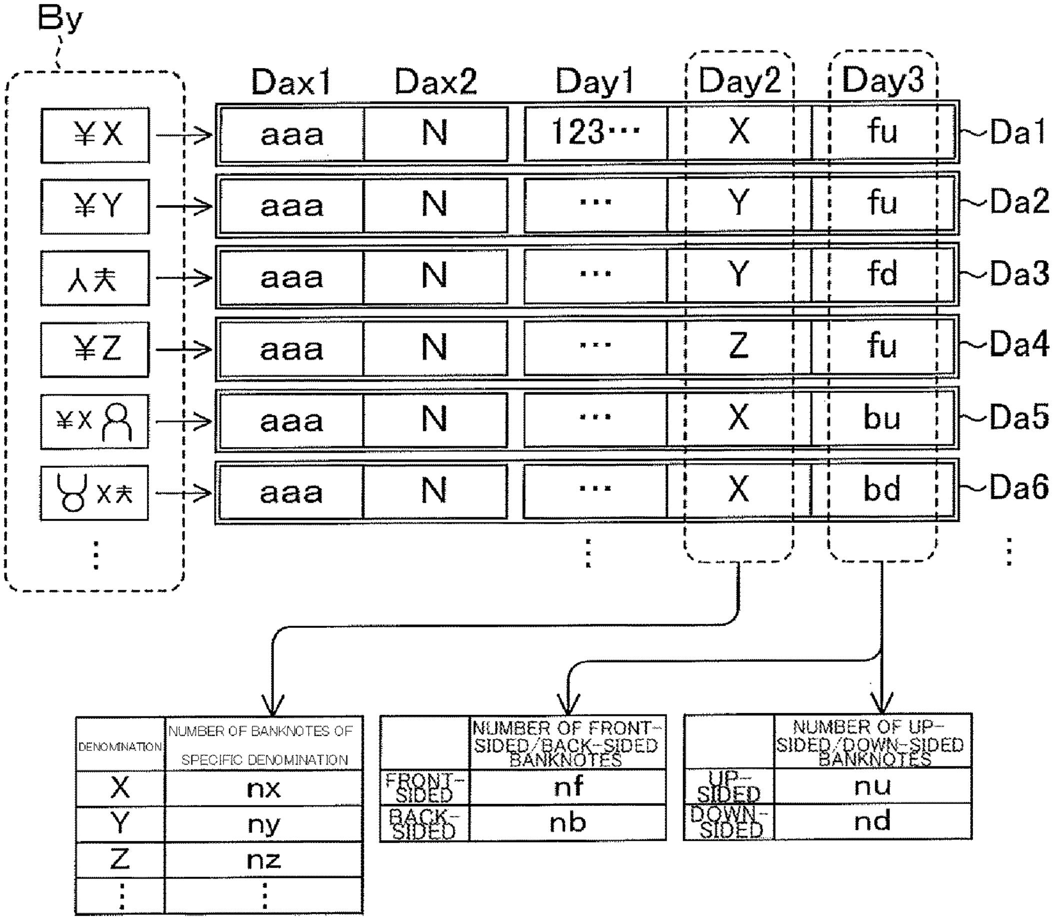
FIG. 16 are explanatory diagrams of specific examples of banknote information and master information in the third embodiment.

FIG. 16(*a*-1) and FIG. 16(*a*-2) are explanatory diagrams of details of the banknote information Da transmitted from the banknote identification device 30. FIG. 16(*a*-1) is a conceptual diagram of a specific example of the banknote information Da. In the third embodiment, similarly to the other embodiments, one piece of banknote information Da corresponding to one banknote is created from this banknote. Therefore, if N banknotes are included in a banknote bundle By, N pieces of banknote information Da are created and are transmitted to the banknote management device 10.

As illustrated in FIG. 16(*a*-1), the banknote information Da in the third embodiment is configured to include the header information Dax and the banknote specific information Day. The header information Dax is configured to include the information Dax1 and the information Dax2. The information Dax1 included in the banknote information Da (the header information Dax) indicates a bundle ID of a banknote bundle By in which banknotes corresponding to the banknote information Da are included. Further, the information Dax2 indicates the total number of banknotes included in the banknote bundle By.

A bundle ID (the information Dax1) of the header information Dax is decided when the banknote identification device 30 counts the number of banknotes. Further, the banknote identification device 30 uses the counting results as the information Dax2 to create the banknote information Da. While one piece of banknote information Da is created with respect to one banknote as described above, the header information Dax in the banknote information Da is in common to respective banknotes included in the same banknote bundle By. The model information Dt indicating the type of the banknote identification device 30 may be included in the banknote information Da created by the banknote identification device 30.

The banknote specific information Day is configured to include the information Day1 to the information Day3. The information Day1 is the serial number of a banknote corresponding to the banknote information Da. Further, the information Day2 is the denomination of this banknote. The information Day3 is the orientation of this banknote. As described above, each of these pieces of information is acquired from the banknote using the banknote identification device 30 (the identification unit 320). In the third embodiment, for explanation's sake, a front-sided and up-sided banknote may be described as "orientation fu banknote". Similarly, a front-sided and down-sided banknote may be described as "orientation fd banknote", a back-sided and up-sided banknote may be described as "orientation bu banknote", and a back-sided and down-sided banknote may be described as "orientation bd banknote". The information Day3 indicates any one of the four orientations (fu, fd, bu, bd) of each banknote.

FIG. 16(*a*-2) is an explanatory diagram of specific examples of the banknote information Da of each banknote in the banknote bundle By. In FIG. 16(*a*-2), a part of (six) banknotes in the banknote bundle By are illustrated in a selective manner. Further, FIG. 16(*a*-2) illustrates a conceptual diagram of banknote information Da (1 to 6) created from each of the banknotes. In the specific examples of FIG. 16(*a*-2), a banknote bundle By including N banknotes is assumed. Further, a banknote bundle By having a bundle ID "aaa" is assumed. In these specific examples, the information Dax1 (the bundle ID) of the header information Dax of the banknote information Da is "aaa", and the information Dax2 (the number of banknotes) is "N".

For example, as illustrated in FIG. 16(*a*-2), from a banknote of the denomination X having the orientation fu (front-sided and up-sided) and a serial number "123 . . . ", banknote information Da1 in which header information Dax is "aaa" (information Dax1), "N" (information Dax2), banknote specific information Day is "123 . . . " (information Day1), "X" (information Day2), and "fu" (information Day3) is created. The banknote information Da is not limited to this example. For example, it is also possible to configure that the banknote information Da includes information indicating an order with respect to a banknote bundle By (an order of banknotes being fed from the banknote identification device 30). Further, it is also possible to configure that the information Day1 (serial number) is omitted from the banknote information Da.

These pieces of banknote information Da described above are transmitted to the banknote management device 10. The banknote management device 10 specifies, based on these pieces of banknote information Da, numbers of banknotes of specific denomination ($n_x$, $n_y$, $n_z$, and so on), numbers of front-sided/back-sided banknotes ($n_f$, $n_b$), and numbers of up-sided/down-sided banknotes ($n_u$, $n_d$). The numbers of banknotes of specific denominations include the number of banknotes of specific denomination $n_x$, the number of banknotes of specific denomination $n_y$, the number of banknotes of specific denomination $n_z$, and so on. The number of banknotes of specific denomination $n_x$, indicates the number of banknotes of the denomination X included in the banknote bundle By. Similarly, each of the number of banknotes of specific denomination $n_y$, the number of banknotes of specific denomination $n_z$, and so on indicates the number of banknotes of the denomination Y, the number of banknotes of the denomination Z, and so on included in the banknote bundle By.

The numbers of banknotes of specific denominations described above are specified by referring to the information Day2 (denomination) of respective pieces of banknote information Da. Specifically, the banknote management device 10 counts the number of pieces of banknote information Da in which the information Day2 is "X" among pieces of banknote information Da having common information Dax1 (bundle ID), and the counting result is specified as the number of banknotes of specific denomination $n_x$. Similarly, for example, the banknote management device 10 specifies, among pieces of banknote information Da having a mutually common bundle ID, the number of pieces of banknote information Da in which the information Day2 is "Y" as the number of banknotes of specific denominations $n_y$, and the number of pieces of banknote information Da in which the information Day2 is "Z" as the number of banknotes of specific denomination $n_z$.

The numbers of front-sided/back-sided banknotes include the number of front-sided/back-sided banknotes $n_f$ and the number of front-sided/back-sided banknotes $n_b$. The number of front-sided/back-sided banknotes $n_f$ indicates the number of front-sided banknotes (orientation fu banknotes and orientation fd banknotes) included in the banknote bundle By. Similarly, the number of front-sided/back-sided banknotes $n_b$ indicates the number of back-sided banknotes (orientation bu banknotes and orientation bd banknotes) included in the banknote bundle By. The numbers of front-sided/back-sided banknotes are created by referring to the information Day3 (orientation) of respective pieces of banknote information Da. Specifically, among respective pieces of banknote information Da having a mutually common bundle ID, the number of pieces of banknote information Da in which the information Day3 is "fu" or "fd" is specified as the number of front-sided/back-sided banknotes $n_f$. Similarly, among respective pieces of banknote information Da having a mutually common bundle ID, the number of pieces of banknote information Da in which the information Day3 is "bu" or "bd" is specified as the number of front-sided/back-sided banknotes $n_b$.

The numbers of up-sided/down-sided banknotes include the number of up-sided/down-sided banknotes $n_u$ and the number of up-sided/down-sided banknotes $n_d$. The number of up-sided/down-sided banknotes $n_u$ indicates the number of up-sided banknotes (orientation fu banknotes and orientation bu banknotes) included in the banknote bundle By. Similarly, the number of up-sided/down-sided banknotes $n_d$ indicates the number of down-sided banknotes (orientation fd banknotes and orientation bd banknotes) included in the banknote bundle By. Similarly to the numbers of front-sided/back-sided banknotes, the numbers of up-sided/down-sided banknotes are created by referring to the information Day3 (orientation) of respective pieces of banknote information Da. Specifically, among respective pieces of banknote information Da having a mutually common bundle ID, the number of pieces of banknote information Da in which the information Day3 is "fu" or "bu" is specified as the number of up-sided/down-sided banknotes $n_u$. Similarly, among respective pieces of banknote information Da having a mutually common bundle ID, the number of pieces of banknote information Da in which the information Day3 is "fd" or "bd" is specified as the number of up-sided/down-sided banknotes $n_d$.

While the details thereof will be described later, the banknote management device 10 uses the numbers of banknotes of specific denominations, the numbers of front-sided/back-sided banknotes, and the numbers of up-sided/down-sided banknotes to calculate "the number of times of stoppage m". The number of times of stoppage m is an estimated number of times of batch stoppage that occurs in a process of distributing each banknote in the banknote bundle By in the banknote processing device 20. The number of times of stoppage m is used when a distribution time required to distribute banknotes in the banknote bundle By is estimated (when an estimated time T described later is calculated).

FIG. 16(*b*) is a conceptual diagram of the master information Dm. As described above, the master information Dm is information indicating the performance of the banknote processing device 20 and is stored in the banknote management device 10 in advance. The master information Dm is changed when, for example, the performance of the banknote processing device 20 is changed (for example, the banknote processing device 20 itself is changed).

As illustrated in FIG. 16(*b*), the master information Dm in the third embodiment includes the in-batch number of banknotes b, the processing speed s, and an average stopping time w. The processing speed s indicates the number of banknotes the banknote processing device 20 can distribute in one second. The in-batch number of banknotes b is the number of banknotes with which batch stoppage occurs. That is, each time b banknotes are stacked on any one of the stacking portions P, a distributing operation is stopped temporarily. The average stoppage time w is an average value (an estimated value) of a batch stoppage time required to resume the distributing operation from an occurrence of batch stoppage. The average stoppage time w in the third embodiment is about seven seconds.

The banknote management device 10 according to the third embodiment uses the banknote information Da and the master information Dm to estimate a distribution time required to distribute banknotes in a banknote bundle By and stores therein the estimation result as "estimated time T". Specifically, the estimated time T is calculated using the following expression 1, and this estimated time T and a bundle ID of this banknote bundle By are stored in an associated manner in the banknote management device 10. "N" in the expression 1 represents the total number of banknotes in the banknote bundle By and it is specified based on the banknote information Da (Dax2) described above. Further, "s" in the expression 1 represents the processing speed s of the master information Dm, "w" represents the average stoppage time w of the master information Dm, and "m" represents the number of times of stoppage m. As described above, the number of times of stoppage m is an estimated number of times of batch stoppage that occurs in a process of distributing banknotes in the banknote bundle By.

$$T=N/s+w\times m \qquad \text{[Expression 1]}$$

As is understood from the expression 1 described above, the estimated time T becomes longer as the number of banknotes N included in the banknote bundle By is larger. The estimated time T becomes longer as the number of times of stoppage m is more. The number of times of stoppage m may be changed according to the stacking portions P to which specific types (denomination, front-sided/back-sided, up-sided/down-sided) of banknotes are distributed. In the third embodiment, specified stacking portions P where the number of times of stoppage m is less are decided by the banknote management device 10 and these stacking portions P are notified to the banknote processing device 20. Specifically, a distribution pattern in which the number of times of stoppage m is less is decided by the banknote management device 10. Details of this configuration are described later.

FIG. 17(*a*-1) to (*a*-4), (*b*-1), (*b*-2), (*c*-1), (*c*-2), and (*d*) are explanatory diagrams of specific examples of setting patterns. The setting patterns are decided prior to deciding the distribution pattern described above (specific types of banknotes distributed to each stacking portion). Specifically, a distribution pattern is decided for each combination of a sorting pattern and a setting pattern according to the types of banknotes included in a banknote bundle By. Specific setting patterns and distribution patterns are described specifically with reference to FIG. 17(*e*-1), (*e*-2), (*f*-1), and (*f*-2). The banknote management device 10 calculates an estimated time T when banknotes are distributed with a decided distribution pattern (hereinafter, it may be simply referred to as "estimated time T of distribution pattern").

Respective banknotes in the banknote bundle By are distinguished as "front-sided banknotes" and "back-sided banknotes". In the third embodiment, for explanation's sake, when the sorting pattern is "sort by front-sided/back-sided", any one type of front-sided banknotes and back-sided banknotes may be described as "first banknotes" and the other type of banknotes may be described as "second banknotes". Further, the banknotes in the banknote bundle By are distinguished as "up-sided banknotes" and "down-sided banknotes". In the third embodiment, when the sorting pattern is "sort by up-sided/down-sided", any one type of up-sided banknotes and down-sided banknotes may be described as "first banknotes" and the other type of banknotes may be described as "second banknotes". Similarly, when the sorting pattern is "sort by denomination", banknotes of each denomination (X, Y, Z, and so on) may be respectively described as "first banknotes", "second banknotes", "third banknotes", and so on.

In the third embodiment described above, banknotes regarded as "first banknotes" are variable in each sorting pattern. Similarly, banknotes regarded as "second banknotes" are variable in each sorting pattern. Only when the sorting pattern is "sort by denomination", "third banknotes" may be included in the banknote bundle By. Each square in FIG. 17(*a*-1) to (*a*-4), (*b*-1), (*b*-2), (*c*-1), (*c*-2), and (*d*) corresponds to each of the stacking portions P (1 to 4). Further, the number indicated in each square in the drawings represents the type of banknotes (first banknotes, second banknotes, and so on) stacked on the stacking portions P to which each of the squares corresponds to.

FIG. 17(*a*-1) is an explanatory diagram of a setting pattern A1. In the setting pattern A1, first banknotes are distributed to all the stacking portions P (1 to 4). This setting pattern A1 may be set when only first banknotes are included in the banknote bundle By. For example, there is assumed a case where, when the sorting pattern is "sort by denomination", banknotes of only one denomination are included in the banknote bundle By. In this case, banknotes of this denomination are first banknotes in the setting pattern A1. Note that even when banknotes other than first banknotes (such as second banknotes) are included in the banknote bundle By, it is possible to set the setting pattern A1 in the banknote processing device 20.

FIG. 17(*e*-1) and FIG. 17(*e*-2) are explanatory diagrams of specific examples of distribution patterns. As described above, the banknote management device 10 decides a distribution pattern for each setting pattern according to the types of banknotes included in the banknote bundle By (first banknotes, second banknotes, and so on). For example, the specific example of FIG. 17(*e*-1) assumes a case where banknotes in a banknote bundle By in which only up-sided banknotes are included are distributed with the sorting pattern "sort by up-sided/down-sided". In this case, a distribution pattern in which the first banknotes are "up-sided banknotes" is decided as the distribution pattern of the setting pattern A1. That is, a distribution pattern in which up-sided banknotes are distributed to all the stacking portions P is decided.

Meanwhile, the specific example of FIG. 17(*e*-2) assumes a case where banknotes included in a banknote bundle By in which only down-sided banknotes are included are distributed with the sorting pattern "sort by up-sided/down-sided". In this case, a distribution pattern in which first banknotes are "down-sided banknotes" is decided as the distribution pattern of the setting pattern A1. That is, a distribution pattern in which down-sided banknotes are distributed to all the stacking portions P is decided. As is understood from the above descriptions, even when the setting pattern is the same, decidable types of distribution patterns are changed according to the type of banknotes included in the banknote bundle By.

FIG. 17(*a*-2) is an explanatory diagram of a setting pattern A2. In the setting pattern A2, first banknotes are distributed to the stacking portion P1 and the stacking portion P2, and second banknotes are distributed to the stacking portion P3 and the stacking portion P4. This setting pattern A2 may be set when two or less types of banknotes (first banknotes and second banknotes) are included in the banknote bundle By. For example, there is assumed a case where, when the sorting pattern is "sort by up-sided/down-sided", both up-sided banknotes and down-sided banknotes are included in the banknote bundle By. In this case, a distribution pattern in which "up-sided banknotes" are "first banknotes" and "down-sided banknotes" are "second banknotes" is decided and an estimated time T of this distribution pattern is calculated. Note that even when only first banknotes are included in the banknote bundle By and three or more types of banknotes are included in the banknote bundle By, it is possible to set the setting pattern A2 in the banknote processing device 20.

In the setting pattern A2, between "first banknotes" and "second banknotes", the number of stacking portions P to which banknotes are distributed is the same (two). Therefore, a distribution pattern in which "up-sided banknotes" are "first banknotes" and "down-sided banknotes" are "second banknotes" and a distribution pattern in which "down-sided banknotes" are "first banknotes" and "up-sided banknotes" are "second banknotes" have a mutually common number of times of stoppage m. That is, these distribution patterns have a mutually common estimated time T.

In the third embodiment, among respective distribution patterns assumed in each combination of a sorting pattern and a setting pattern, as for a distribution pattern in which the estimated time T is always the same, an estimated time T of a predetermined one distribution pattern is calculated and calculations of estimated times T of other distribution patterns are omitted. For example, among respective distribution patterns assumed in the setting pattern A2, one distribution pattern (which banknotes are set to be first banknotes or second banknotes) is predetermined for each type of banknotes included in the banknote bundle By and for each combination of a sorting pattern and a setting pattern. The banknote management device 10 calculates an estimated time T of this distribution pattern.

Specifically, there is assumed a case where both "up-sided banknotes" and "down-sided banknotes" are included in the banknote bundle By and the sorting pattern is "sort by up-sided/down-sided". In this case, as a distribution pattern of the setting pattern A2, a distribution pattern in which "up-sided banknotes" are "first banknotes" and "down-sided banknotes" are "second banknotes" and a distribution pattern in which "down-sided banknotes" are "first banknotes" and "up-sided banknotes" are "second banknotes" are assumed. However, since the estimated time T in each distribution pattern is in common to each another, only the estimated time T of the former distribution pattern is calculated.

FIG. 17(*a*-3) is an explanatory diagram of a setting pattern A3. In the setting pattern A3, first banknotes are distributed to the stacking portion P1, second banknotes are distributed to the stacking portion P2, third banknotes are distributed to the stacking portion P3, and fourth banknotes are distributed to the stacking portion P4. This setting pattern A3 may be set when four or less types of banknotes (first banknotes to fourth banknotes) are included in the banknote bundle By.

For example, there is assumed a case where, when the sorting pattern is "sort by denomination", banknotes of four types of denominations are included in the banknote bundle By. In this case, a distribution pattern in which banknotes of each of the four types of denominations are first banknotes to fourth banknotes, respectively, is decided. In the third embodiment, one distribution pattern (which banknotes are set to be first banknotes, second banknotes, and so on) of the setting pattern A3 is predetermined for each type of banknotes included in the banknote bundle By and for each combination of a sorting pattern and a setting pattern. The banknote management device 10 calculates an estimated time T of this distribution pattern.

FIG. 17(*a*-4) is an explanatory diagram of a setting pattern A3*a*. Similarly to the setting pattern A3 described above, the setting pattern A3*a* may be set when four or less types of banknotes (first banknotes to fourth banknotes) are included in the banknote bundle By. However, the setting pattern A3*a* may be set only when the sorting pattern is "sort by denomination". Further, in the setting pattern A3*a*, even when the type of banknotes included in the banknote bundle By is the same, types of banknotes distributed to each of the stacking portions P (1 to 4) are set to be variable.

Specifically, in the setting pattern A3*a*, among the banknotes in the banknote bundle By, banknotes of a denomination distributed first are distributed to the stacking portion P1. Further, in the setting pattern A3*a*, among the banknotes in the banknote bundle By, banknotes of a denomination distributed second are distributed to the stacking portion P2, banknotes of a denomination distributed third are distributed to the stacking portion P3, and banknotes of a denomination distributed fourth are distributed to the stacking portion P4. While the details thereof will be described later, when the estimated time T in a case of distributing banknotes in the setting pattern A3*a* and the estimated time T in a case of distributing banknotes in another setting pattern are the same, the setting pattern A3*a* is ranked higher than the another setting pattern.

FIG. 17(*b*-1) is an explanatory diagram of a setting pattern B1. In the setting pattern B1, first banknotes are distributed to the stacking portion P1 to the stacking portion P3 and second banknotes are distributed to the stacking portion P4. The setting pattern B1 may be set when two types of banknotes (for example, banknotes of two denominations) are included in the banknote bundle By.

FIG. 17(*f*-1) and FIG. 17(*f*-2) are explanatory diagrams of other specific examples of distribution patterns. FIG. 17(*f*-1) and FIG. 17(*f*-2) both illustrate respective distribution patterns of the setting pattern B1 when the sorting pattern is "sort by denomination". Further, the distribution pattern of FIG. 17(*f*-1) and the distribution pattern of FIG. 17(*f*-2) represent respective distribution patterns when banknotes in the same banknote bundle By are distributed. Specifically, these distribution patterns represent respective distribution patterns in a case of including two types of banknotes, which are banknotes of the denomination X and banknotes of the denomination Y, in the banknote bundle By.

FIG. 17(*f*-1) illustrates a distribution pattern of the setting pattern B1 in which "first banknotes" are "banknotes of the denomination X" and "second banknotes" are "banknotes of the denomination Y". In this distribution pattern, banknotes of the denomination X are distributed to the stacking portion P1 to the stacking portion P3 and banknotes of the denomination Y are distributed to the stacking portion P4. Meanwhile, FIG. 17(*f*-2) illustrates a distribution pattern of the setting pattern B1 in which "first banknotes" are "banknotes of the denomination Y" and "second banknotes" are "banknotes of the denomination X". In this distribution pattern, banknotes of the denomination Y are stacked on the stacking portion P1 to the stacking portion P3 and banknotes of the denomination X are stacked on the stacking portion P4.

In the setting pattern B1 described above, depending on whether banknotes are first banknotes or second banknotes, the numbers of corresponding stacking portions P are different (three and one). Therefore, among the two types of banknotes included in the banknote bundle By, depending on which type of banknotes are set to be first banknotes (depending on the distribution pattern), the number of times of stoppage m may be different. That is, the estimated time T may be different. In consideration of such circumstances, in the third embodiment, the estimated time T when the setting pattern B1 is set is calculated twice as first banknotes and second banknotes are switched (for each distribution pattern). For example, when two types of banknotes, which are banknotes of the denomination X and banknotes of the denomination Y, are included in the banknote bundle By, the estimated time T is calculated for each of the two types of distribution patterns respectively illustrated in FIG. 17(*f*-1) and FIG. 17(*f*-2).

FIG. 17(*b*-2) is an explanatory diagram of a setting pattern B2. In the setting pattern B2, first banknotes are distributed to the stacking portion P1 and the stacking portion P2, second banknotes are distributed to the stacking portion P3, and third banknotes are distributed to the stacking portion P4. The setting pattern B2 may be set in a case where three types of banknotes (banknotes of three denominations) are included in the banknote bundle By. In this setting pattern B2, depending on whether banknotes are first banknotes or other types of banknotes (second banknotes and third banknotes), the numbers of stacking portions P to which the banknotes are distributed are different. Therefore, among the three types of banknotes included in the banknote bundle By, depending on which type of banknotes are set to be the first banknotes, the number of times of stoppage m may be different. That is, the estimated time T may be different.

In consideration of such circumstances, in the third embodiment, respective estimated times T in three distribution patterns having a mutually different estimated time T among the distribution patterns of the setting pattern B2 are calculated. That is, three estimated times T are calculated. In the following descriptions, one distribution pattern among the three distribution patterns may be described as "distribution pattern B2-1", one of the other two distribution patterns may be described as "distribution pattern B2-2", and the remaining one may be described as "distribution pattern B2-3" (specific examples thereof will be explained with reference to FIG. 19(*a*) described later).

In the distribution pattern B2-1, specific types of banknotes stacked on each stacking portion P are variable depending on the types of banknotes included in the banknote bundle By. For example, specific types of banknotes staked on each stacking portion P are different in the distribution pattern B2-1 in a case where banknotes of the denomination X, the denomination Y, and the denomination Z are included in the banknote bundle By and in a case where banknotes of a denomination W, the denomination X, and the denomination Y are included in the banknote bundle By. This holds true for the distribution pattern B2-2 and the distribution pattern B2-3. Further, when the sorting pattern is "sort by front-sided/back-sided" or "sort by orientation", the banknotes in the banknote bundle By are distinguished in up to two types, which are first banknotes and second banknotes. Therefore, the setting pattern B2 may be set only when the sorting pattern is "sort by denomination". In the third embodiment, the three distribution patterns (B2-1 to B2-3) for which the estimated time T is calculated are predetermined for each combination of the denominations of banknotes included in the banknote bundle By.

FIG. 17(*c*-1) and (*c*-2) and FIG. 17(*d*) are explanatory diagrams of setting patterns (C1, C2, and D) in which a mixed bundle is formed. Among the squares in FIG. 17(*c*-1) and (c-2) and FIG. 17(*d*), squares in which a letter "M" is indicated respectively correspond to stacking portions P on which a mixed bundle is formed. Plural types of banknotes (second banknotes, third banknotes, and so on) are distributed to the stacking portions P on which a mixed bundle is formed. The setting patterns in which a mixed bundle is formed can be set when three or more types of banknotes (first banknotes, second banknotes, third banknotes, and so on) are included in the banknote bundle By. Therefore, the setting patterns in which a mixed bundle is formed are set only when the sorting pattern is "sort by denomination".

FIG. 17(*c*-1) is an explanatory diagram of the setting pattern C1. In the setting pattern C1, first banknotes are distributed to the stacking portion P1 to the stacking portion P3 and plural types of banknotes including second banknotes and third banknotes are distributed to the stacking portion P4. That is, a mixed bundle is formed on the stacking portion P4. In this setting pattern C1, depending on which type of banknotes are set to be the first banknotes among plural types of banknotes (denominations) included in the banknote bundle By (depending on the distribution pattern), the estimated time T is changed.

In consideration of such circumstances, the banknote management device 10 according to the third embodiment calculates respective estimated times T of distribution patterns among the distribution patterns of the setting pattern C1 in which estimated times T thereof may be mutually different from one another. For example, when banknotes of k (k is an integer equal to or larger than 3) denominations are included in the banknote bundle By, the number of distribution patterns of the setting pattern C1 in which estimated times T thereof may be mutually different from one another is k ($={}_kC_1$). In this case, k estimated times T are calculated. In the following descriptions, each of the distribution patterns of the setting pattern C1 in which estimated times T thereof are mutually different from one another may be described as "setting pattern C1-1", "setting pattern C1-2", and so on.

FIG. 17(*c*-2) is an explanatory diagram of a setting pattern C2. In the setting pattern C2, first banknotes are distributed to the stacking portion P1, second banknotes are distributed to the stacking portion P2, third banknotes are distributed to the stacking portion P3, and plural types of banknotes including fourth banknotes and fifth banknotes are distributed to the stacking portion P4. That is, a mixed bundle is formed on the stacking portion P4.

In the setting pattern C2, depending on a combination of banknotes set to be first banknotes to third banknotes among plural types of banknotes (denominations) included in the banknote bundle By, the estimated time T is changed. In consideration of such circumstances, the banknote management device 10 according to the third embodiment calculates respective estimated times T of distribution patterns among the distribution patterns of the setting pattern C2 in which estimated times T thereof may be mutually different from one another. For example, when k (k is an integer equal to or larger than 5) types of banknotes are included in the banknote bundle By, estimated times T of ${}_kC_3$ distribution patterns are calculated.

FIG. 17(*d*) is an explanatory diagram of the setting pattern D. In the setting pattern D, first banknotes are distributed to the stacking portion P1 and the stacking portion P2, second banknotes are distributed to the stacking portion P2, and plural types of banknotes including third banknotes and fourth banknotes are distributed to the stacking portion P4. That is, a mixed bundle is formed on the stacking portion P4.

In the setting pattern D, depending on which type of banknotes are set to be first banknotes and second banknotes among plural types of banknotes (denominations) included in the banknote bundle By, the estimated time T is changed. In consideration of such circumstances, the banknote management device 10 according to the third embodiment calculates respective estimated times T of distribution patterns among the distribution patterns of the setting pattern D in which estimated times T thereof may be mutually different from one another. For example, when k (k is an integer equal to or larger than 4) types of banknotes are included in the banknote bundle By, estimated times T of ${}_kP_2$ distribution patterns are calculated.

FIG. 18(*a*) and FIG. 18(*b*) are explanatory diagrams of specific examples of a deciding method of a setting pattern (a distribution pattern) for calculating an estimated time T. When a setting pattern is decided, the banknote management device 10 determines the number of types of banknotes (first banknotes, second banknotes, and so on) included in the banknote bundle By. Specifically, the banknote information Da received from the banknote identification device 30 is used to determine the number of types in each sorting pattern.

As illustrated in FIG. 18(*a*), for example, when the sorting pattern is "sort by denomination" and banknotes of only one denomination are included (only first banknotes are included) in the banknote bundle By, the number of types is determined to be one. Further, when the sorting pattern is "sort by denomination" and banknotes of two denominations are included (first banknotes and second banknotes are included) in the banknote bundle By, the number of types is determined to be two. Similarly, for example, when banknotes of three denominations are included in the banknote bundle By, the number of types is determined to be three, and when banknotes of four denominations are included in the banknote bundle By, the number of types is determined to be four. "k" in FIG. 18(*a*) and FIG. 18(*b*) represents an integer equal to or larger than "5". Note that the banknote bundle By in the third embodiment includes banknotes of up to six denominations. Therefore, the largest value of the number of types is six. That is, "k" in FIG. 18(*a*) and FIG. 18(*b*) is a value "5" or a value "6".

When the sorting pattern is "sort by front-sided/back-sided" and banknotes in the banknote bundle By are all front-sided or back-sided (when there are only first banknotes), the number of types is determined to be one. Meanwhile, when the sorting pattern is "sort by front-sided/back-sided" and both front-sided banknotes and back-sided banknotes are included in the banknote bundle By (when first banknotes and second banknotes are included), the number of types is determined to be two. Similarly, when the sorting pattern is "sort by up-sided/down-sided" and banknotes in the banknote bundle By are all up-sided or down-sided (when there are only first banknotes), the number of types is determined to be one. Meanwhile, when the sorting pattern is "sort by up-sided/down-sided" and both up-sided banknotes and down-sided banknotes are included in the banknote bundle By (when first banknotes and second banknotes are included), the number of types is determined to be two.

FIG. 18(*b*) is an explanatory diagram of a specific example of a setting pattern in which an estimated time T is calculated. In FIG. 18(*b*), the number of distribution patterns in which an estimated time T is calculated is indicated for each number of types of banknotes included in the banknote bundle By and for each setting pattern. Note that in the distribution pattern of the setting pattern A3*a*, an estimated time T is calculated only when the sorting pattern is "sort by denomination".

As described above, in the third embodiment, estimated times T in two distribution patterns of the setting pattern B1 are calculated. Further, in the setting pattern B2, three estimated times T of the distribution pattern B2-1, the distribution pattern B2-2, and the distribution pattern B2-3 are calculated. Estimated times T of ${}_kC_1(k)$ distribution patterns are calculated in the setting pattern C1, estimated times T of ${}_kC_3$ distribution patterns are calculated in the setting pattern C2, and estimated times T of P2 distribution patterns are calculated in a setting pattern DI.

For example, a case where banknotes of three denominations are included in the banknote bundle By is assumed. In this case, the number of types of banknotes when the sorting pattern is "sort by denomination" is determined to be three (see FIG. 18(*a*)). Further, as the estimated time T when the sorting pattern is "sort by denomination", an estimated time T of one type of distribution pattern is calculated in each of the setting pattern A3 and the setting pattern A3*a*, and estimated times T of three types of distribution patterns are calculated in each of the setting pattern B2 and the setting pattern C1 (see FIG. 18(*b*)). That is, eight estimated times T are calculated.

Further, a case where only up-sided banknotes are included and down-sided banknotes are not included in the banknote bundle By is assumed. In this case, the number of types of banknotes when the sorting pattern is "sort by up-sided/down-sided" is determined to be one. Further, as the estimated time T when the sorting pattern is "sort by up-sided/down-sided", an estimated time T of one type of distribution pattern is calculated in each of the setting patterns A1 to 3. That is, three estimated times T are calculated.

Similarly, a case where both front-sided banknotes and back-sided banknotes are included in the banknote bundle By is assumed (the number of types is two). In this case, the number of types of banknotes when the sorting pattern is "sort by front-sided/back-sided" is determined to be two. Further, as the estimated time T when the sorting pattern is "sort by front-sided/back-sided", an estimated time T of one type of distribution pattern is calculated in each of the setting patterns A2 and 3, and estimated times T of two types of distribution patterns are calculated in the setting pattern B1. That is, four estimated times T are calculated.

FIG. 19(*a*) and FIG. 19(*b*) are explanatory diagrams of specific examples of a calculation method of an estimated time T. In the specific examples of FIG. 19(*a*) and FIG. 19(*b*), a case where each estimated time T of each of the distribution patterns (B2-1, B2-2, and B2-3) of the setting pattern B2 is assumed. As described above, in the case of the setting pattern B2, three estimated times T of distribution patterns, which are the distribution pattern B2-1, the distribution pattern B2-2, and the distribution pattern B2-3, are calculated. Further, in the specific examples of FIG. 19(*a*) and FIG. 19(*b*), there is assumed a case where the sorting pattern is "sort by denomination" and banknotes of three denominations, which are the denomination X, the denomination Y, and the denomination Z, are included in the banknote bundle By are included.

As illustrated in FIG. 19(*a*), in the distribution pattern B2-1, banknotes of the denomination X are distributed to the stacking portion P1 and the stacking portion P2, banknotes of the denomination Y are distributed to the stacking portion P3, and banknotes of the denomination Z are distributed to the stacking portion P4. That is, in the distribution pattern B2-1, banknotes of the denomination X are stacked on two stacking portions P, banknotes of the denomination Y are stacked on one stacking portion P, and banknotes of the denomination Z are stacked on one stacking portion P.

In the following descriptions, for explanation's sake, when the sorting pattern is "sort by denomination", the number of stacking portions P to which banknotes of the denomination X are distributed may be described as "distributed number $a_x$". Further, when the sorting pattern is "sort by denomination", the number of stacking portions P to which banknotes of the denomination Y are distributed may be described as "distributed number $a_y$" and the number of stacking portions P to which banknotes of the denomination Z are distributed may be described as "distributed number $a_z$". In the specific example of FIG. 19(*a*), the distributed number $a_x$ is two, the distributed number $a_y$ is one, and the distributed number $a_z$ is one.

As illustrated in FIG. 19(*a*), in the distribution pattern B2-2, banknotes of the denomination Y are distributed to the stacking portion P1 and the stacking portion P2, banknotes of the denomination X are distributed to the stacking portion P3, and banknotes of the denomination Z are distributed to the stacking portion P4. That is, the distributed number $a_x$ is one, the distributed number $a_y$ is two, and the distributed number $a_z$ is one. Similarly, in the distribution pattern B2-3, banknotes of the denomination Z are distributed to the stacking portion P1 and the stacking portion P2, banknotes of the denomination X are distributed to the stacking portion P3, and banknotes of the denomination Y are distributed to the stacking portion P4. That is, the distributed number $a_x$ is one, the distributed number $a_y$ is one, and the distributed number $a_z$ is two.

In the third embodiment, when the sorting pattern is "sort by front-sided/back-sided", the number of stacking portions P to which front-sided banknotes are distributed may be described as "distributed number $a_f$". Further, the number of stacking portions P to which back-sided banknotes are distributed may be described as "distributed number $a_b$". Similarly, when the sorting pattern is "sort by up-sided/down-sided", the number of stacking portions P to which up-sided banknotes are distributed may be described as "distributed number $a_u$" and the number of stacking portions P to which down-sided banknotes are distributed may be described as "distributed number $a_d$".

FIG. 19(*b*) is an explanatory diagram of specific examples of the number of times of stoppage m. As described with the expression 1 ($T=N/s+w\times m$) mentioned above, the number of times of stoppage m is used to calculate the estimated time T. When the number of times of stoppage m is calculated, the banknote management device 10 according to the third embodiment calculates a number of times of batch occurrence r described later. Specifically, when the sorting pattern is "sort by denomination", a number of times of batch occurrence $r_x$, a number of times of batch occurrence $r_y$, a number of times of batch occurrence $r_z$, and so on are calculated. Further, when the sorting pattern is "sort by front-sided/back-sided", a number of times of batch occurrence $r_f$ and a number of times of batch occurrence n are calculated. Similarly, when the sorting pattern is "sort by up-sided/down-sided", a number of times of batch occurrence $r_u$ and a number of times of batch occurrence $r_d$ are calculated.

The number of times of batch occurrence r described above is obtained with each formula in the expression 2. "$n_x$", "$n_y$", "$n_z$", and so on in the expression 2 respectively represent the number of banknotes of specific denomination $n_x$ as the number of banknotes of the denomination X, the number of banknotes of specific denomination $n_y$ as the number of banknotes of the denomination Y, the number of banknotes of specific denomination $n_z$ as the number of banknotes of the denomination Z, and so on (see FIG. 16(*a*-2) described above) included in the banknote bundle By. Further, "$n_f$" and "$n_b$" in the expression 2 respectively represent the number of front-sided/back-sided banknotes $n_f$ as the number of front-sided banknotes and the number of front-sided/back-sided banknotes $n_b$ as the number of back-sided banknotes included in the banknote bundle By. Similarly, "$n_u$" and "$n_d$" in the expression 2 respectively represent the number of up-sided/down-sided banknotes $n_u$ as the number of up-sided banknotes and the number of up-sided/down-sided banknotes $n_d$ as the number of down-sided banknotes included in the banknote bundle By. Further, "b" in the expression 2 represents the in-batch number of banknotes b in the banknote processing device 20 (see FIG. 16(*b*) described above).

$$r_x=n_x/b, r_y=n_y/b, r_z=n_z/b \ldots$$

$$r_f=n_f/b, r_b=n_b/b$$

$$r_u=n_u/b, r_d=n_d/b \quad \text{[Expression 2]}$$

* Numbers after the decimal point are rounded up

The banknote management device 10 calculates the number of times of stoppage m using the number of times of batch occurrence r calculated with the expression 2 described above.

Specifically, the number of times of stoppage m is calculated with each formula in the following expression 3 for each sorting pattern. For explanation's sake, the number of times of stoppage m when the sorting pattern is "sort by denomination" is described as "the number of times of stoppage m1". Further, the number of times of stoppage m when the sorting pattern is "sort by front-sided/back-sided" is described as "the number of times of stoppage m2". Similarly, the number of times of stoppage m when the sorting pattern is "sort by up-sided/down-sided" is described as "the number of times of stoppage m3".

$$m1=m1x+m1y+m1z+ \ldots$$

$$m2=m2f+m2b$$

$$m3=m3u+m3d \quad \text{[Expression 3]}$$

Each term (m1*x*, m1*y*, m1*z*, and so on) of the number of times of stoppage m1, each term (m2*f*, m2*b*) of the number of times of stoppage m2, and each term (m3*u*, m3*d*) of the number of times of stoppage m3 in the expression 3 are obtained with each formula in the following expression 4.

$$m1x=r_x/a_x, m1y=r_y/a_y, m1z=r_z/a_z \ldots$$

$$m2f=r_f/a_f, m2b=r_b/a_b$$

$$m3u=r_u/a_u, m3d=r_d/a_d \quad \text{[Expression 4]}$$

* Numbers after the decimal point are rounded up

"$a_x$" in the expression 4 represents the distributed number $a_x$ of the stacking portion P to which banknotes of the denomination X are distributed when the sorting pattern is "sort by denomination" (see FIG. 19(*a*) described above). Similarly, "$a_y$" and "$a_z$" in the expression 4 respectively represent the distributed number $a_y$ and the distributed number $a_z$. Further, "$a_f$" in the expression 4 represents the distributed number $a_f$ of the stacking portion P to which front-sided banknotes are distributed. Similarly, "$a_b$" in the expression 4 represents the distributed number $a_b$ of the stacking portion P to which back-sided banknotes are distributed. Further, "$a_u$" in the expression 4 represents the distributed number $a_u$ of the stacking portion P to which up-sided banknotes are distributed when the sorting pattern is "sort by up-sided/down-sided". Similarly, "$a_d$" in the expression 4 represents the distributed number $a_d$ of the stacking portion P to which down-sided banknotes are distributed.

In FIG. 19(*b*), specific examples of the number of times of stoppage m1 when the sorting pattern is "sort by denomination" in the case of the setting pattern B2 are illustrated. As described above, in the setting pattern B2, the distributed number a(x, y, z) of each denomination is changed in each distribution pattern (B2-1, B2-2, B2-3). Therefore, the number of times of stoppage m1 may be changed in each distribution pattern.

In the specific examples of FIG. 19(*b*), there is assumed a case where, among the banknotes of denominations (X, Y, Z) included in the banknote bundle By, the number of banknotes of specific denomination $n_x$ of the denomination X is the largest. Specifically, there is assumed a case where the number of banknotes of specific denomination $n_x$ is larger than the in-batch number of banknotes b and is smaller than a value (2b) twice as large as the in-batch number of banknotes b ($2b>n_x>b$). In this case, a value "$n_x/b$" is larger than a value "1" and smaller than a value "2".

The number of times of batch occurrence $r_x$ is a value obtained by rounding up the value "$n_x/b$" after its decimal point (see the expression 2 described above). Therefore, in the specific examples of FIG. 19(*b*), the number of times of batch occurrence $r_x$ is a value "2" ($r_x=2$). Further, as illustrated in FIG. 19(*a*) described above, in the distribution pattern B2-1, the distributed number $a_x$ of the stacking portions P to which banknotes of the denomination X are distributed is two ($a_x=2$). Therefore, the number of times of stoppage m1*x* is a value "1" ($m1x=r_x/a_x=1$).

In the specific examples of FIG. 19(*b*), there is assumed a case where the number of banknotes of specific denomination $n_y$ of the denomination Y included in the banknote bundle By is larger than zero and equal to or less than the in-batch number of banknotes b ($0<n_y\leq b$). That is, a case where the number of times of batch occurrence $r_y$ is a value "1" is assumed ($r_y=1$). As described in FIG. 19(*a*), the distributed number $a_y$ of the stacking portion P to which banknotes of the denomination Y are distributed is one ($a_y=1$). Therefore, the number of times of stoppage m1*y* is a value "1" ($m1y=r_y/a_y=1$).

Further, in the specific examples of FIG. 19(*b*), there is assumed a case where the number of banknotes of specific denomination $n_z$ of the denomination Z included in the banknote bundle By is larger than zero and equal to or less than the in-batch number of banknotes b ($0<n_z\leq b$). That is, a case where the number of times of batch occurrence $r_z$ is a value "1" is assumed ($r_z=1$). As illustrated in FIG. 19(*a*) described above, the distributed number $a_z$ of the stacking portion P to which banknotes of the denomination Z are distributed is one ($a_z=1$). Therefore, the number of times of stoppage m1$z$ is a value "1" (m1$z=r_z/a_z=1$). As described above, the number of times of stoppage m1 in the distribution pattern B2-1 is three (m1=m1$x$+m1$y$+m1$z$=1+1+1=3).

Meanwhile, as illustrated in FIG. 19(*a*) described above, in the distribution pattern B2-2, the distributed number $a_x$ of the stacking portion P to which banknotes of the denomination X are distributed is one ($a_x=1$). Therefore, since the number of times of batch occurrence $r_x$ is a value "2", the number of times of stoppage m1$x$ is a value "2" (m1$x=r_x/a_x=2$). Further, in the distribution pattern B2-2, the distributed number $a_y$ of the stacking portion P to which banknotes of the denomination Y is two ($a_y=2$). Further, since the number of times of batch occurrence $r_y$ is a value "1", a value "$r_y/a_y$" is a value "0.5". Since the number of times of stoppage m1$y$ is a value obtained by rounding up the value "$r_y/a_y$" after its decimal point of $r_y/a_y$, the value becomes "1" (m1$y$=1). Further, in the distribution pattern B2-2, the distributed number $a_z$ of the stacking portion P to which banknotes of the denomination Z is one and the number of times of stoppage m1$z$ becomes a value "1" (similarly to the number of times of stoppage m1$y$).

As is understood from the above descriptions, in the distribution pattern B2-2, the number of times of stoppage m1 (m1=m1$x$+m1$y$+mz1=2+1+1) is a value "4" and is larger than that in the distribution pattern B2-1. Further, in the distribution pattern B2-3, similarly to the distribution pattern B2-2, the number of times of stoppage m1 is a value "4" and is large than that in the distribution pattern B2-1.

As described above, in the specific examples of FIG. 19(*b*), among the distribution patterns of the setting pattern B2, in the distribution pattern B2-1, the number of times of stoppage m1 is the least. Further, the estimated time T (T=N/s+w×m) is shorter as the number of times of stoppage m1 is less. That is, the estimated time T is the shortest in the distribution pattern B2-1. This configuration is rephrased that, among the banknotes in the banknote bundle By (in the examples of FIG. 19(*b*), the denomination X, the denomination Y, and the denomination Z), as the banknotes of a larger number (in the example of FIG. 19(*b*), banknotes of the denomination X) are distributed to a larger number of stacking portions P, the estimated time T is shortened. As described later, the banknote management device 10 gives a higher rank to distribution patterns having a shorter estimated time T.

FIG. 20(*a*) to (*e*) are explanatory diagrams of a ranking process. As described above, the banknote management device 10 decides a distribution pattern in which an estimated time T is calculated according to banknotes included in a banknote bundle By (the banknote information Da) (see FIGS. 20(*a*) and (*b*)). Further, the banknote management device 10 calculates an estimated time T for each of decided distribution patterns. In the ranking process, a rank is given to each distribution pattern based on the estimated times T calculated by the banknote management device 10. Specifically, a higher rank is given to distribution patterns having a shorter estimated time T.

The distribution pattern of the setting pattern A3 described above (see FIG. 17(*a*-3)) is one type in each sorting pattern. In the following descriptions, for explanation's sake, this distribution pattern may be described as "distribution pattern A3". Similarly, the distribution pattern of the setting pattern A3*a* (see FIG. 17(*a*-4)) may be described as "distribution pattern A3*a*".

Meanwhile, there is a case where, among plural distribution patterns, estimated times T calculated by the banknote management device 10 become the same by coincident. In the third embodiment, even distribution patterns having mutually the same estimated time T are ranked variably according to predetermined criteria.

For example, an object of the banknote processing device 20 is originally to sort banknote bundles By (mixed bundles) including plural types of banknotes so as to form a banknote bundle formed of one type of banknotes. Therefore, it is preferable to configure that distribution patterns (C, D) in which mixed bundles are formed in the banknote processing device 20 (see FIG. 17(*c*-1), (*c*-2), and (*d*) described above) are ranked lower than distribution patterns (A, B) in which any mixed bundle is not formed. In consideration of such circumstances, in the third embodiment, each of the distribution patterns (C, D) in which mixed bundles are formed is ranked lower than other distribution patterns (see FIG. 20(*e*) described later).

Further, in the ranking process of the third embodiment, distribution patterns in which the numbers of stacking portions P are equal to one another in each type of banknotes tend to be ranked higher than distribution patterns in which the numbers of stacking portions P are not equal to one another (see FIG. 20(*c*) described later). Specifically, the distribution patterns A (1 to 3, 3*a*) tend to be ranked higher than other distribution patterns (B, C, D) (see FIG. 17(*a*-1) described above). For example, when the estimated time T is the same in the distribution pattern A3 and the distribution pattern B1, the distribution pattern A3 is ranked higher than the distribution pattern B1. In this configuration, stacking portions P on which banknotes are stacked tend to be continuous (highly possible to be adjacent to one another).

For example, when the sorting pattern is "sort by front-sided/back-sided" and the distribution pattern is the distribution pattern A3 (see FIG. 17(*a*-3) described above), up-sided banknotes are distributed to the stacking portion P1 and down-sided banknotes are distributed to the stacking portion P2. That is, banknotes are distributed to adjacent stacking portions P. Meanwhile, when the sorting pattern is "sort by front-sided/back-sided" and the distribution pattern is the distribution pattern B1 (see FIG. 17(*b*-1) described above), up-sided banknotes are distributed to the stacking portion P1 to the stacking portion P3 and down-sided banknotes are distributed to the stacking portion P4.

Note that if the number of up-sided banknotes is equal to or less than the in-batch number of banknotes b, the up-sided banknotes are stacked only on the stacking portion P1 and any banknote is not stacked on the stacking portion P2 and the stacking portion P3. Therefore, banknotes are stacked only on the stacking portion P1 and the stacking portion P4 and there may occur an inconvenience that the efficiency in taking out of banknotes is decreased. According to the configuration of the third embodiment, such an inconvenience is avoided. For explanation's sake, a distribution pattern in which the numbers of stacking portions P are equal to one another in each type of banknotes may be described simply as "equal pattern". Similarly, a distribution pattern in which the numbers of stacking portions P are not equal to one another in each type of banknotes may be described as "unequal pattern".

Further, in the ranking process of the third embodiment, the distribution pattern A3*a* tends to be ranked higher than other distribution patterns (see FIG. 20(*b*) described later). In the distribution pattern A3*a*, among the banknotes in a banknote bundle B, banknotes of a denomination distributed first are distributed to the stacking portion P1. Further, in the distribution pattern A3*a*, among the banknotes in the banknote bundle B, banknotes of a denomination distributed second are distributed to the stacking portion P2, banknotes of a denomination distributed third are distributed to the stacking portion P3, and banknotes of a denomination distributed fourth are distributed to the stacking portion P4. That is, in the distribution pattern A3*a*, types of banknotes respectively distributed to each of the stacking portions P are decided during distribution of the banknotes.

FIG. 20(*a*) to (*e*) are explanatory diagrams of a ranking process performed to give a rank to each distribution pattern in which the sorting pattern is "sort by denomination". In the specific examples of FIG. 20(*a*) to (*e*), a case where the number of types of banknotes in a banknote bundle By is three (first banknotes to third banknotes) is assumed. In this case, respective estimated times T of the distribution pattern A3*a*, the distribution pattern A3, the distribution patterns B2-1 to B2-3, and distribution patterns C1-1 to C1-3 are calculated. In FIG. 20(*a*) to (*e*), whether any mixed bundle is formed is indicated for each distribution pattern. Further, whether it is an equal pattern is indicated for each distribution pattern. Furthermore, a process number as an order of calculating the estimated time T is indicated for each distribution pattern. In the third embodiment, an order of setting patterns for which an estimated time T is calculated is determined in advance. Specifically, an estimated time T is calculated in order of the setting patterns A1, A2, A3, A3*a*, B1, B2, C1, C2, and D.

FIG. 20(*a*) is an explanatory diagram of ranks in respective distribution patterns immediately after a ranking process is started. As described above, ranks of respective distribution patterns are changed according to predetermined criteria. FIG. 20(*a*) illustrates ranks of respective distribution patterns before being changed. In the following descriptions, for explanation's sake, ranks before change is finished may be described as "temporary ranks".

As illustrated in FIG. 20(*a*), when the ranking process is started, a rank a1, a rank a2, and so on are given to respective distribution patterns in which any mixed bundle is not formed in order of shorter estimated times T. In the specific examples of FIG. 20(*a*), among distribution patterns in which any mixed bundle is not formed, the estimated time T of the distribution pattern B2-1 is shortest in 221 seconds and the estimated times T of other distribution patterns are the same in 228 seconds. Therefore, the rank a1 is given to the distribution pattern B2-1 and the rank a2 is given to other distribution patterns.

Further, a rank b1, a rank b2, and so on are given to respective distribution patterns in which mixed bundles are formed in order of shorter estimated times T. Among distribution patterns in which mixed bundles are formed, the estimated time T of the distribution pattern C1-1 is shortest in 228 seconds and the estimated times T of other distribution patterns are the same in 232 seconds. Therefore, the rank b1 is given to the distribution pattern C1-1 and the rank b2 is given to other distribution patterns.

FIG. 20(*b*) is an explanatory diagram of a case where, in the specific examples of FIG. 20(*a*) described above, a change is made to set the rank of the distribution pattern A3*a* to be higher than those of other distribution patterns. As described above, in the specific examples of FIG. 20(*a*), immediately after the ranking process is started, the temporary rank of the distribution pattern A3*a* is the rank a2 and is same as those of other distribution patterns (A3, B2-2, and B2-3). In this case, as illustrated in FIG. 20(*b*), while the temporary rank of the distribution pattern A3*a* is maintained to be the rank a2, the temporary ranks of the other distribution patterns are lowered to the rank a3. At the time point where the ranking process is started, if there is no distribution pattern having a temporary rank same as that of the distribution pattern A3*a*, the change described with reference to FIG. 20(*b*) is omitted.

FIG. 20(*c*) is an explanatory diagram of a case where, in the specific examples of FIG. 20(*b*) described above, a change is made to set the ranks of equal patterns to be higher than those of unequal patterns. As described above, at the time point where the change described with reference to FIG. 20(*b*) is made, the temporary ranks of the distribution pattern A3, the distribution pattern B2-2, and the distribution pattern B2-3 are the same as the rank a3. In this case, while the temporary rank of the distribution pattern A3 as an equal pattern is maintained to be the rank a3, the temporary ranks of other distribution patterns (B2-2 and B2-3) as unequal patterns are lowered to the rank a4. At the time point where the change described with reference to FIG. 20(*b*) is made, if there is no unequal pattern having a temporary rank same as those of equal patterns, the change described with reference to FIG. 20(*c*) is omitted.

Even when the change described with reference to FIG. 20(*b*) and the change described with reference to FIG. 20(*c*) are finished, there is a case where distribution patterns having mutually the same temporary rank still remain. For example, in the specific examples of FIG. 20(*c*) described above, the temporary ranks of the distribution pattern B2-2 and the distribution pattern B2-3 are mutually the same and the temporary ranks of the distribution pattern C1-2 and the distribution pattern C1-3 are mutually the same. In this case, these temporary ranks are changed according to their process numbers so that these distribution patterns have mutually different temporary ranks.

FIG. 20(*d*) is an explanatory diagram of a case where, in the specific examples of FIG. 20(*c*) described above, a change according to a process number is made. In the third embodiment, temporary ranks are changed so that the rank is set higher as the process number is smaller. For example, a process number "4" of the distribution pattern B2-2 is smaller than a process number "5" of the distribution pattern B2-3. In this case, while the temporary rank of the distribution pattern B2-2 is maintained to be the rank a4, the temporary rank of the distribution pattern B2-3 is lowered to be the rank a5. Similarly, a process number "7" of the distribution pattern C1-2 is smaller than a process number "8" of the distribution pattern C1-3. In this case, while the temporary rank of the distribution pattern C1-2 is maintained to be the rank b2, the temporary rank of the distribution pattern C1-3 is lowered to be the rank b3.

FIG. 20(*e*) is an explanatory diagram of specific examples of final ranks of distribution patterns. In the specific examples of FIG. 20(*e*), a case where the changes described above with reference to FIG. 20(*b*) to FIG. 20(*d*) are made in the specific examples of FIG. 20(*a*) is assumed. In FIG. 20(*a*) to FIG. 20(*e*) described above, there has been explained a ranking process when the sorting pattern is "sort by denomination". While detailed descriptions thereof are omitted, similarly to the case where the sorting pattern is "sort by denomination", the banknote management device 10 according to the third embodiment also gives a rank to each of distribution patterns when the sorting pattern is "sort by front-sided/back-sided". Similarly, the banknote management device 10 according to the third embodiment also gives a rank to each of distribution patterns when the sorting pattern is "sort by up-sided/down-sided".

The banknote management device 10 notifies, with the recommend information Db, the banknote processing device 20 of three distribution patterns in order of higher ranks in each sorting pattern. For example, in the specific examples of FIG. 20(*e*), recommend information Db for notifying the distribution pattern B2-1 of a rank 1, the distribution pattern A3*a* of a rank 2, and the distribution pattern A3 of a rank 3 is created by the banknote management device 10 and the recommend information Db is notified to the banknote processing device 20.

It is preferable to have a configuration in which the number of distribution patterns (recommend information Db) notified from the banknote management device 10 to the banknote processing device 20 can be changed. Specifically, it is preferable to have a configuration in which the number of distribution patterns notified to the banknote processing device 20 is changed by changing the setting of the banknote management device 10. In this configuration, it is also possible to configure that the number of distribution patterns can be specified by operating an operation unit of the banknote processing device 20 and the specified number of distribution patterns is notified to the banknote processing device 20.

FIG. 21(*a*) is a conceptual diagram of a specific example of the recommend information Db. As described above, the recommend information Db is information notifying highly-ranked distribution patterns to the banknote processing device 20. As illustrated in FIG. 20(*a*), the recommend information Db is configured to include information Db1 to information Db6. Note that the recommend information Db is not limited to this example. For example, the recommend information Db may be configured to include seven or more types of information.

The information Db1 of the recommend information Db indicates a bundle ID of a banknote bundle By for which an estimated time T is calculated. Further, the information Db2 indicates a sorting pattern for which an estimated time T is calculated. The information Db3 indicates a setting pattern for which an estimated time T is calculated. The information Db4 indicates a distribution pattern for which an estimated time T is calculated. The information Db5 indicates an estimated time T when banknotes are distributed with the distribution pattern indicated by the information Db4. The information Db6 indicates a rank of the distribution pattern indicated by the information Db4. The information Db6 (rank) of the recommend information Db is decided in the ranking process described above.

FIG. 20(*b*) is an explanatory diagram of specific examples of the recommend information Db notified to the banknote processing device 20. In the specific examples of FIG. 20(*b*), there is assumed a case where, when banknotes in a banknote bundle By having a bundle ID “aaa” are distributed with the sorting pattern “sort by denomination”, among the setting pattern B2, the rank of a distribution pattern (an example of B2-1) in which banknotes of the denomination X are distributed to the stacking portion P1 and the stacking portion P2, banknotes of the denomination Y are distributed to the stacking portion P3, and banknotes of the denomination Z are distributed to the stacking portion P4 is highest. Further, a case where the estimated time T when banknotes are distributed with this distribution pattern is about 221 seconds is assumed.

As is understood from FIG. 20(*b*), the banknote management device 10 transmits, to the banknote processing device 20, a total of nine pieces of recommend information including three pieces of recommend information Db in which distribution patterns of the rank 1 to the rank 3 among the distribution patterns of the sorting pattern “sort by denomination” are included, three pieces of recommend information Db in which distribution patterns of the rank 1 to the rank 3 among the distribution patterns of the sorting pattern “sort by up-sided/down-sided” are included, and three pieces of recommend information Db in which distribution patterns of the rank 1 to the rank 3 among the distribution patterns of the sorting pattern “sort by orientation” are included. Note that the number of pieces of recommend information Db transmitted to the banknote processing device 20 is not limited to this example. For example, it is possible to configure that one piece of recommend information Db (a distribution pattern) in each of the sorting patterns (a total of three pieces) is transmitted. Further, it is also possible to configure that four or five or more pieces of recommend information Db (distribution patterns) in each of the sorting patterns are transmitted.

As described above, according to the third embodiment, the decision unit 120 that decides stacking portions set to be specified stacking portions (stacking portions P to which banknotes of the denomination X are distributed) based on the number of specified banknotes (for example, banknotes of the denomination X) that are specified based on the banknote information Da and the notification unit 130 that notifies the banknote processing device 20 of setting information (the recommend information Db) by which the stacking portion P decided by the decision unit 120 is specified are provided. According to this configuration, by following the setting information notified from the banknote management device 10, appropriate specified stacking portions can be set in the banknote processing device 20.

FIG. 22(*a*) is a sequence diagram for explaining specific examples of operations of the banknote processing system 1. As illustrated in FIG. 22(*a*), when banknotes (a banknote bundle By) are inserted (Sa1), the banknote identification device 30 can perform a feeding process (Sa1). In the feeding process, each banknote is sequentially fed and a banknote bundle By is formed. Further, each time banknotes are fed, the banknote identification device 30 identifies the serial number, denomination, and orientations (front-sided/back-sided and up-sided/down-sided) of each of the banknotes.

After performing the feeding process, the banknote identification device 30 creates the banknote information Da (Sa3). Specifically, the banknote identification device 30 decides a bundle ID of the banknote bundle By and creates header information Dax indicating a total number of banknotes included in the banknote bundle By. Further, as for each of the banknotes included in the banknote bundle By, the banknote identification device 30 creates banknote specific information Day indicating the serial number, denomination, and orientations of each of the banknotes and stores therein a combination of the banknote specific information Day and the header information Dax as the banknote information Da (see FIG. 16(*a*) described above). When the feeding process is completed, the banknote information Da is automatically transmitted to the banknote management device 10 (Sa4). Upon reception of the banknote information Da from the banknote identification device 30, the banknote management device 10 stores therein this banknote information Da (Sa5).

Step Sa1 in the third embodiment corresponds to Step Sy1 described in the second embodiment and illustrated in FIG. 14. Further, Step Sa2 to Step Sa5 in the third embodiment correspond to Step Sy8 to Step Sy11 described in the second embodiment and illustrated in FIG. 14, respectively. While Step Sy2 to Step Sy7 in FIG. 14 are omitted in FIG. 22(*a*) and in the third embodiment, the banknote identification device 30 performs these Steps S in practice.

After storing the banknote information Da therein, the banknote management device 10 performs a recommend-information creating process (Sa6) (see FIG. 23(*a*) described later). In the recommend-information creating process, recommend information Db is created based on the banknote information Da. The banknote management device 10 stores the recommend information Db in the recommend information DB (Sa7). In the third embodiment, a configuration in which, upon reception of the banknote information Da, the banknote management device 10 automatically creates the recommend information Db is employed. However, for example, instead of this configuration, it is also possible to employ a configuration in which a fact that a request from the banknote processing device 20 is received is used as a trigger to create the recommend information Db for the first time.

As illustrated in FIG. 22(*a*), the banknote bundle By formed in the banknote identification device 30 is inserted into the banknote processing device (Sb1). When a bundle ID of the banknote bundle By is input to the banknote processing device 20 (Sb2), the bundle ID is transmitted to the banknote management device 10 (Sb3). Upon reception of the bundle ID from the banknote processing device 20, the banknote management device 10 performs a transmission-time process (Sb4) (see FIG. 23(*b*) described later).

In the transmission-time process, recommend information Db to be transmitted to the banknote processing device 20 is decided and this recommend information Db is transmitted to the banknote processing device 20 (Sb5). Upon reception of the recommend information Db, the banknote processing device 20 displays a selection screen (see FIG. 22(*b*) described later) on the operation panel portion 240 (Sb6). As an operator operates the operation panel portion 240 accordingly in a state where the selection screen is displayed, any of distribution patterns can be set. Further, when a starting operation is performed on the banknote processing device 20 after setting the distribution pattern, banknotes in the banknote bundle By are distributed to respective stacking portions P with this distribution pattern.

FIG. 22(*b*) is a schematic diagram of the operation panel portion 240 in which a selection screen is displayed. As illustrated in FIG. 22(*b*), various images including a plurality of selection button images Ga1 to 9, the ID display image Gx, and the execution button image Gy are displayed on the selection screen. In the ID display image Gx, a bundle ID input at Step Sb2 in FIG. 22(*a*) described above is displayed. Further, in each of the selection button images Ga, a distribution pattern specified based on the recommend information Db received at Step Sb5 in FIG. 22(*a*) is displayed.

Specifically, a distribution pattern of the rank 1 when banknotes are distributed with the sorting pattern "sort by denomination" is displayed in the selection button image Ga1. Further, a distribution pattern of the rank 2 when banknotes are distributed with the sorting pattern "sort by denomination" is displayed in the selection button image Ga2, and a distribution pattern of the rank 3 is displayed in the selection button image Ga3. Similarly, distribution patterns of the ranks 1 to 3 when banknotes are distributed with the sorting pattern "sort by front-sided/back-sided" are respectively displayed in the selection button images Ga4 to 6. Further, distribution patterns of the ranks 1 to 3 when banknotes are distributed with the sorting pattern "sort by up-sided/down-sided" are respectively displayed in the selection button images Ga7 to 9.

An operator can cause any one of the selection button images Ga to be in a selective state by making touch interactions on the operation panel portion 240. In the specific examples of FIG. 22(*b*), a case where the selection button image Ga1 is in a selective state is assumed. When an operator makes touch interactions on the execution button By after causing the selection button image Ga to be in a selective state, distribution of banknotes is started with the distribution pattern displayed in this selection button image Ga. For example, in the specific examples illustrated in FIG. 22(*b*), when touch interactions are made on the execution button By, distribution of banknotes is started with the distribution pattern B2-1 of the sorting pattern "sort by denomination".

In some cases, work efficiency is improved when plural banknote bundles By are inserted in a lump into the banknote processing device 20 and banknotes in the plural banknote bundles By are distributed at one time. In consideration of such circumstances, in the third embodiment, a configuration in which banknotes in plural banknote bundles By can be distributed at one time with a distributed pattern notified with the recommend information Db is employed.

Specifically, the banknote processing device 20 is configured to be able to have plural banknote bundles By inserted therein in a lump and to have plural bundle IDs input therein. In this case, plural bundle IDs are displayed in the ID display image Gx in array. For example, in the specific example of FIG. 22(*b*), a case where a banknote bundle By having a bundle ID "aaa" and a banknote bundle By having a bundle ID "bbb" are inserted in a lump is assumed. This configuration is described later in detail with reference to FIG. 23(*b*).

Figure 23:
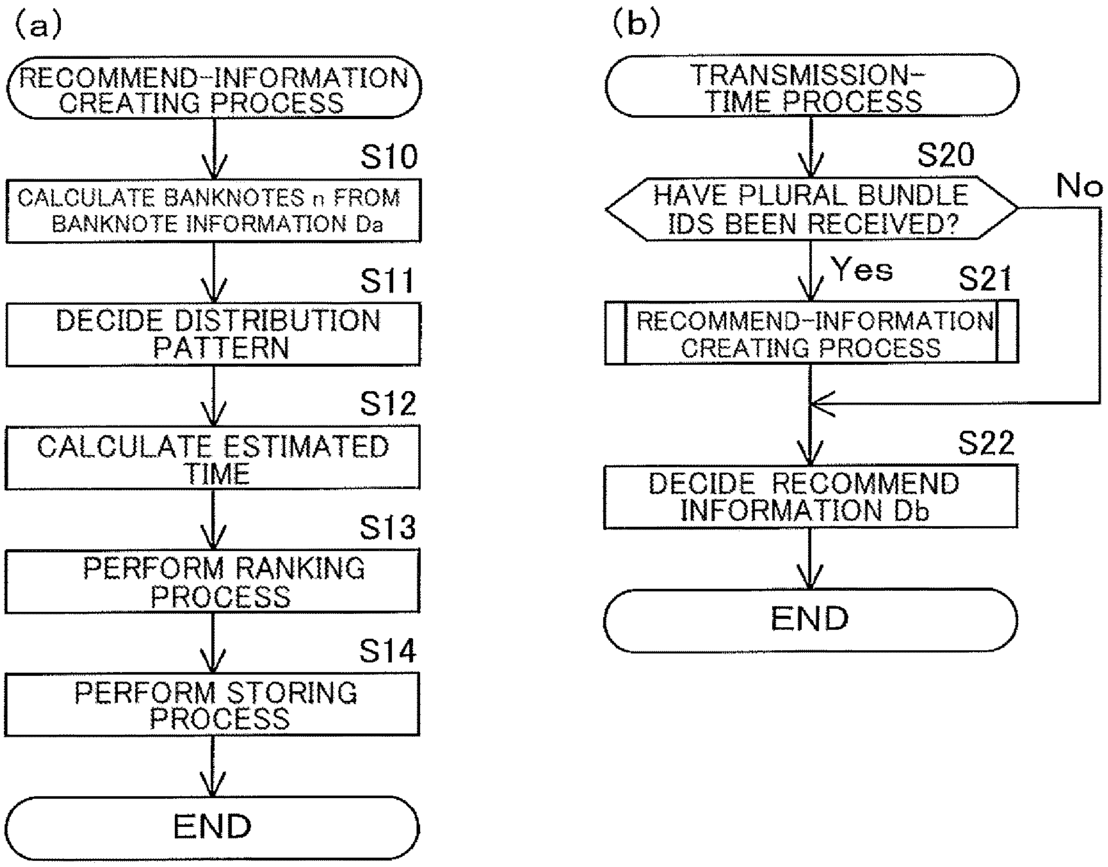
FIG. 23 are flowcharts of respective processes of a banknote management device according to the third embodiment.

FIG. 23(*a*) is a flowchart of the recommend-information creating process (Sa5 in FIG. 22(*a*)). As described above, upon reception of the banknote information Da from the banknote identification device 30, the banknote management device 10 performs the recommend-information creating process. Note that even in the transmission-time process described later (see FIG. 23(*b*)), there is a case where the recommend-information creating process is performed.

As illustrated in FIG. 23(*a*), when the recommend-information creating process is started, the banknote management device 10 uses the banknote information Da to calculate the numbers of banknotes of specific denomination n (x, y, z, and so on) that are numbers of banknotes of respective denominations included in a banknote bundle By (S10). Further, the banknote management device 10 calculates the number of front-sided/back-sided banknotes $n_f$ that is the number of front-sided banknotes and the number of front-sided/back-sided banknotes $n_b$ that is the number of back-sided banknotes. Similarly, the banknote management device 10 calculates the number of up-sided/down-sided banknotes $n_u$ that is the number of up-sided banknotes and the number of up-sided/down-sided banknotes $n_d$ that is the number of down-sided banknotes. Further, the banknote management device 10 specifies the number of types of banknotes included in the banknote bundle By based on the banknote information Da (see FIG. 18(*a*) described above) and decides a setting pattern according to the specified number of types of banknotes (see FIG. 18(*b*) described above). Thereafter, the banknote management device 10 decides a distribution pattern according to the types of banknotes included in the banknote bundle By (S11).

The banknote management device 10 calculates each estimated time T when banknotes are distributed with each distribution pattern decided at Step S11 described above (S12). Specifically, the banknote management device 10 calculates the number of times of batch occurrence r using the numbers of banknotes of specific denomination n (x, y, z, and so on), the numbers of front-sided/back-sided banknotes n (f, b), or the numbers of up-sided/down-sided banknotes n (u, d) calculated at Step S10 described above, and the in-batch number of banknotes b (see the expression 2 described above). Further, the number of times of stoppage m is calculated using the distributed number a and the number of times of batch occurrence r of stacking portions P to which banknotes are distributed (see the expression 3 and the expression 4 described above). Further, estimated times T are calculated using a total number N of banknotes in the banknote bundle By, the processing speed s, the average stopping time w, and the number of times of stoppage m (see the expression 1 described above).

Thereafter, the banknote management device 10 uses each estimated time T of each distribution pattern calculated at Step S12 described above to perform the ranking process (S13) and decides the rank of each distribution pattern (see FIG. 20(*a*) to (*e*) described above). Further, the banknote management device 10 creates recommend information Db based on a bundle ID extracted from the banknote information Da, a sorting pattern, the setting pattern and the distribution pattern decided at Step S11 described above, the estimated time T calculated at Step S12, and the rank decided at Step S13 and stores the created recommend information Da therein (S14), thereby ending the recommend-information creating process.

FIG. 23(*b*) is a flowchart of the transmission-time process (Sb4 in FIG. 22(*a*)). As described above, upon reception of a bundle ID of a banknote bundle By from the banknote processing device 20, the banknote management device 10 performs the transmission-time process. As illustrated in FIG. 23(*b*), when the transmission-time process is started, the banknote management device 10 determines whether the number of bundle IDs received from the banknote processing device 20 is plural (S20). That is, whether banknotes of plural banknote bundles By are distributed by the banknote processing device 20 is determined.

When it is determined that one bundle ID is received from the banknote processing device 20 (S20: No), the banknote management device 10 advances the process to Step S22 and decides recommend information Db to be transmitted to the banknote processing device 20. Specifically, when the number of bundle IDs received from the banknote processing device 20 is one, recommend information Db including this bundle ID is searched from the recommend information DB and transmission of this recommend information Db to the banknote processing device 20 is decided. That is, when the number of bundle IDs received from the banknote processing device 20 is one, upon reception of banknote information Da, already-created recommend information Db is transmitted to the banknote processing device 20.

Meanwhile, when it is determined that plural bundle IDs are received from the banknote processing device 20 (S20: Yes), the banknote management device 10 performs the recommend-information creating process again (S21). In this recommend-information creating process, respective steps S (10 to 14) are performed while a banknote bundle in which plural banknote bundles By are bundled in one is regarded as a new banknote bundle By. Specifically, in the recommend-information creating process in the transmission-time process, with respect to each bundle ID received from the banknote processing device 20, banknote information Da including a corresponding bundle ID is extracted from the banknote information DB. Further, based on each banknote information Da of respective banknotes in two banknote bundles By, the total number of the banknotes in the two banknote bundles By is calculated and the calculation result is stored as a new number of banknotes N.

Similarly, a new number of banknotes of specific denomination, a new number of front-sided/back-sided banknotes, and a new number of up-sided/down-sided banknotes used to decide a distribution pattern are calculated using each banknote information Da of each banknote in each banknote bundle By. The banknote management device 10 uses each information calculated based on each banknote information Da of each banknote in each banknote bundle By to calculate a new estimated time T and decides the rank of each distribution pattern by performing the ranking process. Further, recommend information Db including the estimated time T and the rank is newly created. Bundle IDs of this recommend information Db are in array of bundle IDs of respective banknote bundles By (two bundle IDs). The banknote management device 10 decides new recommend information Db created at Step S21 as recommend information Db to be transmitted to the banknote processing device 20 and ends the transmission-time process. The newly created recommend information Db is stored in the recommend information DB.

Modification

The respective embodiments described above are variously modified. Specific aspects of modifications are exemplified below. Two or more aspects arbitrarily selected from the following exemplifications may be appropriately combined with one another.

(1) In the respective embodiments described above, while a specific example in which the number of stacking portions P in the banknote processing device 20 is four has been described, the number of stacking portions P is not limited to four. For example, it is possible to configure that the banknote processing device 20 includes eight stacking portions P or includes two, three, five to seven, or nine stacking portions P or more. In this configuration, the banknote information Da and the recommend information Db are changed accordingly.

(2) In the respective embodiments described above, it is also possible to configure that plural banknote bundles B can be formed at one time on one stacking portion P in the banknote processing device 20. Specifically, it is possible to configure that the banknote processing device 20 can shift to a mode in which one banknote bundle B is formed on a stacking portion P (hereinafter, "normal batch mode") and a mode in which two banknote bundles B are formed on a stacking portion P (hereinafter, "double batch mode"). In this configuration, batch stoppage occurs each time banknotes of the in-batch number of banknotes b are distributed in the normal batch mode and batch stoppage occurs each time banknotes twice the number of the in-batch number of banknotes b are distributed in the double batch mode. Information indicating the current mode of the banknote processing device 20 is included in, for example, the master information Dm. When the banknote processing device 20 is in the normal batch mode, the banknote management device 10 calculates an estimated time T using the expression 2 described above. When the banknote processing device 20 is in the double batch mode, the banknote management device 10 plugs in a value twice as large as the in-batch number of banknotes b in "b" in the expression 2 to calculate an estimated time T.

(3) In the respective embodiments described above, the banknote management device 10 calculates an estimated time T for sorting patterns "sort by denomination", "sort by orientation", and "sort by front-sided/back-sided", and any of the sorting patterns "sort by denomination", "sort by orientation", and "sort by front-sided/back-sided" can be set in the banknote processing device 20. That is, the sorting pattern for which the banknote management device 10 calculates an estimated time T and the sorting pattern settable in the banknote processing device 20 are in common to each other. However, it is also possible to have a configuration in which the sorting pattern for which the banknote management device 10 calculates an estimated time T and the sorting pattern settable in the banknote processing device 20 are different from each other. For example, it is also possible to have a configuration in which a sorting pattern other than the sorting pattern for which the banknote management device 10 calculates an estimated time T is settable in the banknote processing device 20 according to judgment of an operator.

(4) In the respective embodiments described above, it is also possible to have a configuration in which, in the banknote management device 10, the recommend information Db can be transmitted to plural banknote processing devices 20. In this configuration, the banknote management device 10 stores therein plural pieces of master information Dm respectively corresponding to the plural banknote processing devices 20. The master information Dm indicates the performance of a banknote processing device 20 corresponding to these pieces of master information Dm. Further, the banknote management device 10 uses these pieces of master information Dm to create recommend information Db to be transmitted to the banknote processing device 20 corresponding to these pieces of master information Dm.

(5) In the respective embodiments described above, it is also possible to configure that banknotes in plural banknote bundles Bx can be distributed at one time (bundled) in the banknote identification device 30. Specifically, respective bundle IDs of plural banknote bundles Bx can be input to the banknote identification device 30. When plural bundle IDs are input to the banknote identification device 30, these bundle IDs are displayed in array in the ID display image Gx of the banknote identification device 30 (see FIG. 13(*a*) and FIG. 13(*b*)). Further, each of the bundle IDs input to the banknote identification device 30 is transmitted to the banknote management device 10. The banknote management device 10 extracts information including any of the bundle IDs from banknote information Da received from the banknote receiving device 40. That is, banknote information Da of plural banknote bundles Bx is extracted. Further, the banknote management device 10 uses the extracted banknote information Da to decide a distribution pattern that can be set in the banknote identification device 30 with respect to a new banknote bundle Bx formed of banknotes included in bundled banknote bundles Bx. Thereafter, the banknote management device 10 decides strength information for each decided distribution pattern and creates setting information Ds of a new banknote bundle Bx.

Specifically, respective pieces of setting information Ds of bundled banknote bundles Bx are created before these banknote bundles Bx are inserted into the banknote identification device 30. The banknote management device 10 decides strength information indicating the highest identification strength among pieces of strength information of distribution patterns in the pieces of setting information Ds as strength information of the distribution pattern in a new banknote bundle Bx and creates setting information Ds of the new banknote bundle Bx. For example, there is assumed a case where the banknote bundle Bx (bundle ID=aaa) described in the specific example illustrated in FIG. 12(*c*-1) and the banknote bundle Bx (bundle ID=bbb) described in the specific example illustrated in FIG. 12(*c*-2) are bundled with each other. Further, as a distribution pattern of the new banknote bundle Bx, there is assumed a case where the distribution pattern A and the distribution pattern B are settable in the banknote identification device 30. Furthermore, there is assumed a case where, in a case of the banknote bundle Bx having a bundle ID "aaa", setting information Ds in which an identification strength "high" is set in the distribution pattern A and an identification strength "medium" is set in the distribution pattern B is created in advance (similarly to FIG. 12(*c*-1)). Similarly, there is assumed a case where, in a case of the banknote bundle Bx having a bundle ID "bbb", setting information Ds in which an identification strength "low" is set in the distribution pattern A and an identification strength "low" is set in the distribution pattern B is created in advance (similarly to FIG. 12(*c*-2)). In the above cases, setting information Ds in which strength information of the distribution pattern A of the new banknote bundle Bx is set with an identification strength "high" and strength information of the distribution pattern B of the new banknote bundle Bx is set with an identification strength "medium" is created. Note that the method of deciding strength information of the new banknote bundle Bx is not limited to the example described above.

(6) In the respective embodiments described above, the timing of deleting the banknote information Da (1 to 4) from the banknote management device 10 can be changed accordingly. Note that it is possible to configure that the banknote information Da (1 to 4) in the banknote management device 10 are not deleted in principle. For example, there is assumed a case where banknotes dispensed from the cash center CC are deposited to the cash center CC again after being circulated in the market. In this modification, banknote information Da of the banknotes created previously at the cash center CC is stored in the banknote management device 10 even at the time point where these banknotes are deposited at the cash center CC again. Further, apart from the previously created banknote information Da, banknote information Da (1 to 4) is newly created and the both pieces of banknote information Da are stored in the banknote management device 10.

There is assumed a configuration in which deposit time and date information indicating the time and date when banknotes are deposited at the cash center CC is included in the banknote information Da1 and dispense time and date information indicating the time and date when banknotes are dispensed from the cash center CC is included in the banknote information Da4. In this configuration, the time and date when banknotes are dispensed from the cash center previously and the time and date when the banknotes are deposited at the cash center CC this time are respectively specified based on the banknote information Da (1, 4). That is, the period where these banknotes have circulated in the market can be ascertained.

In this modification, it is preferable to have a configuration in which, when banknotes previously dispensed from the cash center CC are deposited again, the banknote management device 10 automatically detects this fact and makes it notifiable. Further, in the respective embodiments described above, it is preferable to have a configuration in which banknote information Da of banknotes being processed at the cash center CC and banknote information Da of banknotes already dispensed from the cash center CC are stored in the banknote management device 10 in a distinguishable manner. In this configuration, when serial numbers of banknotes being processed at the cash center CC are included in the banknote information Da of banknotes already dispensed in the past, the banknote management device 10 can determine that these banknotes are those deposited at the cash center CC in the past.

Further, in the above configuration, there is assumed a configuration in which damage information indicating the degree of damage on a banknote (for example, the evaluated values described above) is included in the banknote information Da. In this configuration, both the degree of damage on the banknote when it is dispensed from the cash center CC previously and the degree of damage on the banknote when it is deposited at the cash center CC this time are ascertained based on the banknote information Da. That is, it is possible to estimate the change of the degree of damage on this banknote in the market. Further, a relationship between the period where the banknote has been in the market and the change of the degree of damage (degradation) on the banknote in the market can be analyzed.

Further, in this configuration, there is assumed a configuration in which version number information indicating the version number of a banknote (whether it is an old banknote or a new banknote) is included in the banknote information Da. In this configuration, a ratio between old banknotes and new banknotes among banknotes transported to the cash center CC can be ascertained based on the banknote information Da. Further, it is possible to ascertain a time change of the ratio between old banknotes and new banknotes transported to the cash center CC based on a combination between the deposit time and date information and the version number information in the banknote information Da. With this configuration, a time change of penetration ratio of new banknotes can be estimated.

In the respective embodiments described above as well as this modification, it is possible to configure that any serial number can be searched from the banknote information Da stored in the banknote management device 10. Further, it is possible to configure that banknote information Da including the searched serial number can be displayed in a selective manner. For example, in the computer Pc, the banknote information Da stored in the banknote management device 10 is made displayable. Further, by operating an operation unit of the computer Pc (for example, a keyboard), any serial number can be input and banknote information Da including the input serial number is displayed on a display. For example, a combination of the banknote information Da1 to the banknote information Da4 is displayed with respect to one banknote (one serial number). Note that, in this configuration, a serial number can be searched for each type of banknote information Da. For example, it is possible to configure that a specific serial number can be searched from the banknote information Da1, and when the serial number is included in the banknote information Da1, banknote information Da including this serial number can be displayed in a selective manner.

(7) In the respective embodiments described above, an order of banknotes in a banknote bundle may be included in the banknote information Da (1 to 4). Further, it is possible to configure that in the input device 50, under a condition that the serial number of a banknote in a predetermined order (for example, first) is read, a dispensing unit ID is given to each banknote in the banknote bundle in which the above banknote is included. According to this configuration, a situation such that the order of banknotes in a banknote bundle is switched unnecessarily is avoided.

(8) In the respective embodiments described above, while it is configured that a dispensing unit ID is included in lost banknote information Dx, the lost banknote information Dx is not limited to this example. For example, there is assumed a configuration in which respective banknotes in common banknote bundles Bz are bundled with one another and transported in principle. In this configuration, bundle IDs of the banknote bundles Bz may be included in the lost banknote information Dx. In this configuration, upon reception of the lost banknote information Dx, the banknote management device 10 specifies each serial number of each banknote in the banknote bundle Bz having a bundle ID included in this lost banknote information Dx. Further, the banknote management device 10 creates a lost banknote list L including each of the specified serial numbers.

(9) In the respective embodiments described above, banknotes are employed as an example of "paper sheets" in the present invention. However, the present invention can be also applied to securities sch as cash vouchers and gift certificates, cards, and paper sheets (sheets) other than banknotes.

Summary of Operations and Effects of Aspect Examples of the Embodiment

First Aspect

A paper sheet processing system (the banknote processing system 1) according to the present aspect is a paper sheet processing system (1) comprising: a paper sheet processing device (40, 20) that counts number of paper sheets; and a paper sheet management device (10) that is communicable with the paper sheet processing device, wherein the paper sheet processing device includes an acquiring unit (401, 201) that acquires paper sheet identification information (serial number) uniquely identifying the paper sheets from corresponding paper sheets, and a transmission unit (402, 202) that transmits the acquired paper sheet identification information to the paper sheet management device, and the paper sheet management device includes a reception unit (101) that receives the paper sheet identification information, a specifying unit (102) that specifies the paper sheet identification information of lost ones among the paper sheets, and a notification unit (104) that notifies the paper sheet identification information specified by the specifying unit to an external device. According to this aspect, serial numbers of lost banknotes are notified to an external device and theft of banknotes is prevented.

Second Aspect

In the paper sheet processing system according to this aspect, the paper sheets are bundled with one another in a predetermined dispensing unit and transported, and the paper sheet management device includes a storage unit that associates bundle identification information (bundle ID) identifying a paper sheet bundle formed of respective paper sheets counted by the paper sheet processing device with the paper sheet identification information of these paper sheets and stores therein these pieces of information (see FIG. 3(*b*) and FIG. 6(*b*)), receives, from an input device (50) to which the paper sheet identification information of a part of paper sheets forming the paper sheet bundle is input, this paper sheet identification information, and upon reception of the paper sheet identification information of a part of paper sheets forming the paper sheet bundle, associates dispensing unit information specifying a common one of the dispensing unit with the paper sheet identification information of all paper sheets forming this paper sheet bundle and stores therein these pieces of information. According to this aspect, for example, as compared to a configuration in which it is necessary to input paper sheet identification information of all paper sheets forming a paper sheet bundle to an input device, an operation of giving dispensing unit information to each paper sheet is simple.

Third Aspect

In the paper sheet processing system according to the present aspect, the paper sheet management device receives lost paper sheet information including the dispensing unit information, and upon reception of the lost paper sheet information, searches the dispensing unit information included in the lost paper sheet information from the storage unit, and the specifying unit specifies the paper sheet identification information corresponding to the searched dispensing unit information (see FIG. 7(*b*)). According to this aspect, for example, as compared to a configuration in which it is necessary to transmit all serial numbers of lost banknotes separately to a paper sheet management device, a process (operation) of identifying lost banknotes is simple.

Fourth Embodiment

A paper sheet processing method according to the present aspect is a paper sheet processing method using a paper sheet processing device that counts number of paper sheets and a paper sheet management device that is communicable with the paper sheet processing device, the method comprising: a step at which the paper sheet processing device acquires paper sheet identification information uniquely identifying the paper sheets from corresponding paper sheets (for example, a step at which the paper sheet processing device 20 acquires serial numbers of banknotes in the sorting process in FIG. 5(*a*)); a step at which the paper sheet processing device transmits the acquired paper sheet identification information to the paper sheet management device (a step at which the banknote processing device 20 transmits the banknote information Da3 to the banknote management device 10); a step at which the paper sheet management device receives the paper sheet identification information; a step at which the paper sheet management device specifies the paper sheet identification information of lost ones among the paper sheets (S102 in FIG. 8); and a step at which the paper sheet management device notifies the specified paper sheet identification information to an external device (S104 in FIG. 8). According to this aspect, effects identical to those of the first aspect described above are achieved.

Fifth Aspect

A program according to the present aspect causes a computer to execute each step of a calculating method according to the fourth aspect. According to this aspect, effects identical to those of the first aspect described above are achieved.

REFERENCE SIGNS LIST

1 banknote processing system, 10 banknote management device, 101 reception unit, 102 specifying unit, 103 storage unit, 104 notification unit, 20 banknote processing device, 201 acquiring unit, 202 transmission unit, 30 banknote processing device (banknote identification device), 301 acquiring unit, 302 transmission unit, 40 banknote processing device (banknote receiving device), 403 acquiring unit, 404 transmission unit, 50 input device, 501 reading unit, 502 transmission unit, 11 transmission unit, 12 decision unit, 13 storage unit, 31 reception unit, 32 display unit, 33 selection unit, 34 control unit, 35 distribution setting unit, 36 strength setting unit, 37 distribution performing unit, 38 identification unit, 110 storage unit, 120 decision unit, 130 notification unit, 210 distribution setting unit, 220 distribution performing unit, 230 distribution stopping unit, 240 operation panel portion, 310 counting unit, 320 identification unit, 330 transmission unit.

The invention claimed is:

1. A paper sheet processing system comprising:

a paper sheet processing device that counts number of paper sheets; and a paper sheet management device that is communicable with the paper sheet processing device, wherein the paper sheet processing device includes an acquiring unit that acquires paper sheet identification information uniquely identifying the paper sheets from corresponding paper sheets, and a transmission unit that transmits the acquired paper sheet identification information to the paper sheet management device, and the paper sheet management device includes a reception unit that receives the paper sheet identification information, a specifying unit that specifies the paper sheet identification information of lost ones among the paper sheets, and a notification unit that notifies the paper sheet identification information specified by the specifying unit to an external device, wherein the paper sheets are bundled with one another in a predetermined dispensing unit and transported, and the paper sheet management device includes a storage unit that associates bundle identification information identifying a paper sheet bundle formed of respective paper sheets counted by the paper sheet processing device with the paper sheet identification information of these paper sheets and stores therein these pieces of information, receives, from an input device to which the paper sheet identification information of a part of paper sheets forming the paper sheet bundle is input, this paper sheet identification information, and upon reception of the paper sheet identification information of a part of paper sheets forming the paper sheet bundle, associates a dispensing unit information specifying a common one of the dispensing unit with the paper sheet identification information of all paper sheets forming this paper sheet bundle and stores therein these pieces of information, wherein the paper sheet management device receives lost paper sheet information including a dispensing unit information, and upon reception of the lost paper sheet information, searches the dispensing unit information included in the lost paper sheet information from the storage unit, and the specifying unit specifies the paper sheet identification information corresponding to the searched dispensing unit information.

2. A paper sheet processing method using a paper sheet processing device that counts number of paper sheets and a paper sheet management device that is communicable with the paper sheet processing device, the method comprising:

acquiring a paper sheet identification information by the paper sheet processing device uniquely identifying the paper sheets from corresponding paper sheets;

transmitting the acquired paper sheet identification information to the paper sheet management device by the paper sheet processing device;

receiving the paper sheet identification information by the paper sheet management device;

specifying the paper sheet identification information of lost ones among the paper sheets by the paper sheet management device; and notifying the specified paper sheet identification information to an external device by the paper sheet management device, bundling the paper sheets with one another in a predetermined dispensing unit and transporting, and associating bundle identification information in a storage unit identifying a paper sheet bundle formed of respective paper sheets counted by the paper sheet processing device with the paper sheet identification information of these paper sheets and storing therein these pieces of information, receiving, from an input device to which the paper sheet identification information of a part of paper sheets forming the paper sheet bundle is input, this paper sheet identification information, and associating a dispensing unit information specifying a common one of the dispensing unit with the paper sheet identification information of all paper sheets forming this paper sheet bundle and storing therein these pieces of information upon reception of the paper sheet identification information of a part of paper sheets forming the paper sheet bundle, receiving lost paper sheet information including a dispensing unit information by the paper sheet management device, and searching the dispensing unit information included in the lost paper sheet information from the storage unit upon reception of the lost paper sheet information, and specifying the paper sheet identification information corresponding to the searched dispensing unit information by the specifying unit.

3. A program causing a computer to execute each step according to claim 2.

* * * * *